Nov. 29, 1960   I. GHERTMAN ET AL   2,962,211
CARD CONTROLLED CALCULATING PUNCH
Filed May 27, 1954   37 Sheets-Sheet 1

INVENTORS
I. GHERTMAN, E. ESTREMS,
M. ROBINEAU, E. FEBVRE
BY
J. W. Armbruster
ATTORNEY Nov. 29, 1960    I. GHERTMAN ET AL    2,962,211
CARD CONTROLLED CALCULATING PUNCH
Filed May 27, 1954    37 Sheets-Sheet 2
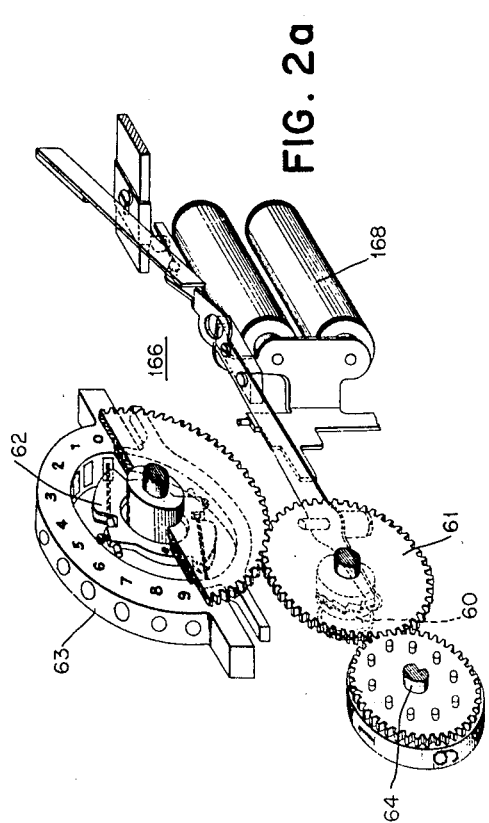
INVENTORS
I. GHERTMAN, E. ESTREMS,
BY M. ROBINEAU, E. FEBVRE
J. W. Armbruster
ATTORNEY Nov. 29, 1960  I. GHERTMAN ET AL  2,962,211
CARD CONTROLLED CALCULATING PUNCH
Filed May 27, 1954  37 Sheets-Sheet 4

INVENTORS
I. GHERTMAN, E. ESTREMS
M. ROBINEAU, E. FEBVRE

J. W. Armbruster
ATTORNEY

Nov. 29, 1960     I. GHERTMAN ET AL     2,962,211
CARD CONTROLLED CALCULATING PUNCH
Filed May 27, 1954     37 Sheets-Sheet 5

INVENTORS
I. GHERTMAN, E. ESTREMS
M. ROBINEAU, E. FEBVRE
BY

J. W. Armbruster
ATTORNEY

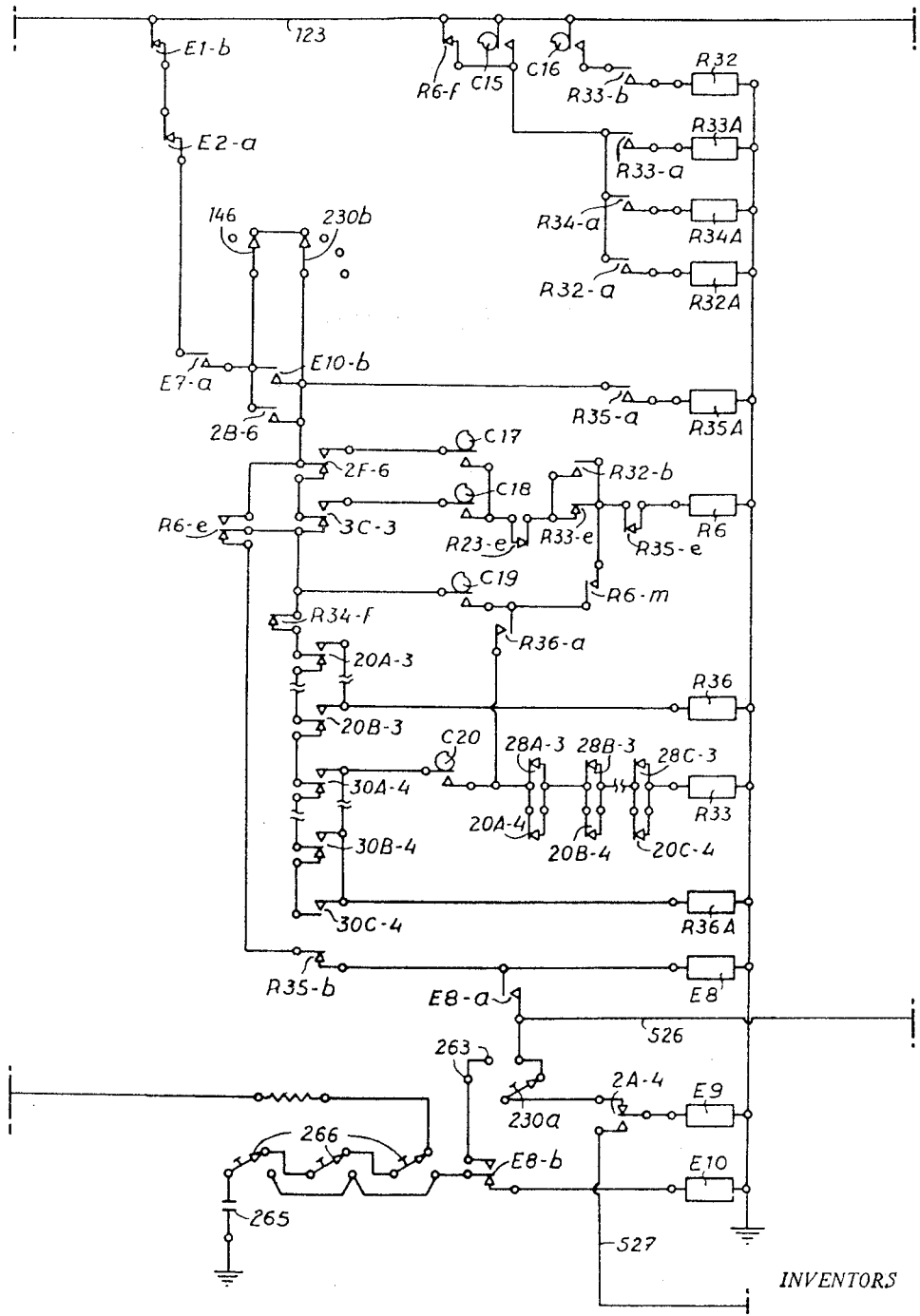
FIG. 3bbb

INVENTORS
I. GHERTMAN, E. ESTREMS
M. ROBINEAU, E. FEBVRE
BY
ATTORNEY

Nov. 29, 1960

I. GHERTMAN ET AL 2,962,211

CARD CONTROLLED CALCULATING PUNCH

Filed May 27, 1954

INVENTORS
I. GHERTMAN, E. ESTREMS
M. ROBINEAU, E. FEBVRE

BY

ATTORNEY

Nov. 29, 1960  I. GHERTMAN ET AL  2,962,211
CARD CONTROLLED CALCULATING PUNCH
Filed May 27, 1954  37 Sheets-Sheet 14

INVENTORS
I. GHERTMAN, E. ESTREMS
M. ROBINEAU, E. FEBVRE
BY
J W Armbruster
ATTORNEY INVENTORS
I. GHERTMAN, E. ESTREMS
M. ROBINEAU, E. FEBVRE
BY J.W. Armbruster
ATTORNEY Nov. 29, 1960 — I. GHERTMAN ET AL — 2,962,211
CARD CONTROLLED CALCULATING PUNCH
Filed May 27, 1954 — 37 Sheets-Sheet 20

INVENTORS
I. GHERTMAN, E. ESTREMS
M. ROBINEAU, E. FEBVRE
BY
J. W. Armbruster
ATTORNEY

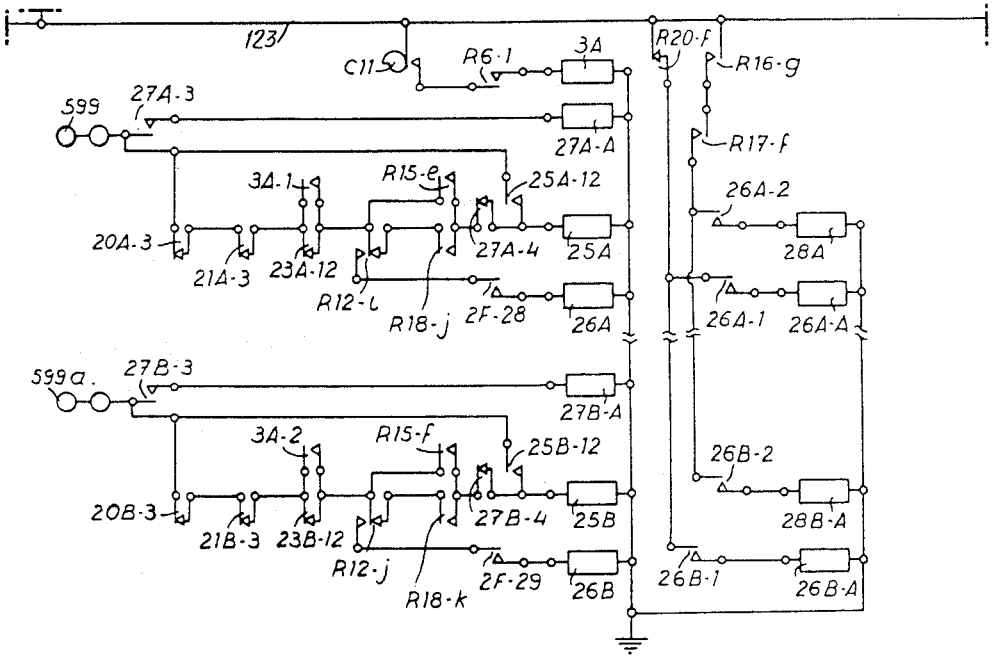
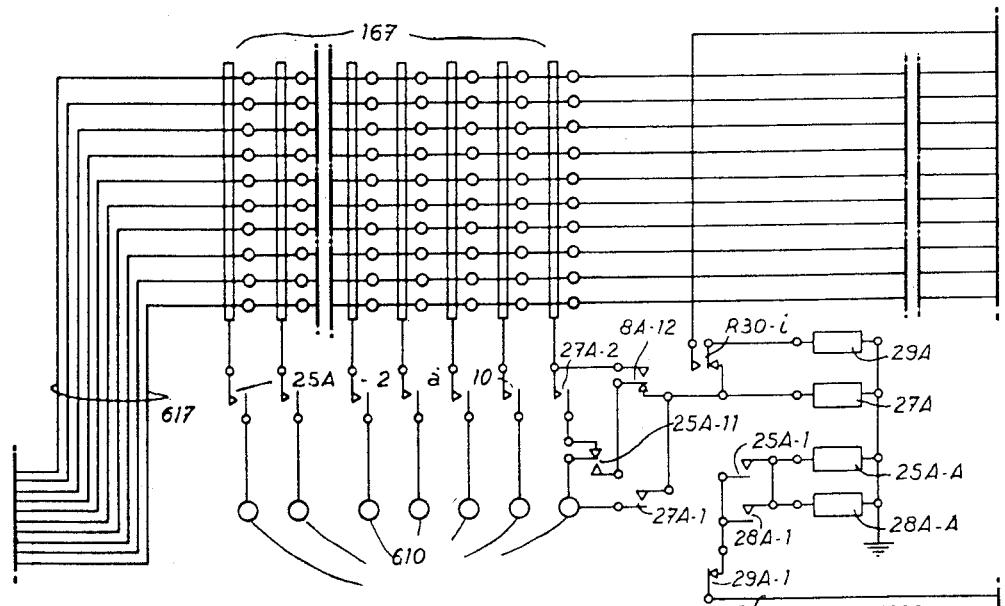
FIG. 3h

Nov. 29, 1960  I. GHERTMAN ET AL  2,962,211
CARD CONTROLLED CALCULATING PUNCH
Filed May 27, 1954  37 Sheets-Sheet 23

INVENTORS
I. GHERTMAN, E. ESTREMS
M. ROBINEAU, E. FEBVRE

J.W. Armbruster
ATTORNEY

Nov. 29, 1960     I. GHERTMAN ET AL     2,962,211
CARD CONTROLLED CALCULATING PUNCH
Filed May 27, 1954     37 Sheets-Sheet 27

INVENTORS
I. GHERTMAN, E. ESTREMS
M. ROBINEAU, E. FEBVRE
BY
J. W. Armbruster
ATTORNEY Nov. 29, 1960  I. GHERTMAN ET AL  2,962,211
CARD CONTROLLED CALCULATING PUNCH
Filed May 27, 1954  37 Sheets-Sheet 32

BY

INVENTORS
I. GHERTMAN, E. ESTREMS
M. ROBINEAU, E. FEBVRE

J.W. Armbruster
ATTORNEY

Nov. 29, 1960    I. GHERTMAN ET AL    2,962,211
CARD CONTROLLED CALCULATING PUNCH
Filed May 27, 1954    37 Sheets-Sheet 33

INVENTORS
I. GHERTMAN, E. ESTREMS
M. ROBINEAU, E. FEBVRE
BY
J W Armbruster
ATTORNEY Nov. 29, 1960    I. GHERTMAN ET AL    2,962,211
CARD CONTROLLED CALCULATING PUNCH
Filed May 27, 1954    37 Sheets-Sheet 35

FIG. 9a

INVENTORS
I. GHERTMAN, E. ESTREMS
M. ROBINEAU, E. FEBVRE
BY
J.W. Armbruster
ATTORNEY

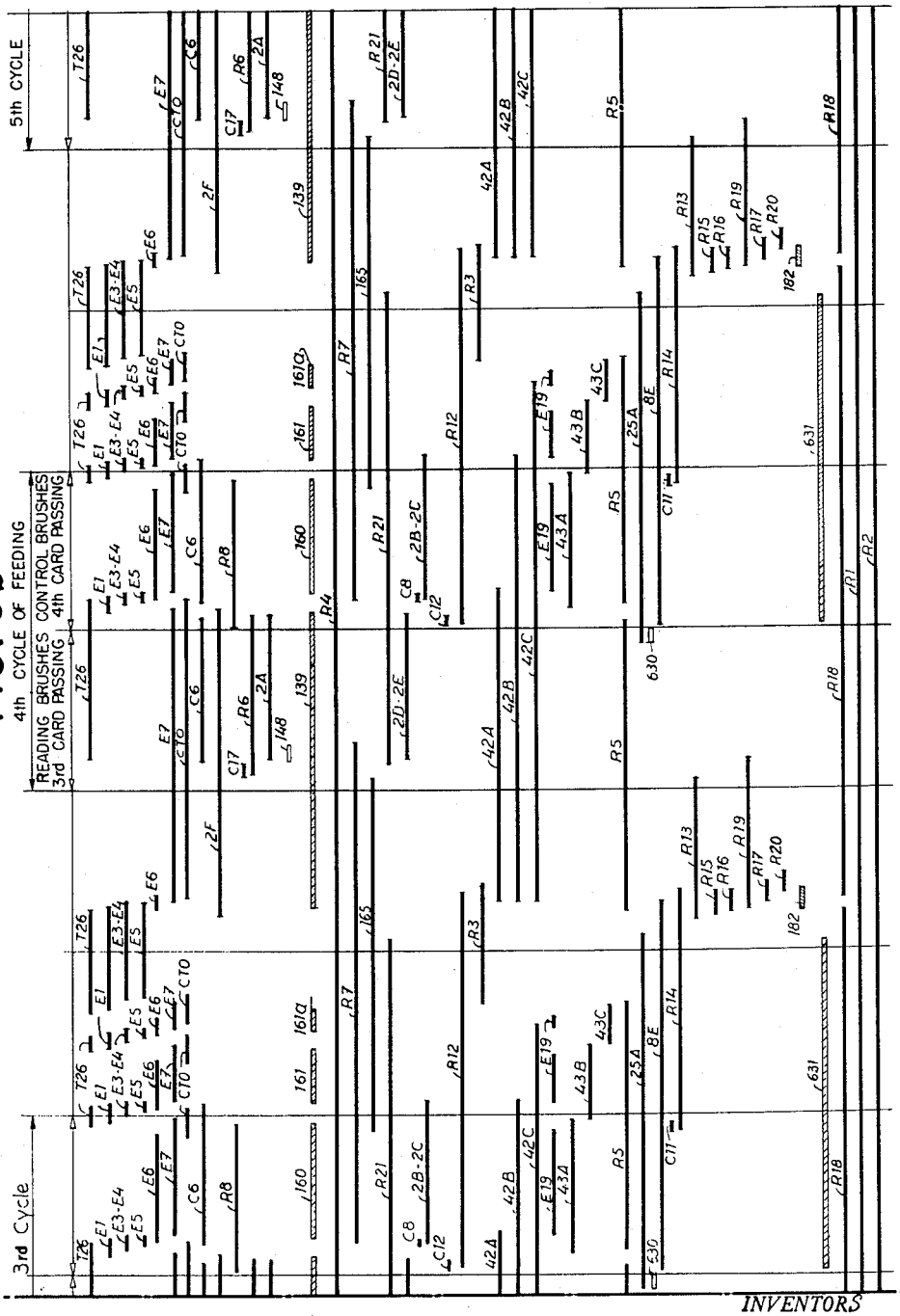

Nov. 29, 1960  I. GHERTMAN ET AL  2,962,211
CARD CONTROLLED CALCULATING PUNCH

Filed May 27, 1954  37 Sheets-Sheet 37

*INVENTORS*
I. GHERTMAN, E. ESTREMS
M. ROBINEAU, E. FEBVRE
BY

*J. W. Armbruster*
ATTORNEY

United States Patent Office 2,962,211
Patented Nov. 29, 1960

2,962,211
CARD CONTROLLED CALCULATING PUNCH

Ioino Ghertman and Eugenio Estrems, Saint-Mande, Marcel Jean Robineau, Paris, and Edmond Febvre, Saint-Mande, France, assignors to International Business Machines Corporation, New York, N.Y., a corporation of New York Filed May 27, 1954, Ser. No. 432,801

Claims priority, application France June 9, 1953

35 Claims. (Cl. 235—61.1)

This invention relates in general to calculating machines of the type for handling all arithmetic processes and more particularly to the kind of such a calculating machine adapted for control by record cards and for perforating the results of calculations back in such cards.

In the prior art there are a number of calculating machines adapted for handling arithmetic problems involving the operations of addition, subtraction, multiplication, and division during the handling of a single card. In the U.S. Patents 2,605,964 and 2,660,373, there are disclosed examples of such machines. While the operations of addition and subtraction require a relatively small amount of calculation time, the multiplication operations require much more time, depending upon the number of digits of the multiplier. This amount of time is still further increased when the operation involved is division, although in certain modes of operation, such as the one described in U.S. Patent 2,536,906, there is a considerable reduction of the amount of calculating time involved. Therefore, in the case of the production of cards in a calculating machine involving the perforation of such cards, it will be realized that the number of cards produced is reduced considerably when the process of multiplication or division is involved in the calculations.

It is an object of the present invention to provide a novel arrangement of calculating units and control circuits involving the combination of electromechanical storage units and relay operated storage units with an electronic calculating accumulator or counter in order to obtain a faster and more flexible calculating machine than heretofore. It is faster than a plain relay calculator and more flexible and economical than a straight electronic calculator. Here the best features of both types of machines are combined. A feature of the machine is the adaptation to perform several operations of multiplication or division simultaneously without slowing down the rate of punching cards in the machine. Another feature is the provision of control circuits which are provided for increasing the control possibilities of the various functions of the machine while at the same time reducing the number of selection elements and eliminating parts which were heretofore thought necessary and provided in the machines of the prior art.

Another object of the invention is the provision of control circuits and a cooperating program device adapted to be used flexibly and to control selectively a function to be directed to include the use of relatively slow electromechanical storage means when the registration of data is to be effected from the reading of a card passing under reading brushes or the treatment of data in another direction, i.e., such as by the transfer of data stored in an electronic counter directed into an electromechanical storage unit. The flexible program devices may also function to call for high speed cyclic operation when directing the use of electronic means such as the transfer of data stored in an electromechanical storage unit to an electronic counter for operations involving multiplication and division, the result of which is automatically obtained in the electronic counter.

Another object of the invention comprises the provision of a general control device for the several electronic means of the machine in combination with the different electromechanical or relay operated storage units in order to increase the flexibility and speed of operation of the present calculating machine beyond the flexibility and speed of the machines of the prior art. This is accomplished while reducing the number of electron tubes used in the machine through the employment of multiple synchronization which goes beyond the simple emission of impulses and provides through a new arrangement of circuits to control directly electronic gates, such as the carry or transfer tubes, for example.

Another object of the invention consists in the provision of electronic circuits associated with the electromechanical or relay operated storage units in combination with electronic accumulators or counters and so arranged that it is possible to use, as a multiplier, a multiplicand, or a divisor, any electronic storage unit selectively, the operations of multiplication, division, or of a simple transfer being controlled by the same electronic unit, and the carrying or transfer functions from an electronic counter position being controlled by the same tube.

Another object of the invention comprises provision of electronic devices adapting the use of sets of electromechanical or relay operated storage units combined with an electronic calculating counter in order to realize faster algebraic operations than heretofore by means of provision of a converting device for data stored in the electronic counter to change it to the complement of 9, such conversions being controlled through a single tube and being accomplished in a very short time, which has no effect upon the over-all calculation speed.

Another object of the invention is to provide means for obtaining the advantages of the speed of electronic calculating counters and at the same time to avoid the use of additional electronic means in those instances and places where electromechanical or relay means are more economical, reliable, and durable and yet fast enough because, operating concurrently therewith, the record element is being sensed, moved, or punched, and requires a relatively slow mode of operation.

Another object of the invention is the provision of number storage means of varying scope and for varying bases of numeration, as for receiving 10's, 12's, 16's, 20's, etc., as well as for combinations of 1, 2, 3, and 4 stages of storage, said storage means being susceptible to varying speeds of operation in order that calculations may be done involving various bases of notation other than decimal and including decimal, and such calculations being facilitated by using the faster storage means in instances warranting or requiring such speeds. In order to compute values in the monetary systems of many nations, there is provided here such flexibility in numerical systems as to include all styles and values of conversions from denomination to denomination and in and among several successive orders.

Another object of the invention is the provision of means and the employment of a style of operation involving the overlapping of concurrent and yet distinct operations of the machine to arrive at a faster over-all time. For example, while the card punch is being operated to perforate a final result in a first card under control of one set of storage units, a second card is being read to set up values to govern a second set of calculations from another storage unit. While a storage unit is being read for a result, it is also being reset in readiness for reception of data.

Another object of the invention is the provision of several expedients for speeding up the response of the electromechanical punching controls of the machine, so that the time interval passing between the handling of two successive cards is limited. One expedient involves the direct placement of the record with the proper column of it directly under the column of punches ready to receive perforations in the first position without several successive skipping operations.

Another object of the invention is the provision of circuits cooperating with the electronic accumulators or counters to detect the presence of 0 in a counter. As an example of the use of this feature, it may be pointed out that in solving problems involving English currency it is required to determine whether the unit's order of a shillings counter stands at 0 or 1 to detect 10 or 11 shillings.

Another object of the invention is the provision of improved resetting devices for electronic calculating counters. The accumulators or counters as shown are operated at the last part of the same cycle of the readout operation for resetting, whereas heretofore two electronic cycles were required.

Another object of the invention is the provision of an improved form of programming device involving a plurality of primary and secondary cyclic controls involving both relay operated stepping devices and electronically operated stepping devices. These programming devices are suited to be connected one within the other with the slower relay operated cyclic controls predominating and coming first and last in order of operation. This style of programming is well suited to the combination of electromechanical and electronic devices of the present machine because in the handling of a card it is the first and last operations which are relatively slow in the reading and punching of a card, while the interspersed calculating operations may be relatively fast because they are unaccompanied by any movement of the card. Therefore, it is obvious that the combined form of programming means provided here is unusual and suited well for the specific purpose for which it is used. The program device is adapted for many flexible variations as preselected by the card and the machine operator, so that the steps of calculation, transfer, multiplication, division, zeroizing, verifying, etc., may be all or part cancelled, substituted, repeated, backstepped, or duplicated.

Another object of the invention is the provision of relay operated column shift devices including contacts operated by combinations of relays having the shifting propensities in the order of 1, 2, and 4 which, when taken in combinations of any of the three, gives seven possible positions of shifting.

Another object of the invention is the provision of a relay operated storage counter with the relays of said counter being related to stages of the counter having different values which, when taken in combination, resolve into various bases of numeration different than the decimal base of numeration and including the decimal base of numeration.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 2a is a perspective view of one order of the electromechanical counter storage unit;

Figure 8:
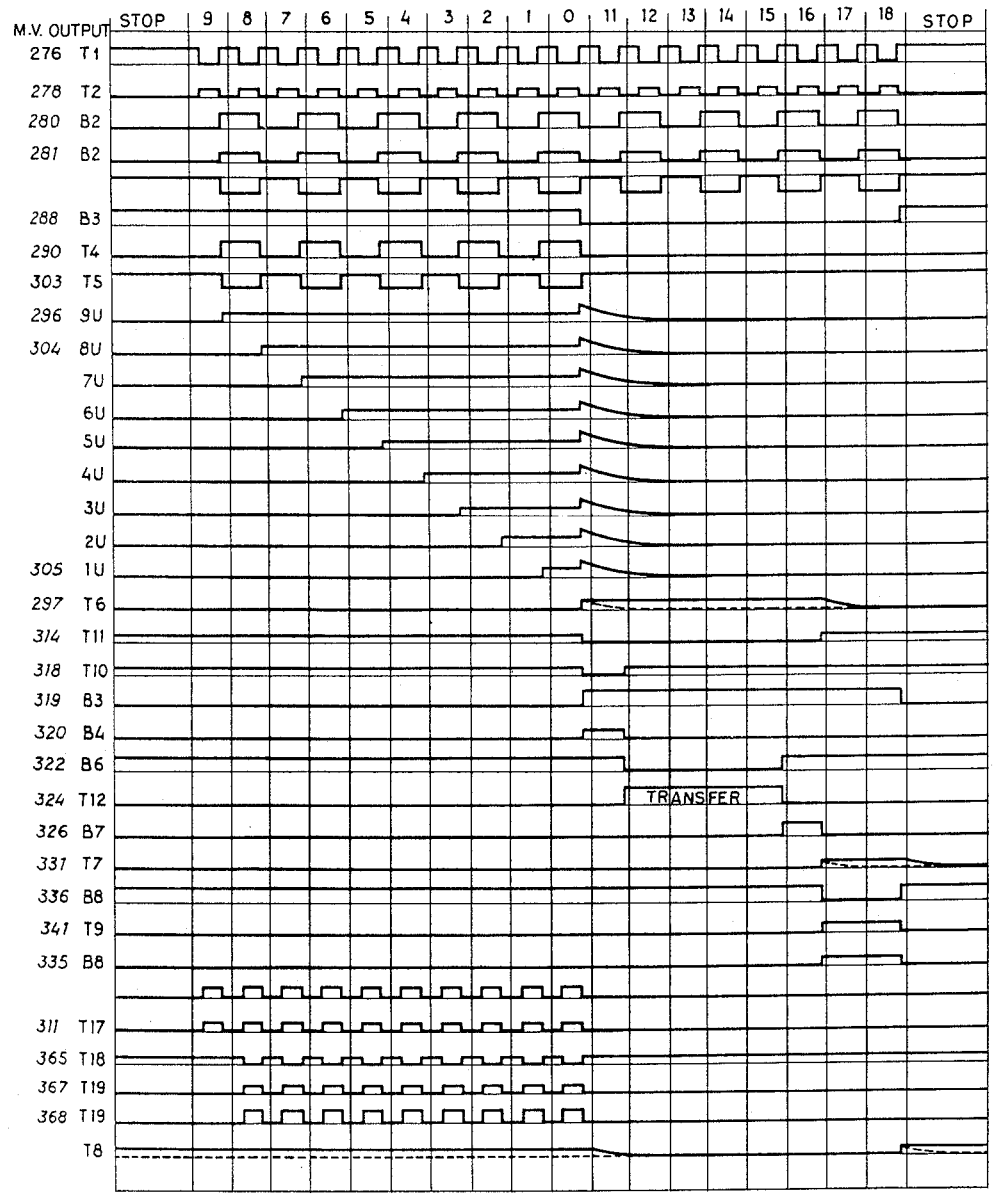
Figure 10:
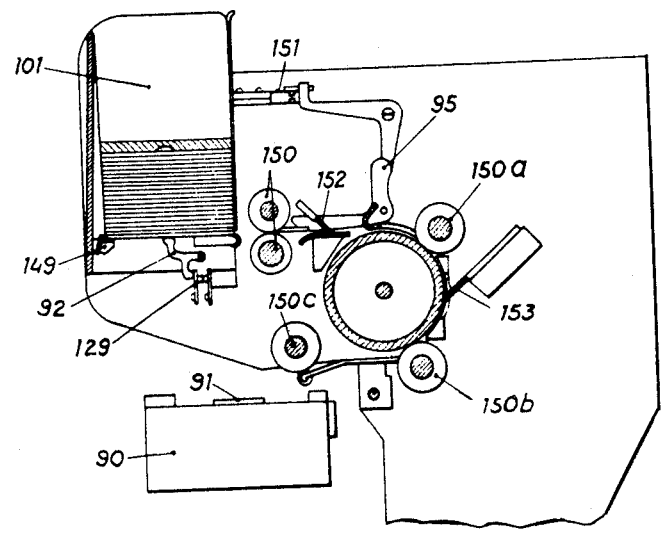
Figure 11:
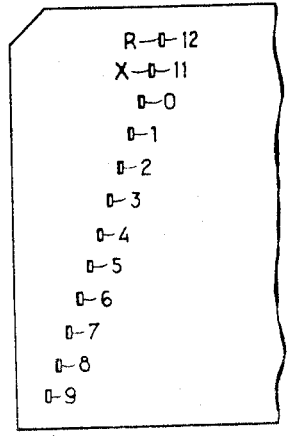

Figs. 3a–3mm when taken together form a complete electrical circuit diagram;

Fig. 4 is a diagrammatic view showing how to assemble the figures of the circuit diagram represented in Figs. 3a–3mm;

Figs. 5 and 5a illustrate respectively the connections of a trigger circuit and the symbolic representation of it which is used throughout the circuit diagram;

Fig. 6 is a timing chart showing the timing of the mechanically operating contacts;

Fig. 7 is a timing chart showing the operation of contacts governed by the card feeding portion of the machine;

Fig. 8 is a timing diagram showing the impulse timing of the main electronic circuits;

Figs. 9a and 9b when taken together form a timing chart covering several successive cycles and the operation therein of the main control relays;

Fig. 10 is a sectional elevation view showing the card feeding and sensing mechanisms of the machine;

Fig. 11 shows a portion of a perforated card.

SUMMARY

The machine is generally of the type controlled by record cards for centering the various basic values forming the terms of an arithmetical problem which is to be carried out by one or more steps involving any of the four common arithmetical processes. The card handling devices provide means for feeding cards successively under sensing means and punching means in that order so that the card is not only the governing means for the origin of the terms of the arithmetical treatment but also the recipient of the result in the form of perforations. Interspersed between the functions of sensing and punching the card are electronic controls for performing rapidly the many calculating steps which may be attendant to problems involving many terms and plural ordered numbers. The various functions of the machine are controlled by a program device arranged to cause the insertion between different cycles of other program cycles in any number and at different speeds. It is during the calculating functions involving the electronic accumulators or counters that the operations are performed very rapidly and much faster than those cycles involving the electromechanical or relay operated storage units. It is during the operation of the latter in such functions relating to the electromechanical elements where the cycling is much slower and comprises card feed operation or simply a transfer cycle to send the data registered in the electronic counters over to the electromechanical or relay operated storage units. Through the plugboard a very flexible arrangement is obtained whereby many control elements are of general purpose use and serve several purposes and therefore not only increase the speed and flexibility of the machine but also reduce the number of parts and provide a more economical form of device.

THE MACHINE IN GENERAL

The mechanical parts of the machine are in some respects similar to those of the Bryce Patent No. 2,120,228. The present machine differs from the foregoing by the provision of electronic and relay controls and also by the use of additional mechanical storage units of a type similar to those shown in U.S. Patents 2,359,670 and 2,569,829.

Figure 1:
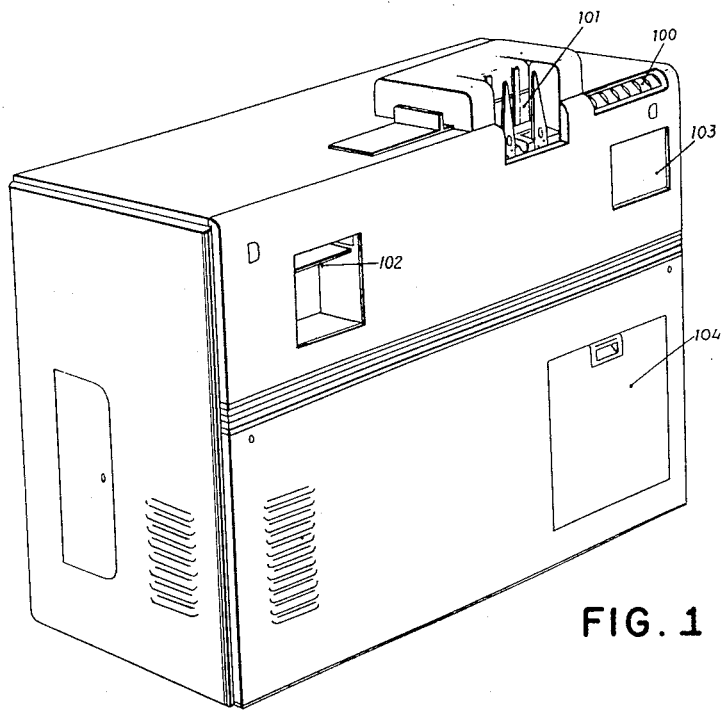
Fig. 1 is a perspective view of the machine.

On the perspective view, Fig. 1, it will be noted that the machine is provided with a block of control knobs 100, a card feed unit 101, a stacker or card receptacle 102, a panel of indicator tubes 103, and a cover of a plugboard panel 104.

Figure 2:
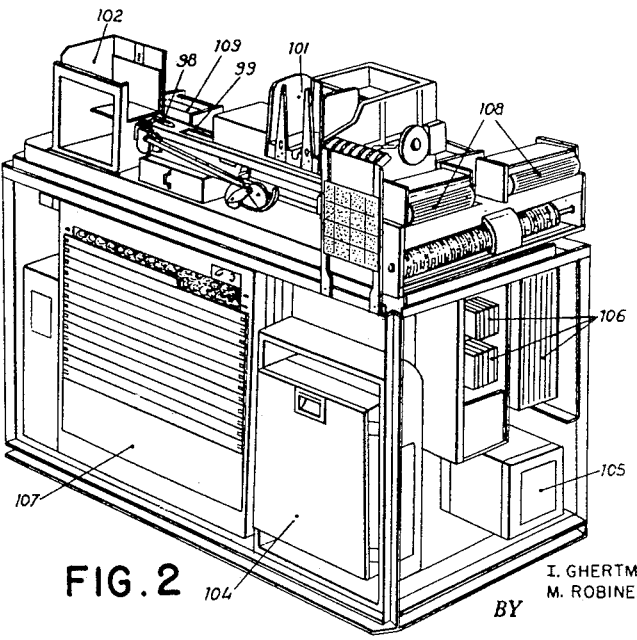
Fig. 2 is also a perspective view with the cover of the machine removed.

Fig. 2 is more revealing of the inside of the machine and shows the transformer 105 and the rectifiers 106 provided for the supply of electric current. A swinging gate 107 is designed for holding the components of the electronic calculation unit while the storage elements 108 and 109 are designed to receive the factors or the results of the calculations. Rack 99 of the punching portion of the machine is shown in the last column.

The cards bearing the control data for the operations to be performed are placed in the stacker 101, Fig. 10, and there they actuate lever 92 and cause the closing of contacts 129 to condition a portion of the electrical controls for starting operation. The cards are pushed successively by the picker knives 149 and are carried further by the driving rolls 150. The card then runs under the first roll of brushes 152 where it actuates the lever 95 and thus causes the closing of contacts 151. The card comes at last up to the driving rolls 150a and remains temporarily at rest in this position. During the next cycle the card is run under brushes 153 and then grabbed by rolls 150b and 150c to be brought finally into the stacker 90 designed for the crosswise feed of the punching unit. The card remains there a certain length of time dependent upon the completion of perforation of the previously fed card after which the second card is fed into the punching unit by means of the finger 91.

Concurrent with the aforementioned card handling operations, there are performed the registration of the factors in storage from the card, the calculations and the temporary registration of the calculation results back in storage units. The perforation of these results is then performed in the card and after that the card which has been perforated is grasped by gripper 98 to be dropped into the card stacker 102.

ELECTRIC CIRCUIT DIAGRAM

1. Voltage feed of the circuits

Switch 110 (Fig. 3h) being closed, feed unit 111 is charged. This unit is arranged in any known manner and is designed for providing the feed of electric and electronic circuits with the necessary voltages.

The electric circuits are fed from terminal 112 with a potential of about 40 volts. The electronic circuits are fed from terminals 113, 114, 115, 116, and 117 (Fig. 3k) with respective voltages of 150, 75, 50, 0, and −100 volts.

All these values are only given as workable ranges and should be considered as taken from terminal 116 which is connected to the ground of the machine.

As soon as switch 110 (Fig. 3h) is closed, a circuit is made from terminal 115 to terminal 116 (Fig. 3k), the effect of which is to actuate a thermal relay formed by resistor 118 and contact 119. The purpose of this relay is to insert a certain delay between the moment when switch 110 is closed, and that when the voltages are actually applied to the machine. In that way, the cathodes of the various electronic tubes included in the machine may reach their temperature of normal operation.

With contact 119 closed, a circuit is completed from terminal 117 to terminal 116, the effect of which is the energization of relay A1 and the connection of terminal 117 with line 243. This line, which is shown particularly at Figs. 3k, 3–l, 3m and 3f, is thus brought to a potential of −100 volts with respect to the ground, and it is the same for all the elements of circuits connected to this line.

Besides, relay A1 (Fig. 3k), energized as noted, closes its contact A1–a and thus causes the energization of relay A2 and connection of terminal 115 with line 241. This line, which develops also at Figs. 3k, 3–l, 3m and 3f, is thus brought to a potential of 50 volts and it is the same for all the elements of circuits connected to it. Relay A2 closes, in its turn, its contacts A2 and A2–b and thus ensures the connection of terminals 114 and 113 with lines 240 and 239. The latter, which is shown in the same figures, are thus brought respectively to a potential of 75 and 150 volts and again it is the same for the elements of circuits connected to it.

Figure 3A:
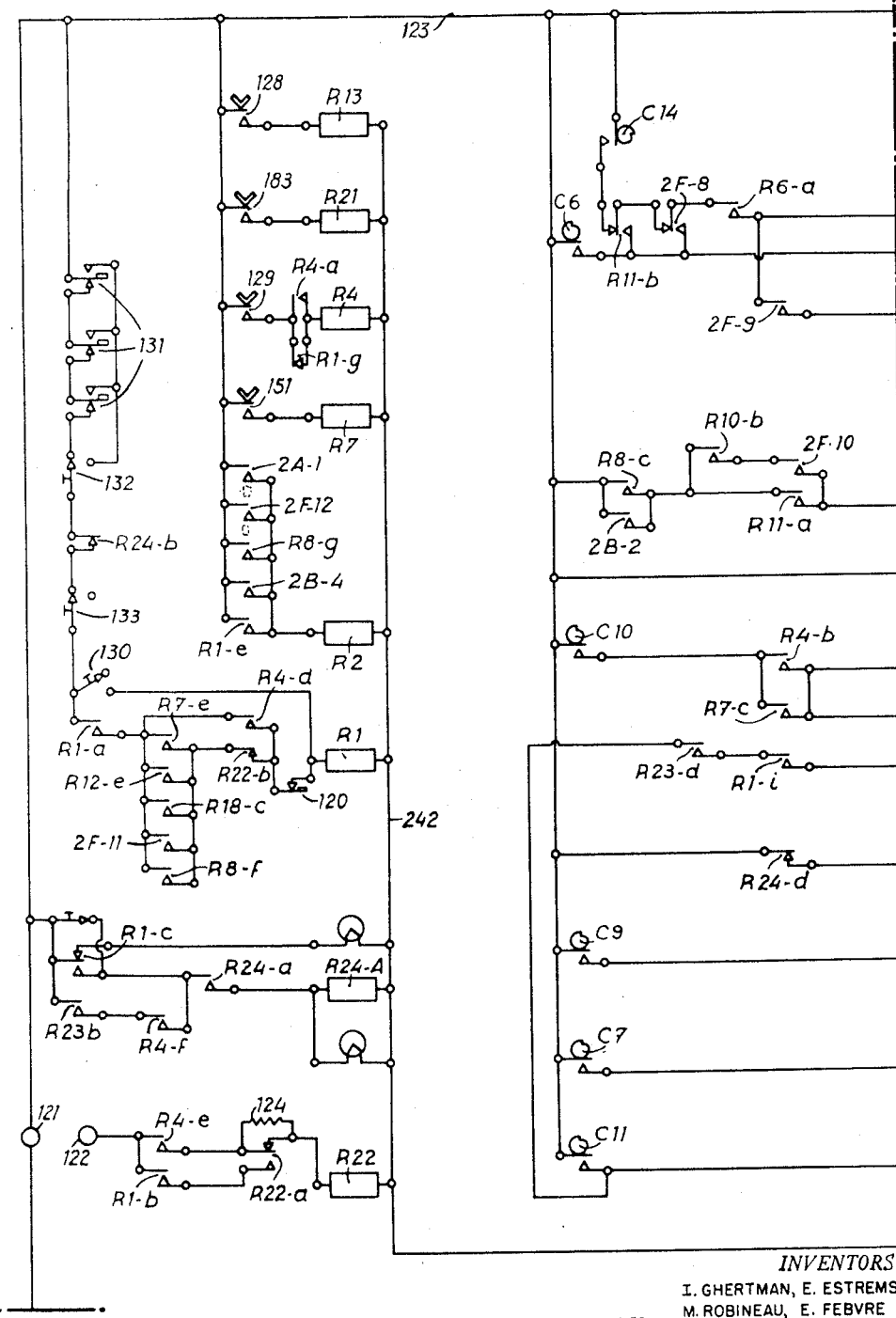
Figure 3A:
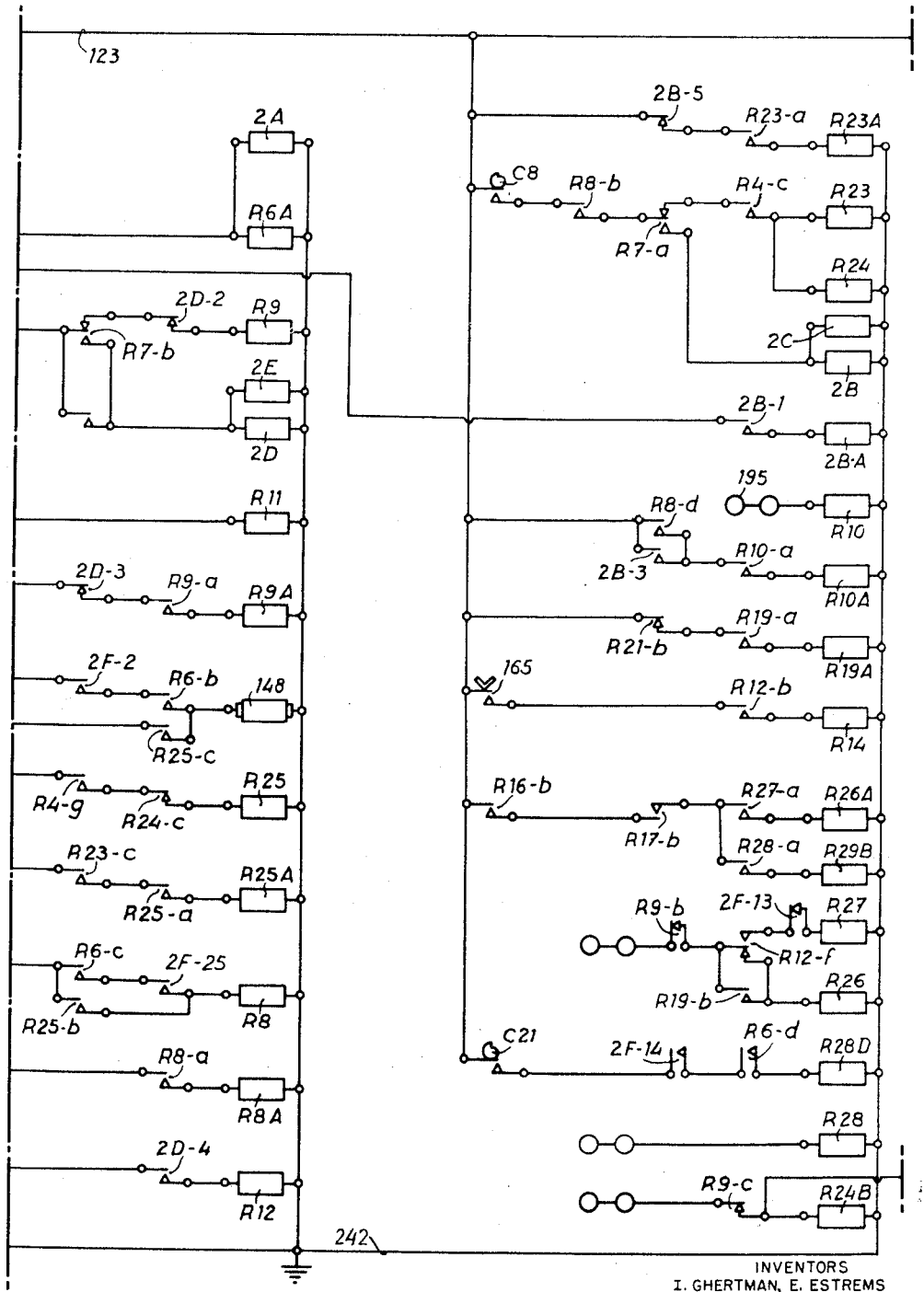
Figure 3B:
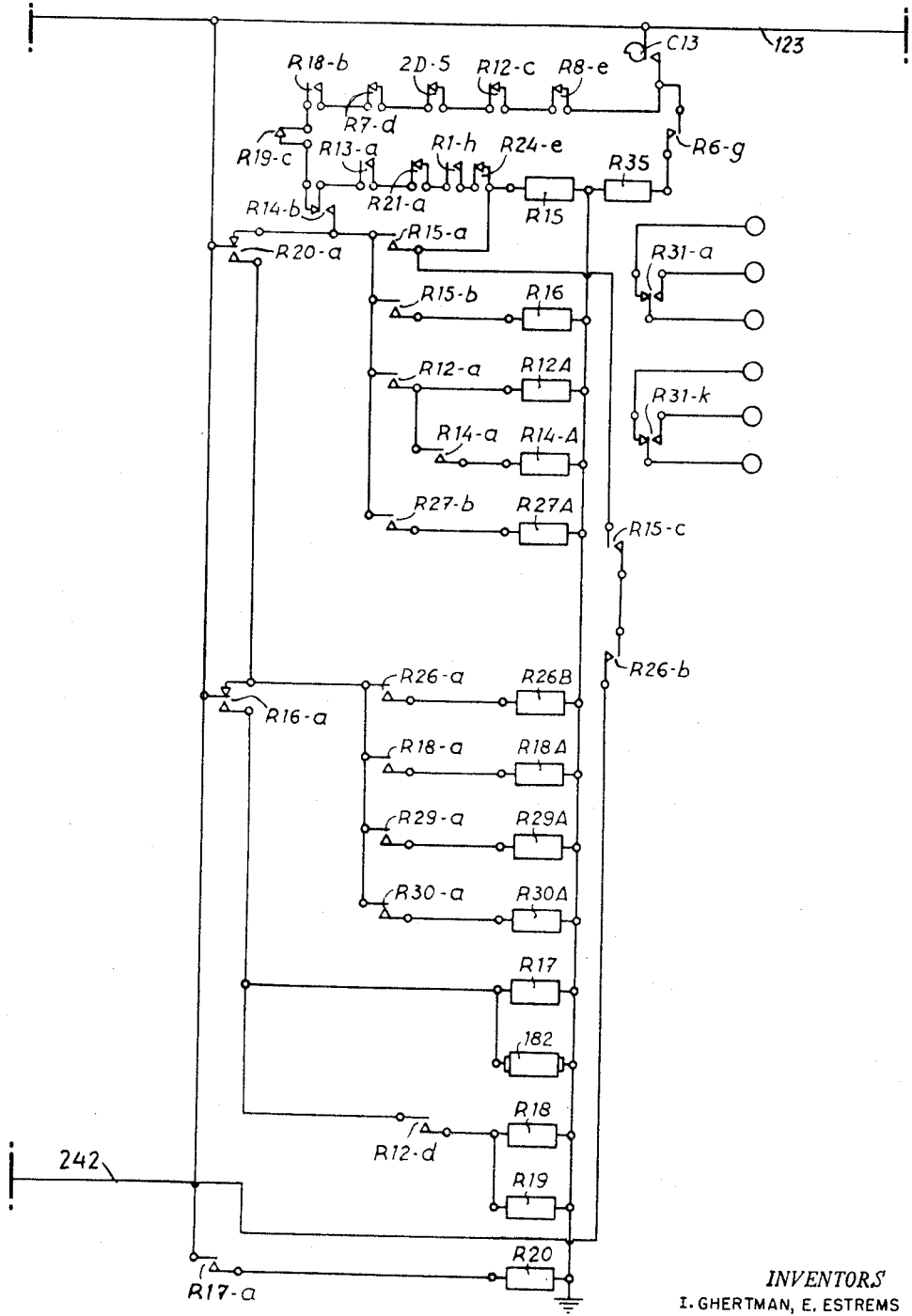
Figure 3B:
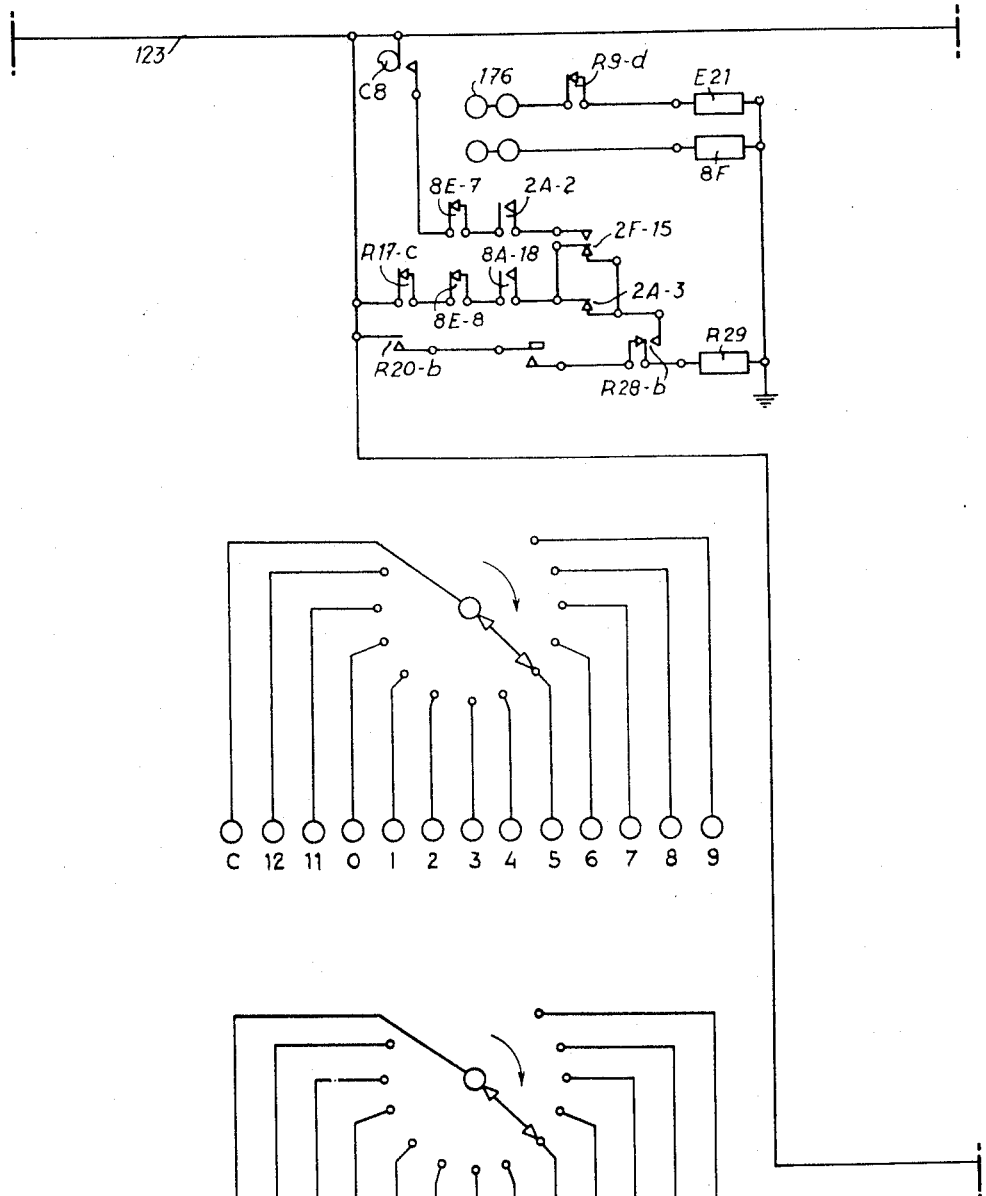
Figure 3C:
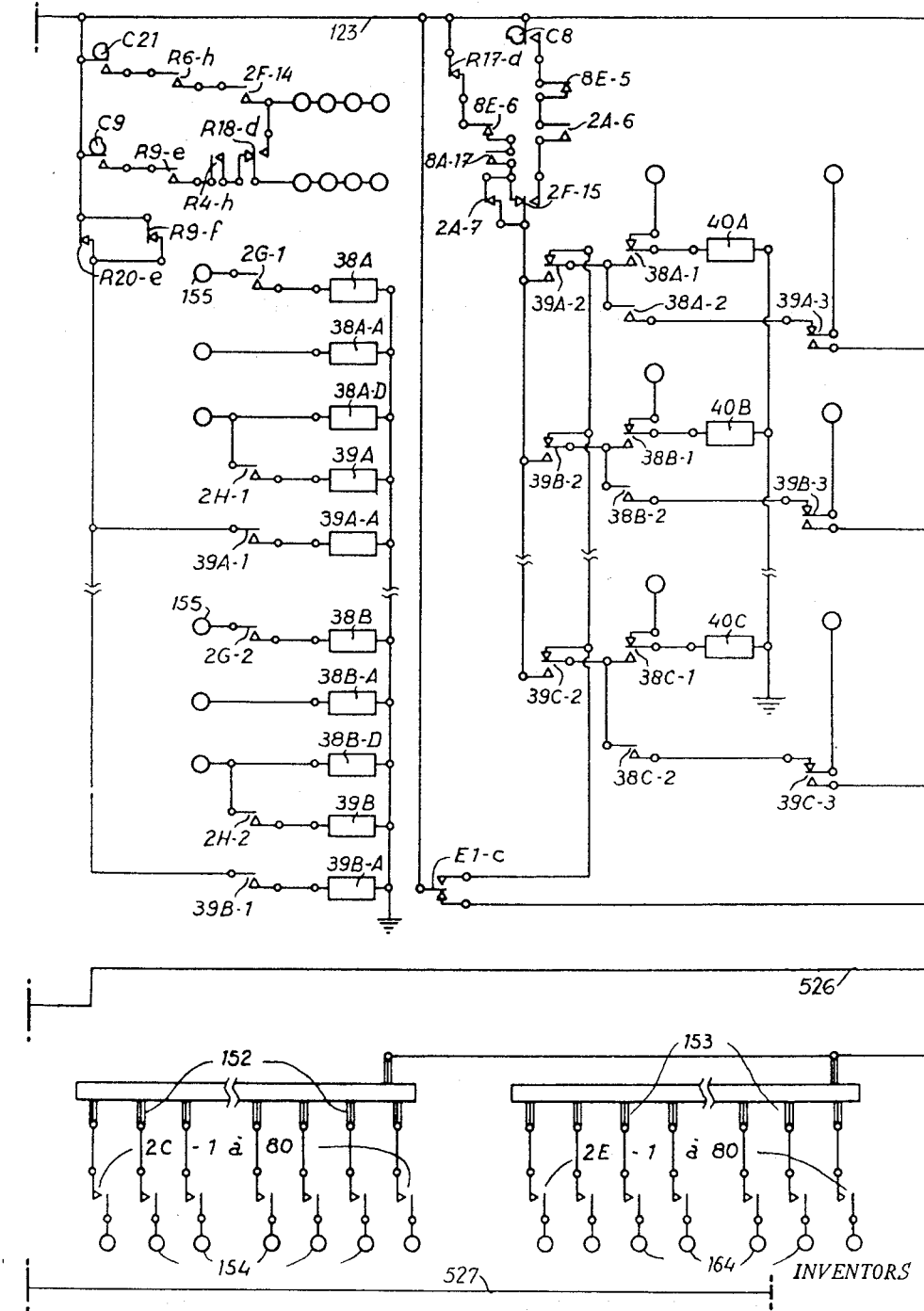
Figure 3C:
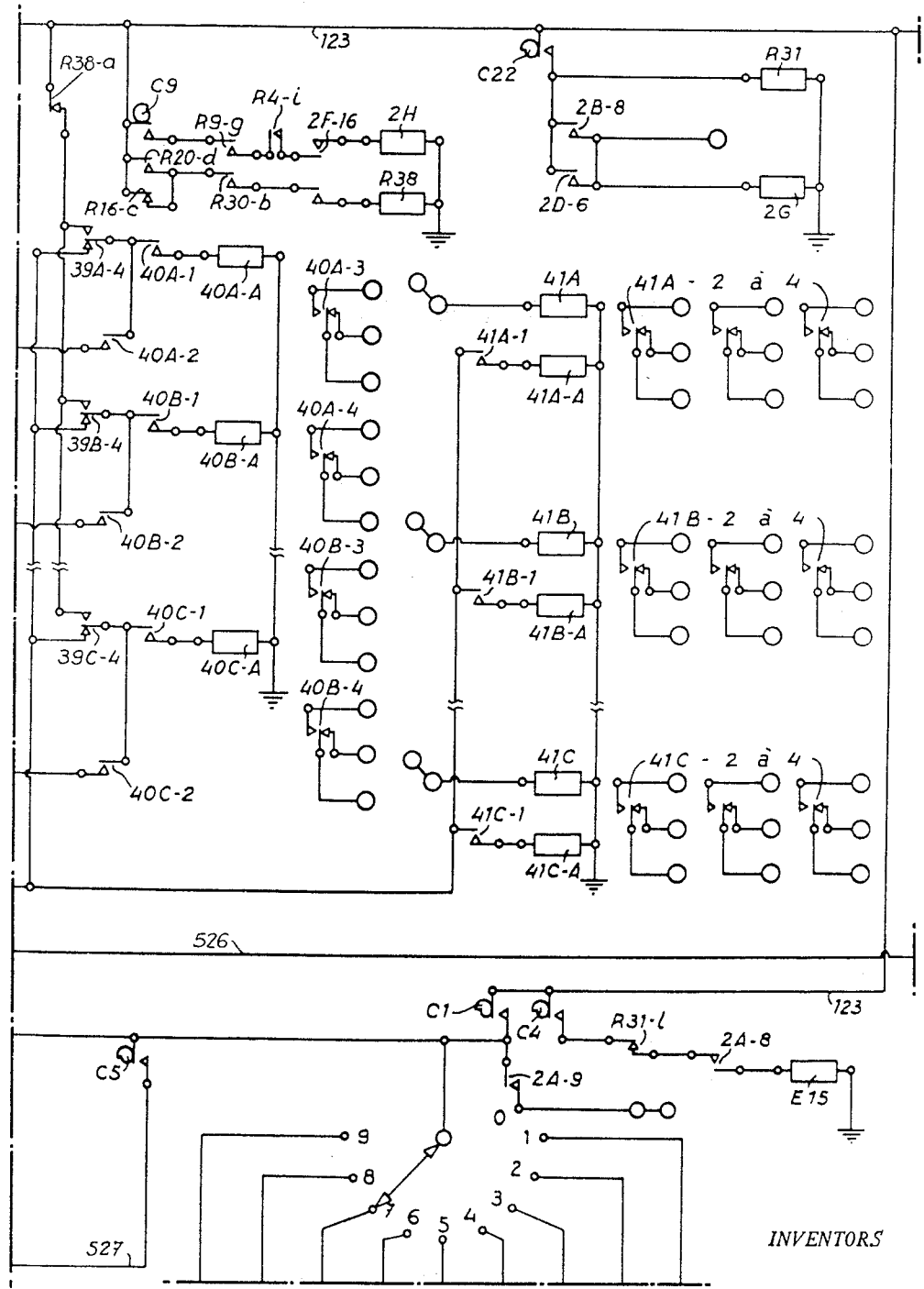
Figure 3D:
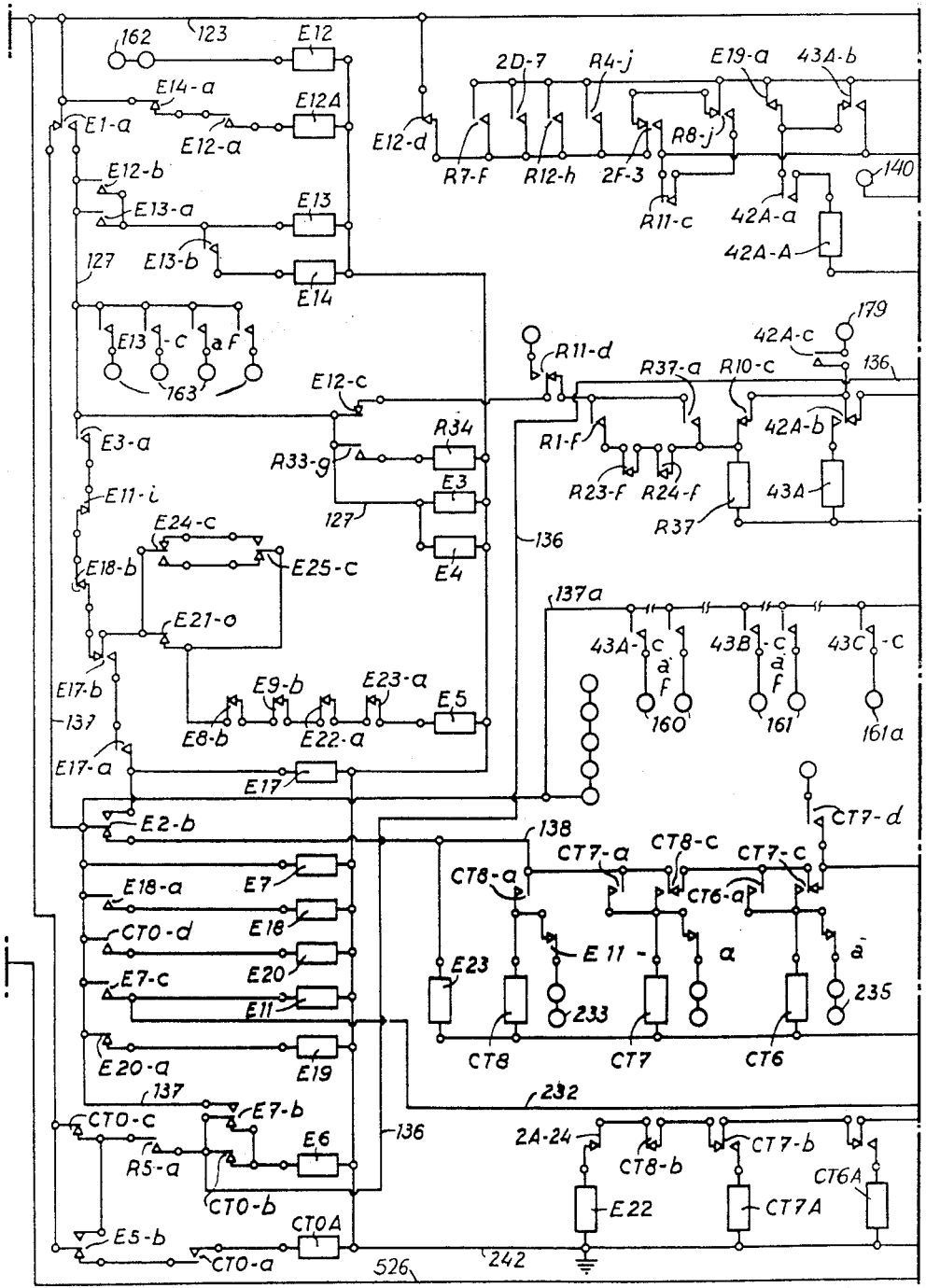
Figure 3D:
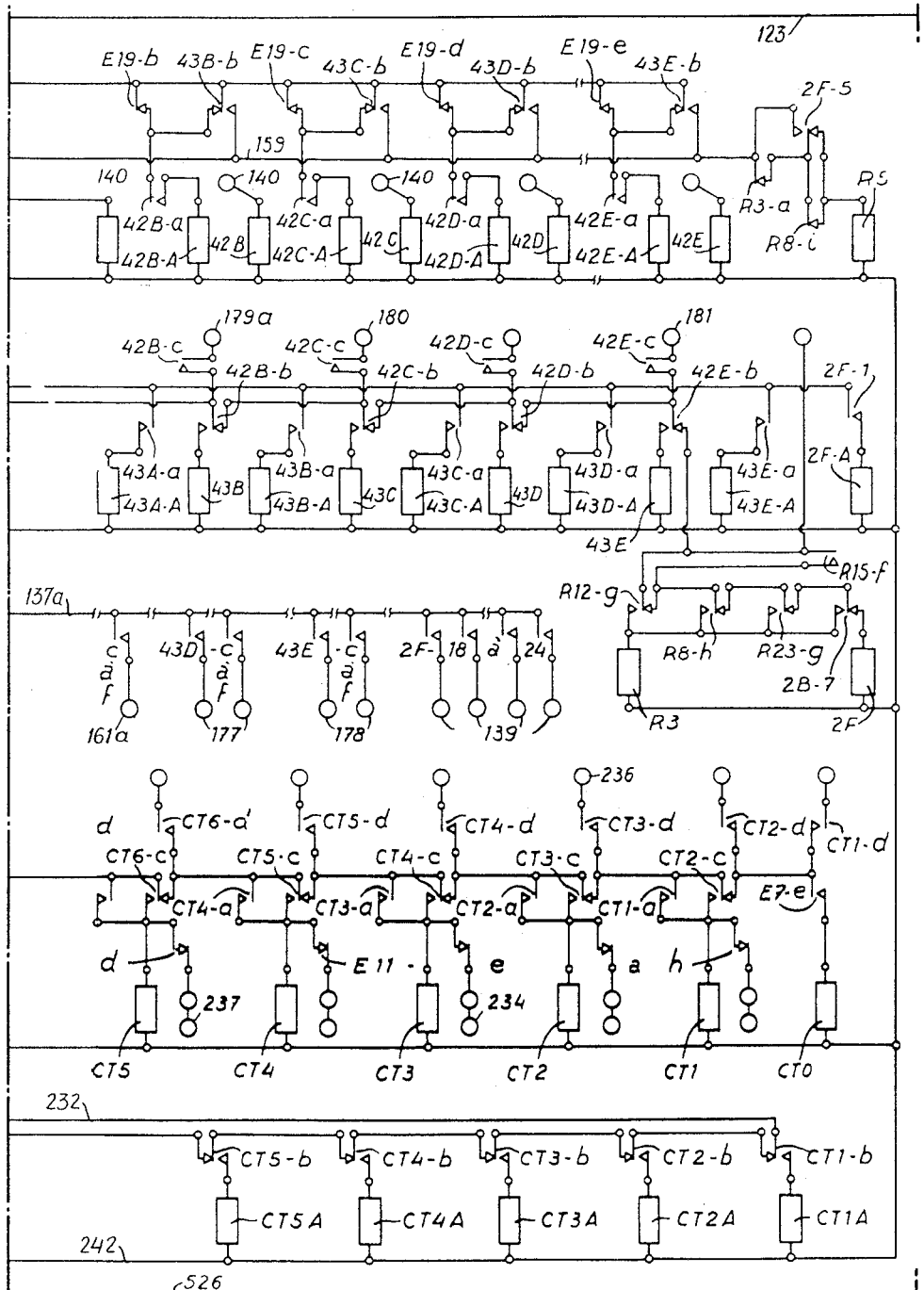
Figure 3E:
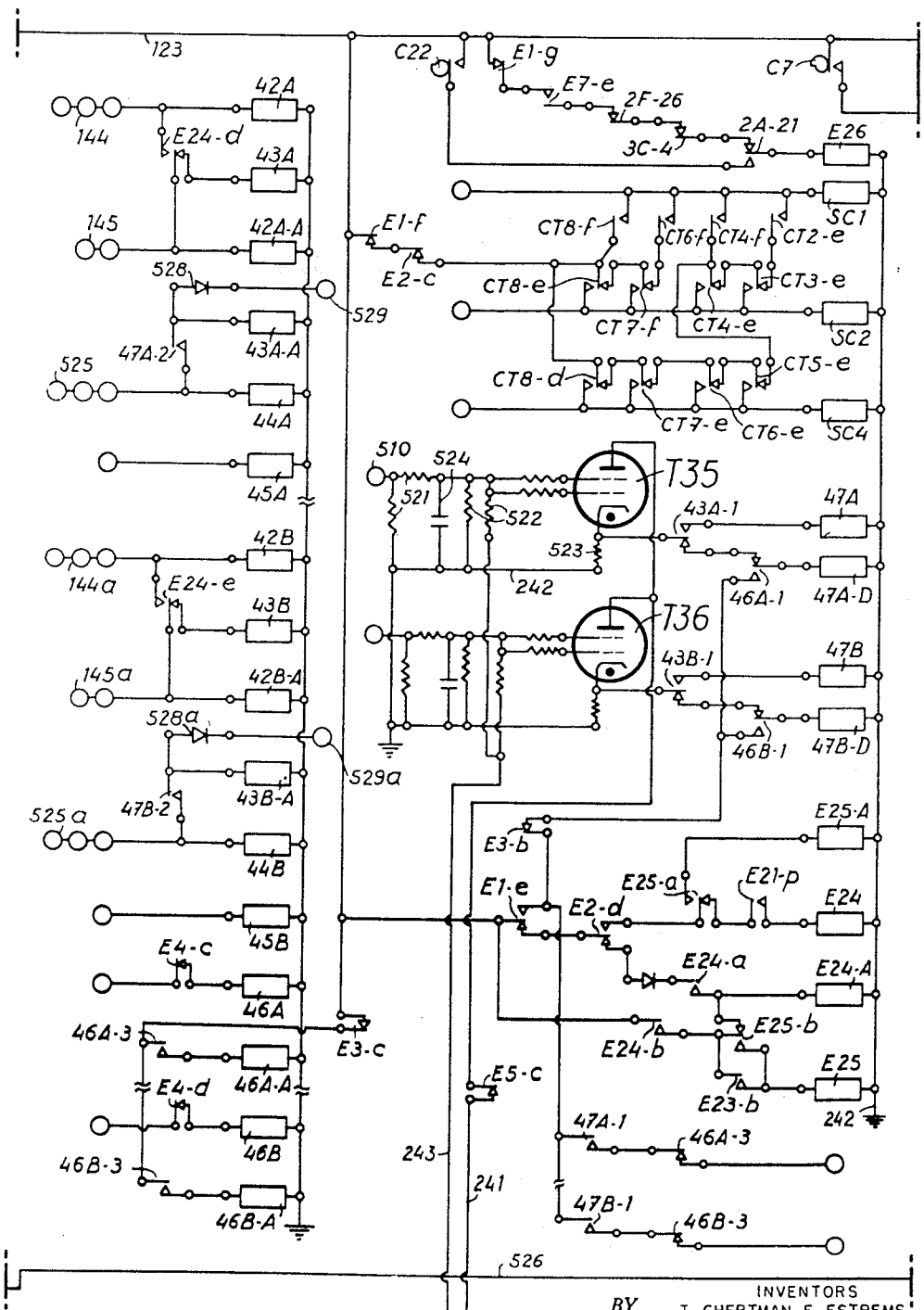
Figure 3E:
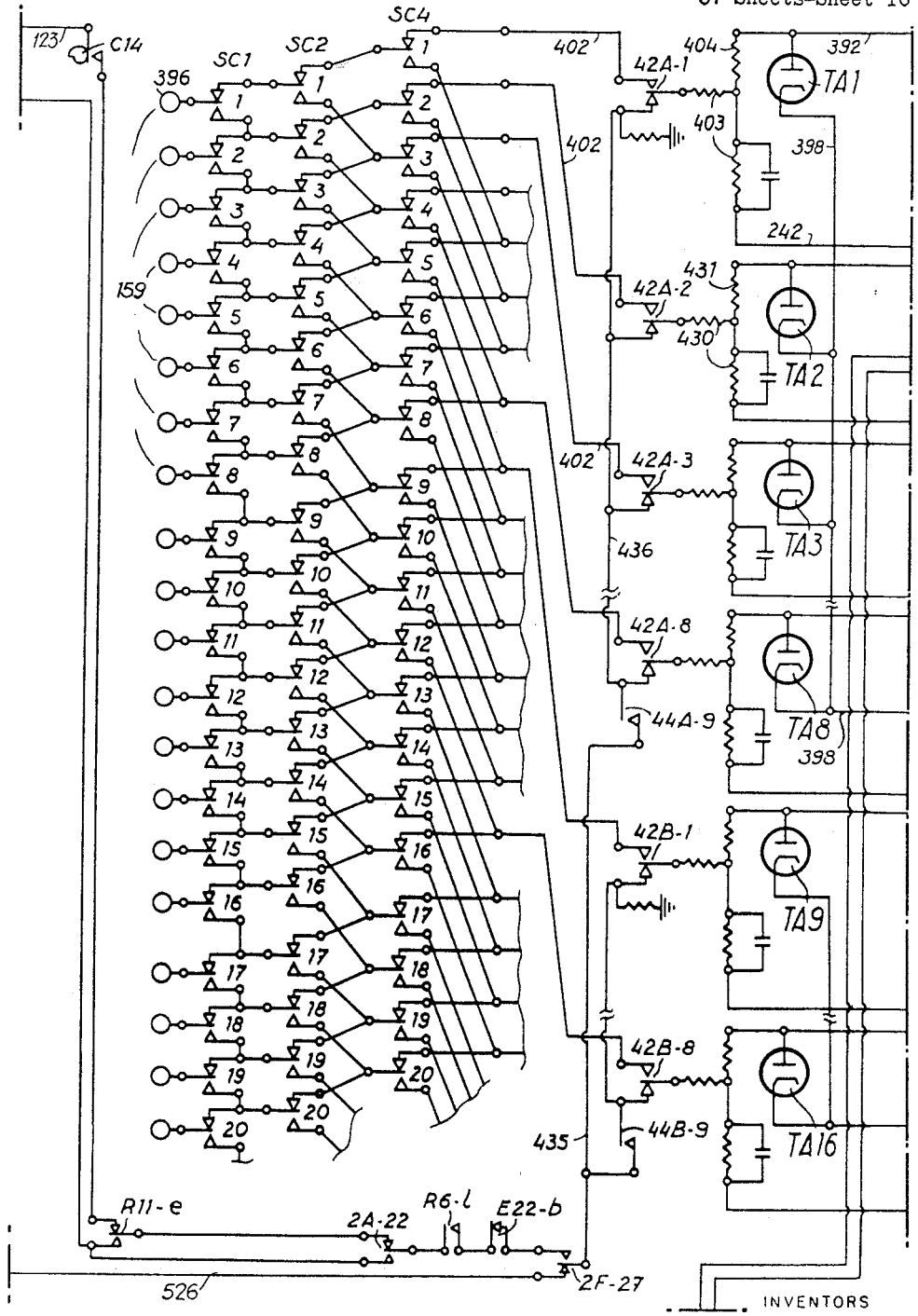
Figure 3F:
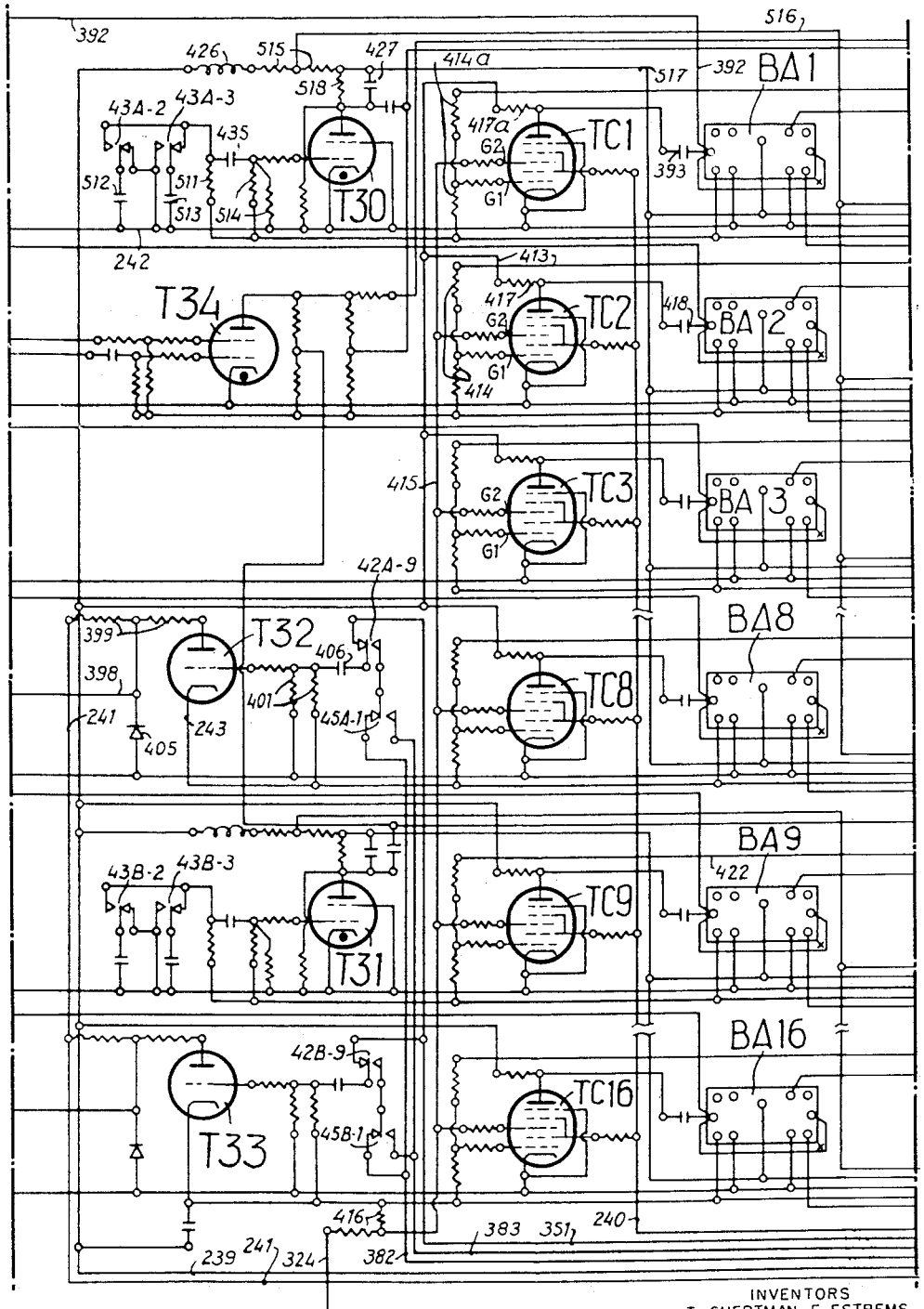
Figure 3F:
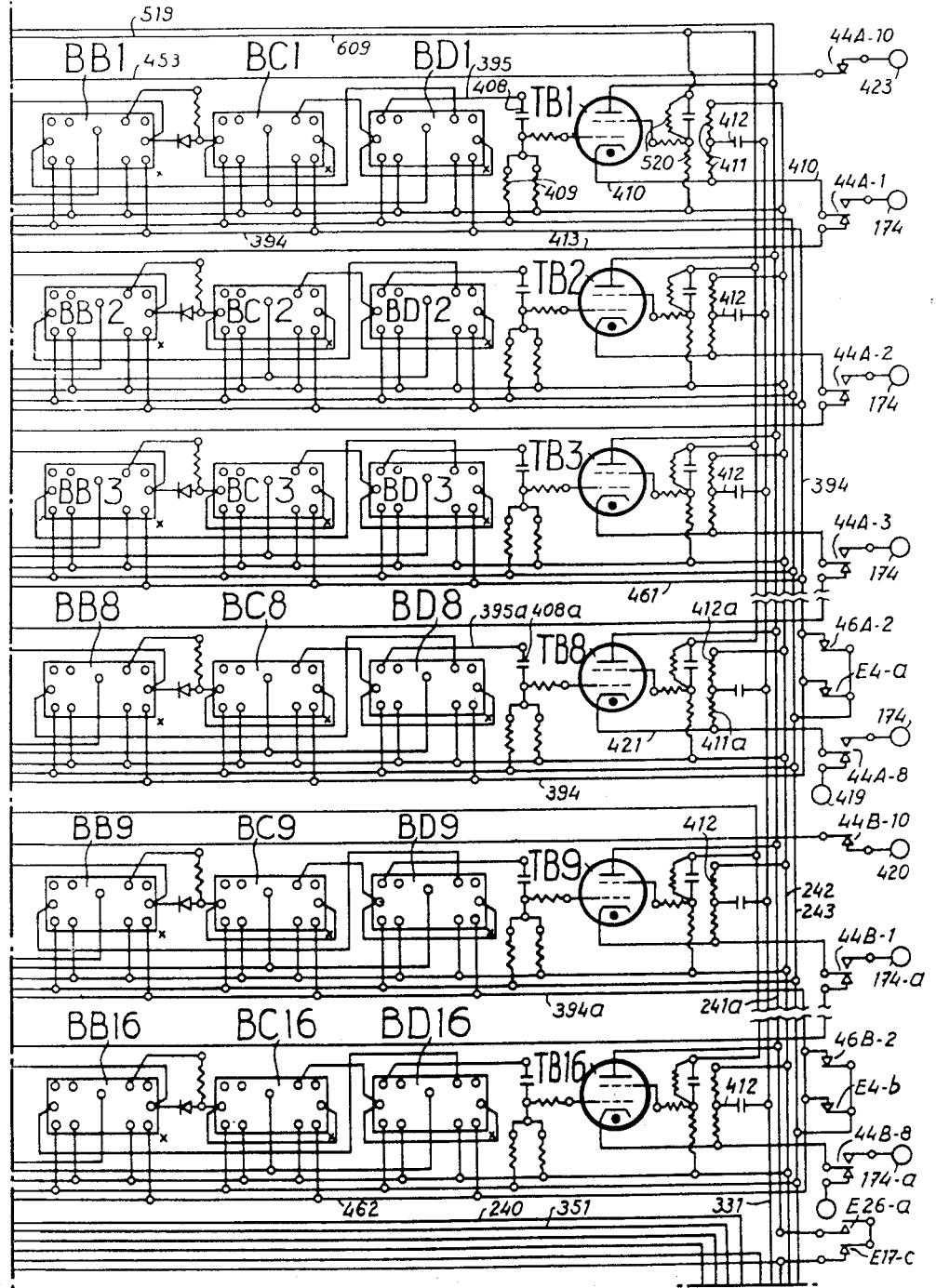
Figure 3G:
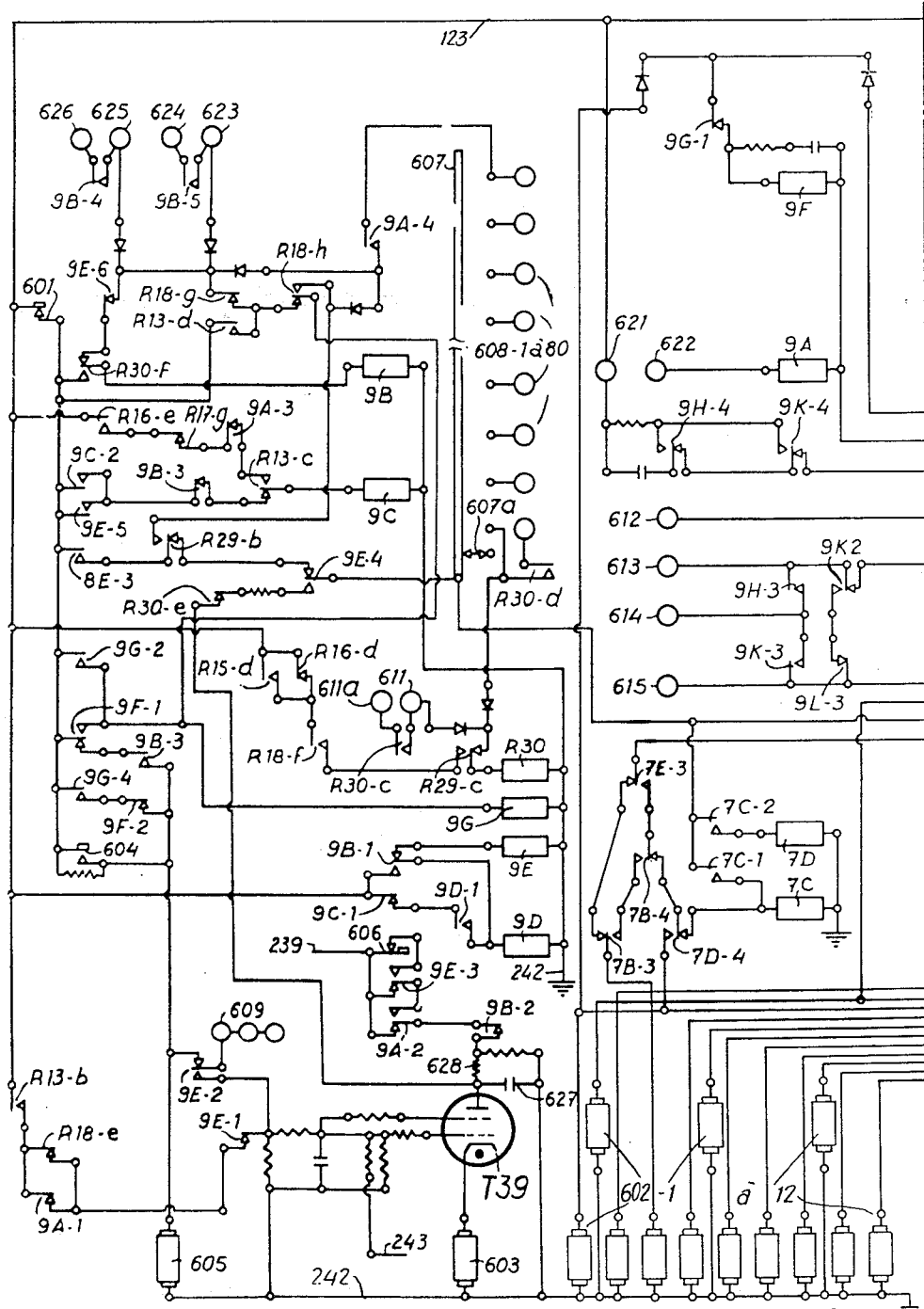
Figure 3G:
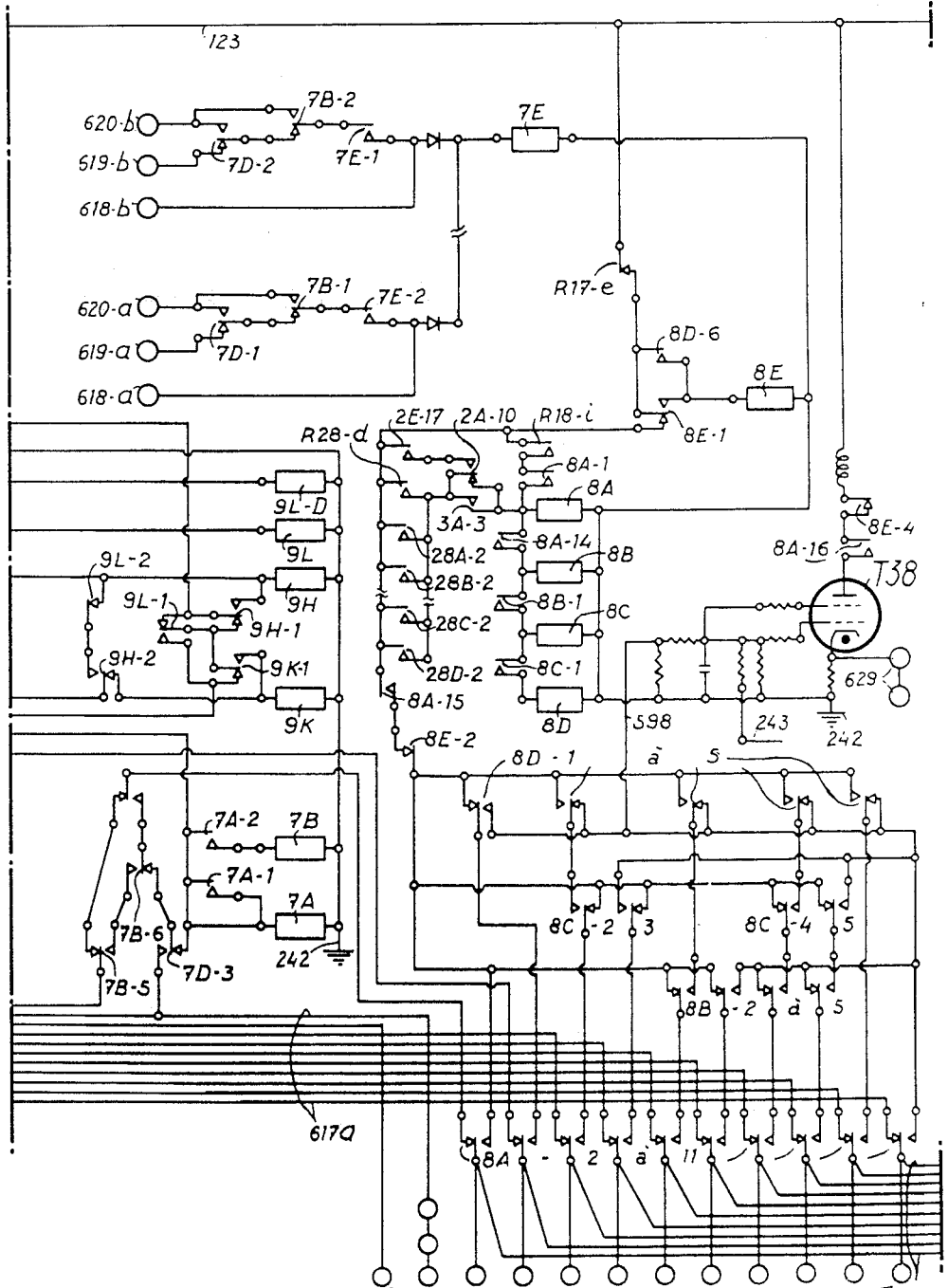
Figure 3H:
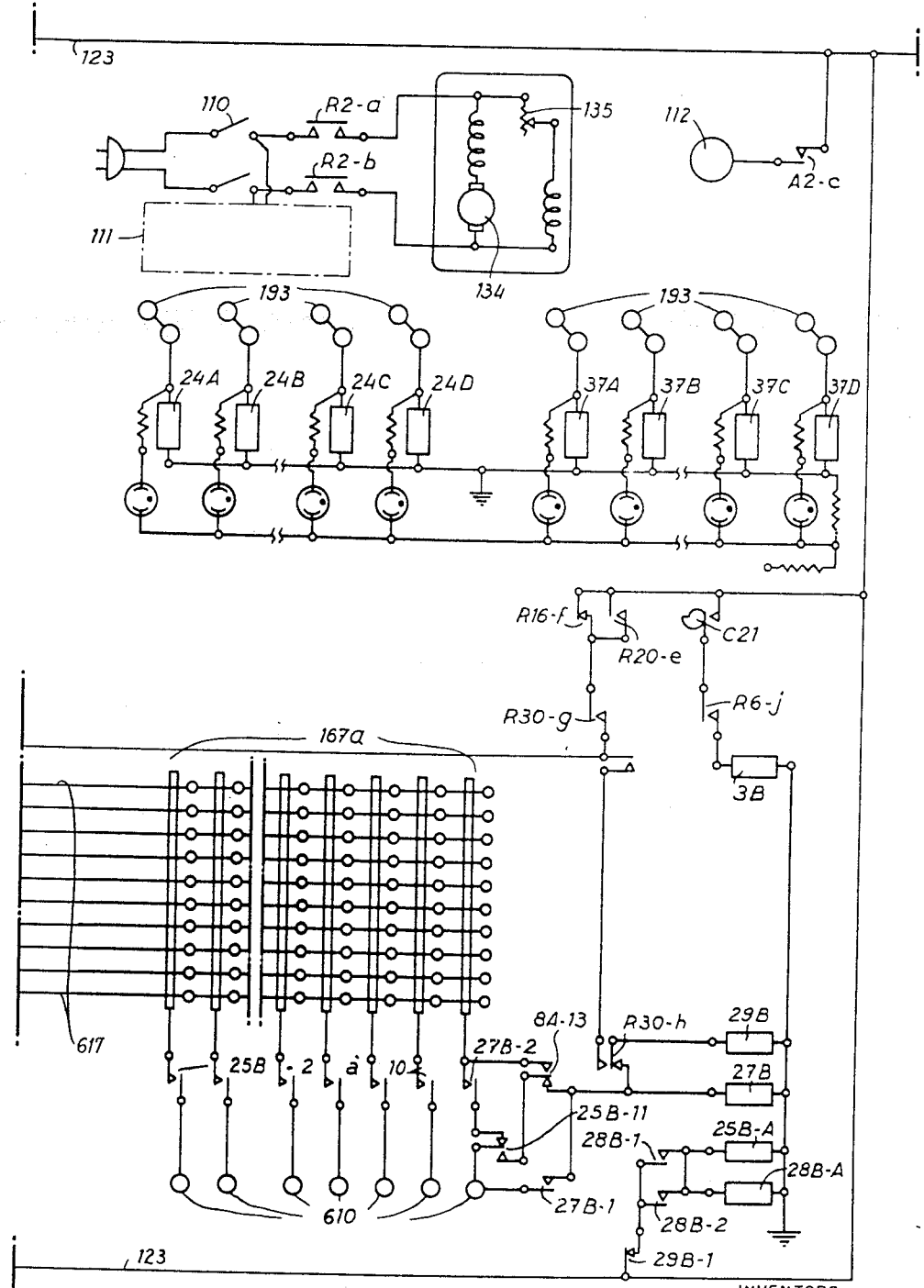
Figure 3I:
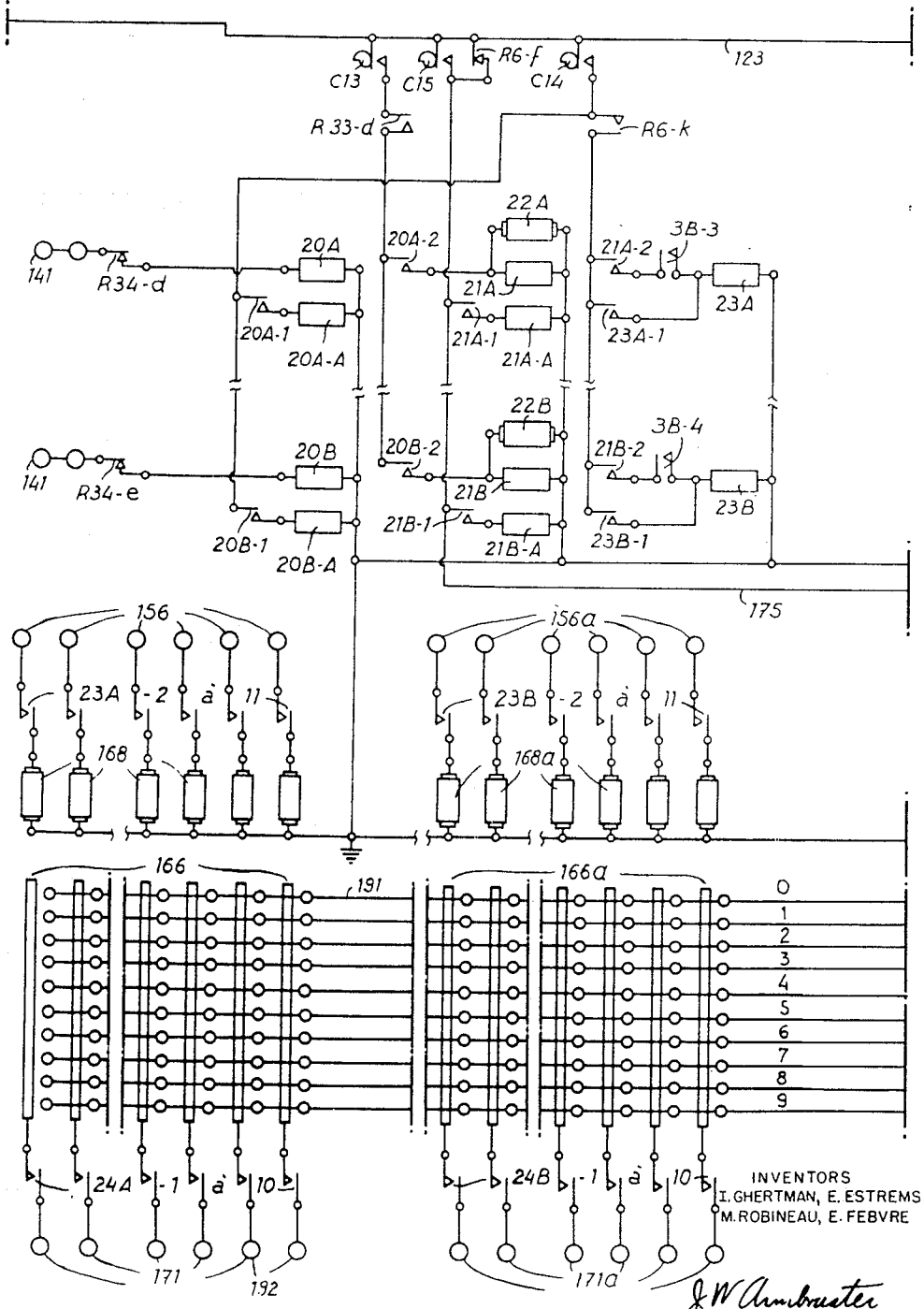
Figure 3I:
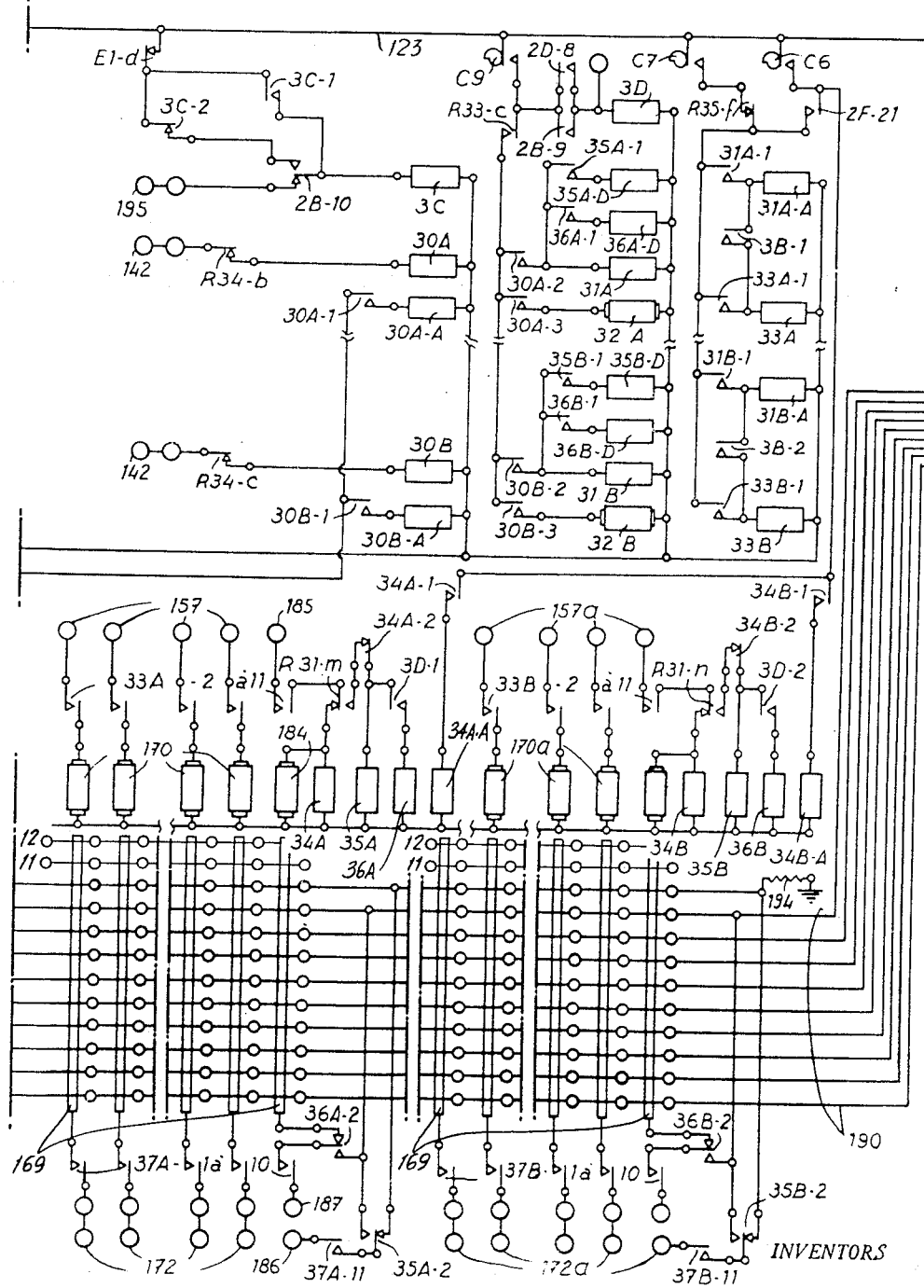
Figure 3J:
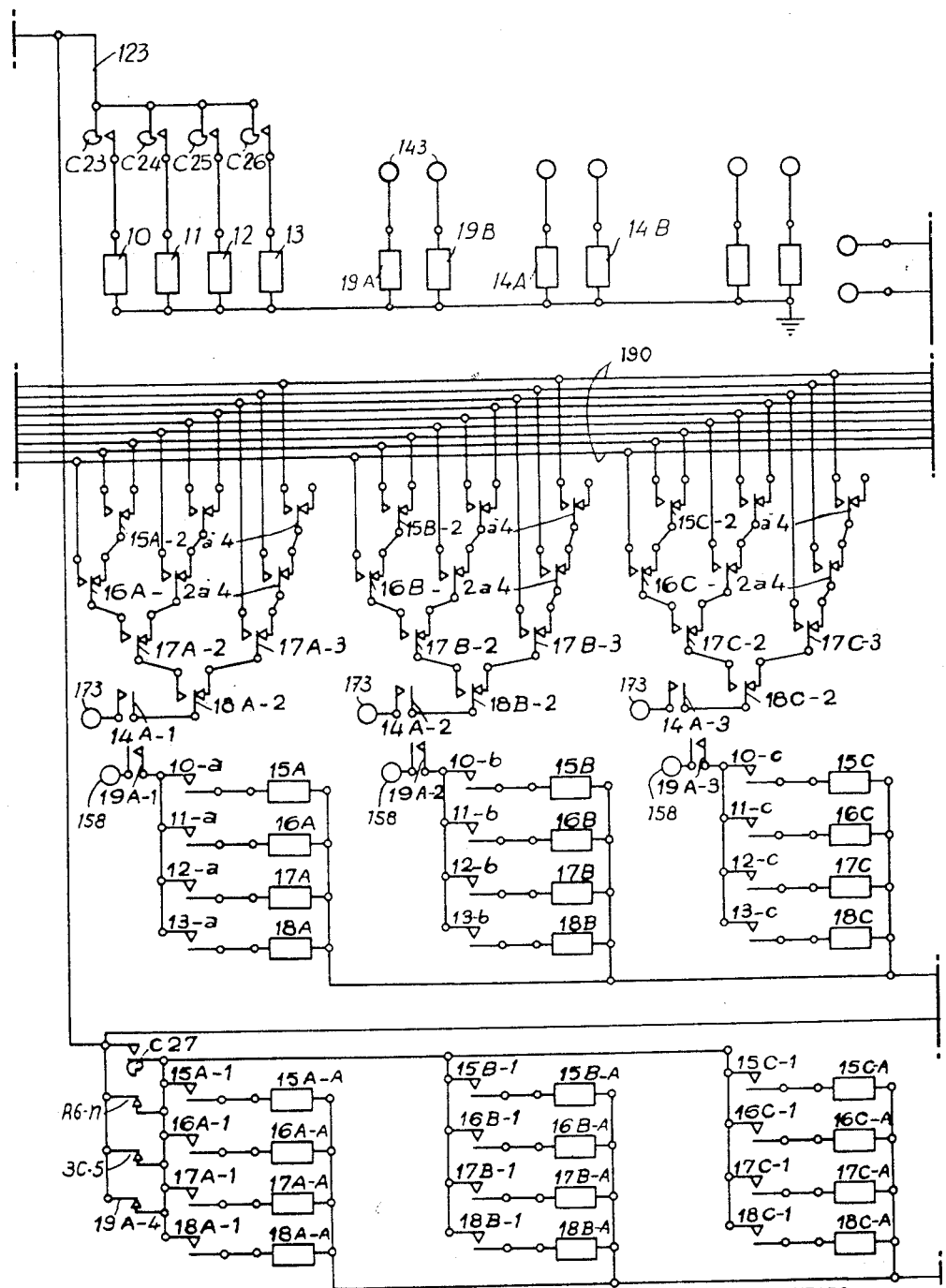
Figure 3J:
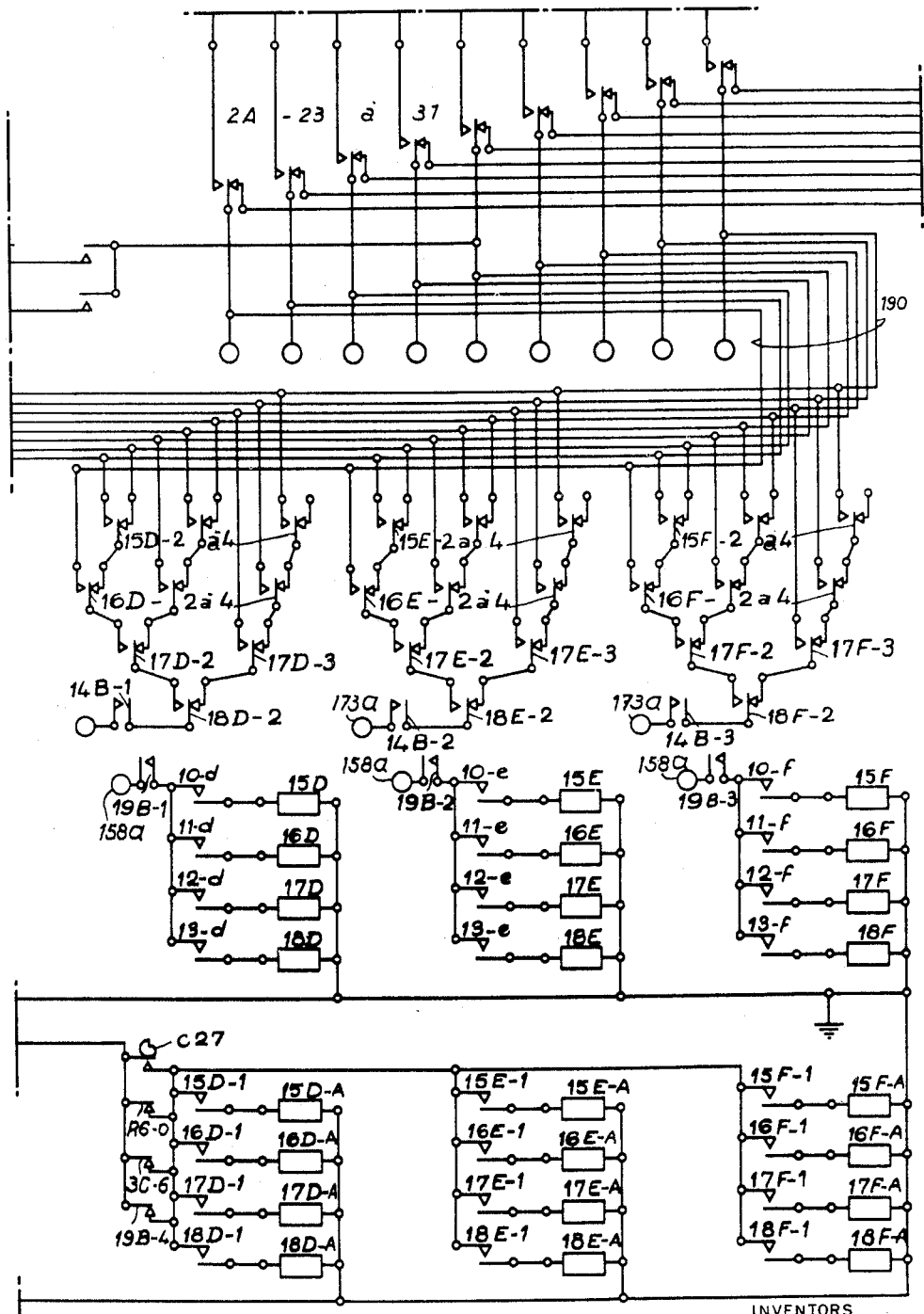
Figure 3K:
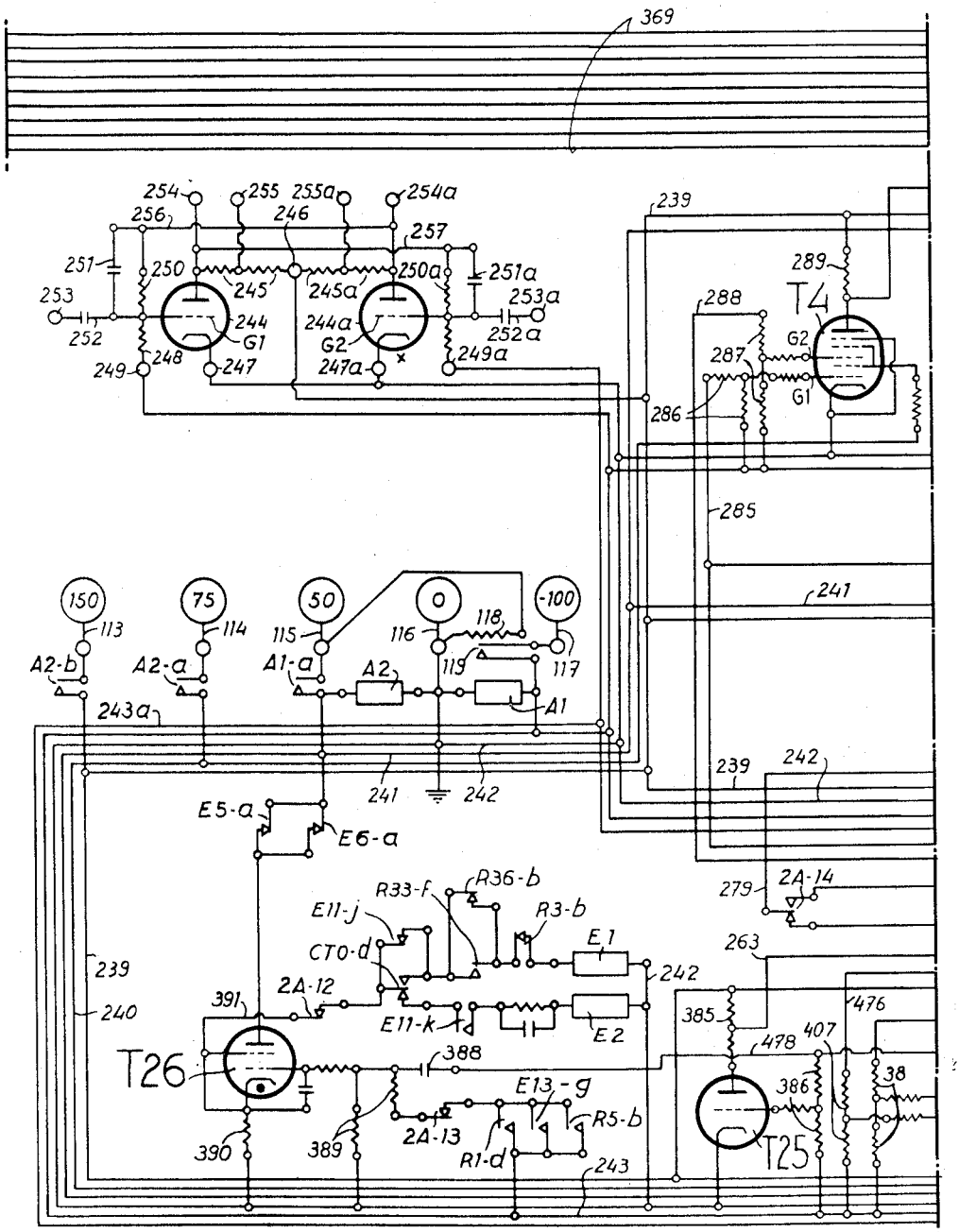
Figure 3K:
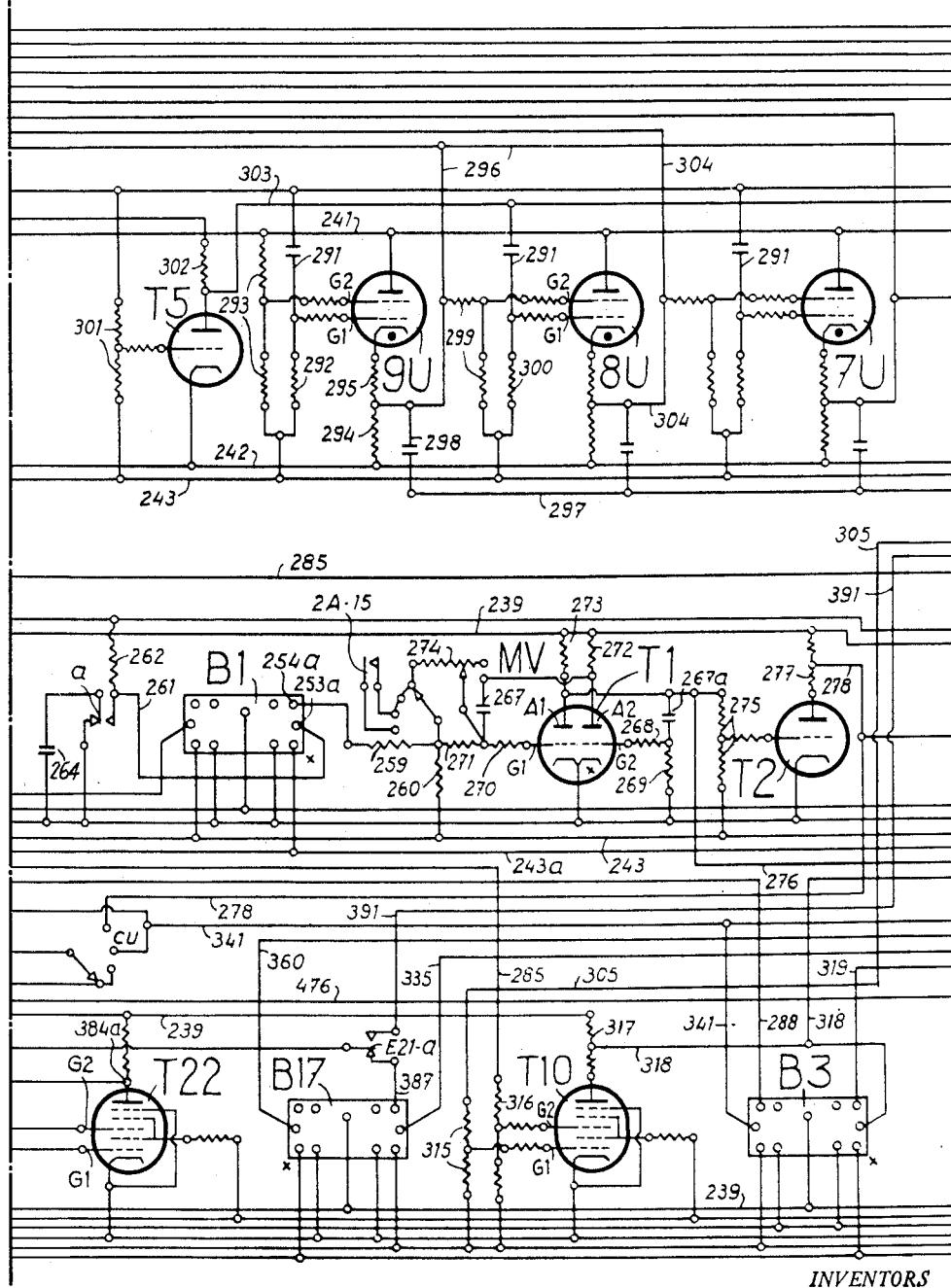
Figure 31:
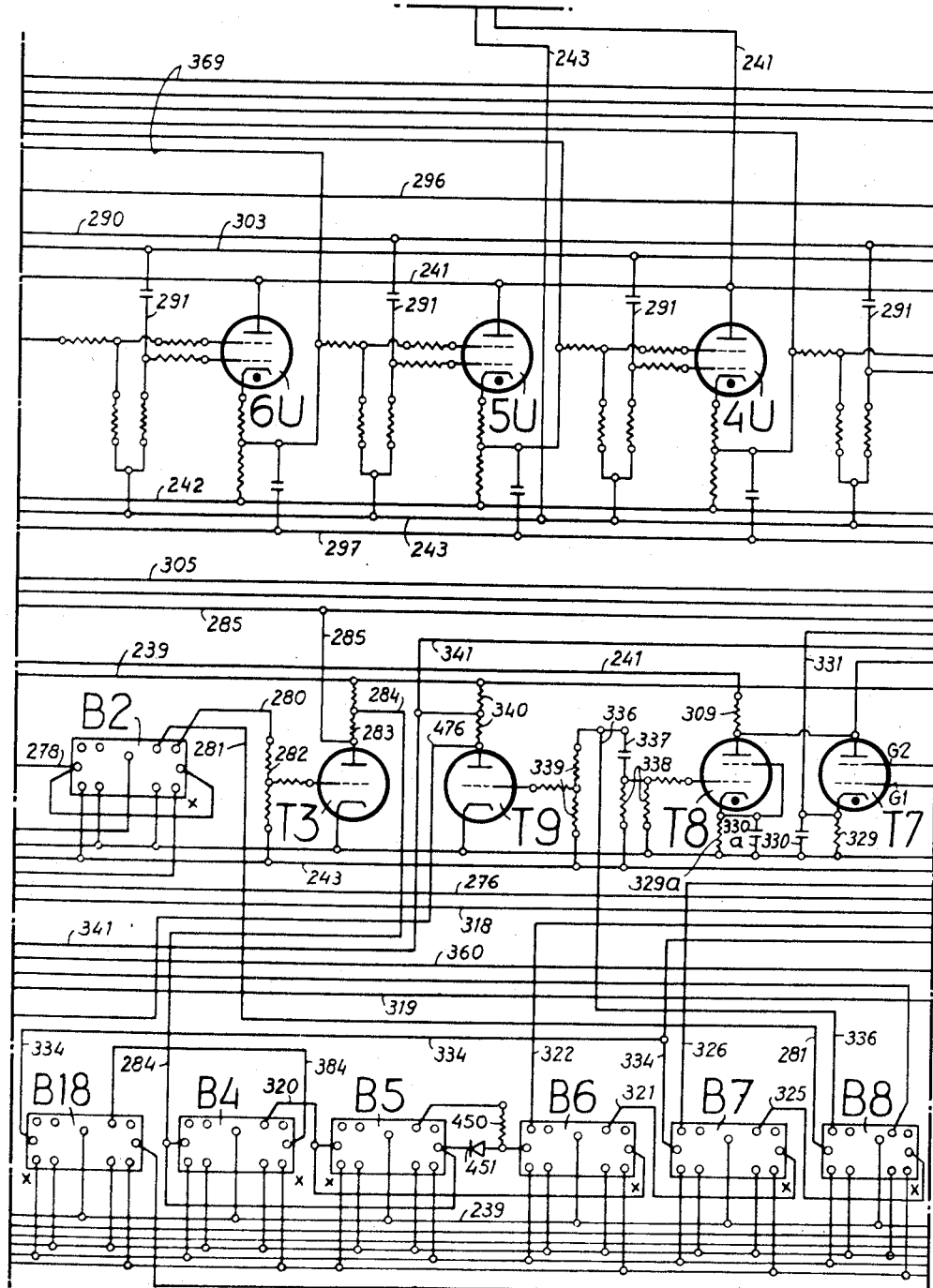
Figure 311:
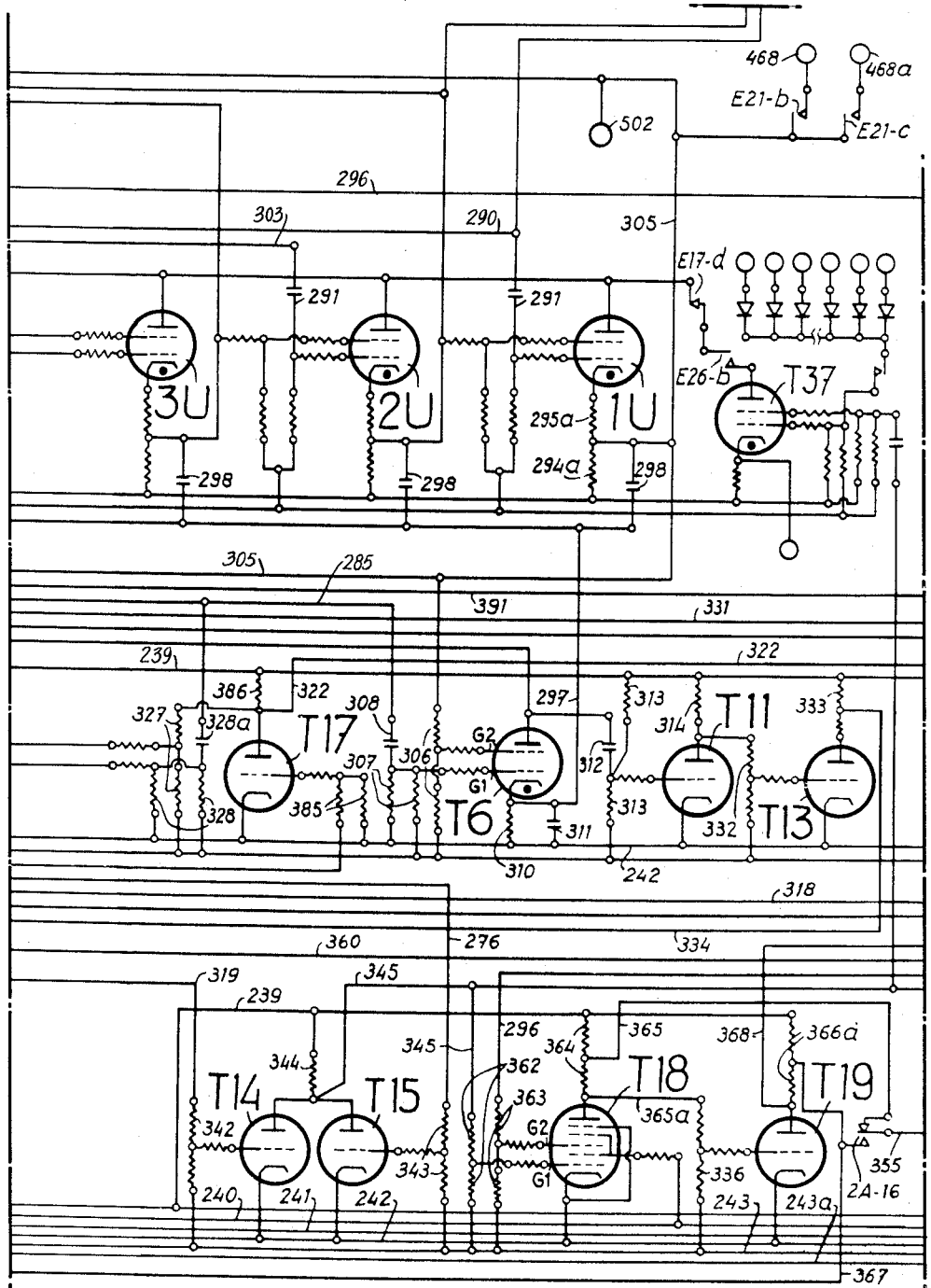

A fifth line, referred to as 242, is shown also at Figs. 3k, 3–l, 3m and 3f. It is connected to the ground of the machine and to terminal 116, the potential of which is zero. In that way, the elements of circuits connected to this line are brought to this same potential.

Relay A2 comprises also contact A2–d (Fig. 3m), the purpose of which will be noted hereinafter, and a contact A2–c (Fig. 3h), the purpose of which is to ensure the connection of terminal 112 with line 123.

By referring to Fig. 3k, it will be noted that contacts R1–d, E13–g and R5–b are normally opened (when the machine is started). In this condition, the circuit element formed by resistors 389 and contact 2A–13 has the potential of ground line 242. It is the same for the control-grids of tube T26. This tube is then made conductive, so that the following circuit can be completed having for its purpose the energization of relay E1: terminal 115, contact A1–a closed, line 241, contacts E5–a and E6–a (n/c), thyratron T26, line 391, contacts 2A–12, E11–j, R36–b, R3–b (n/c), coil of relay E1, this circuit ending on terminal 116 through ground line 242.

Contact E1–a (Fig. 3d) is then transferred, so that another circuit is immediately set from line 123, relay E1–a transferred, the purpose of line 127 being the energization of relays E3 and E4. Contact E3–a is thus closed, so that another circuit is set up also by contact E3–a and contacts E11–i, E18–b, E17–b, E21–o, E8–b, E9–b, E22–a, E23–a (n/c), causing the energization of relay E5. Contact E5–a (Fig. 3k) opens, but no effect results at the moment, because relay E6 has not picked up.

It has been mentioned that rack 99 is normally in the last column position, mainly when the machine is stopped (refer to Fig. 2); contact 128 (Fig. 3a) is then closed, which leads also to the energization of relay R13.

2. Card feed operation

The card feed is initiated by a manual operation of start-switch 130 (Fig. 3a). As a preliminary, cards must be placed in magazine 101 of the feed mechanism (see Fig. 1). Contact 129 (Fig. 3a) is then closed, leading to the energization of relay R4. This relay controls by the presence of cards in the feed mechanism stacker; it is held through its contact R4–a and remains picked up as long as there are cards in this magazine.

The manual action of start-switch 130 sets the following circuit: line 123, contacts 131, switch 132, contact R24–b (n/c), stop switch 133, switch 130 closed for the moment, coil of relay R1, ground line 242. A holding circuit is immediately completed through contact R1–a, contact R4–d presently closed and contact 120. Contacts 131 inserted in the energization and holding circuit of relay R1 assure the correct position of certain outer parts of the machine and particularly, the correct installation of the connection panel and of certain protective covers. They prevent the start or cause a stop if they happen to be opened (for example, if the removal of the connection panel is desired). They can be cut off from circuit by the operation of switch 132. Contact R24–b inserted also in the energization and holding circuit of relay R1 controls the correct development of certain functions of the machine. It opens and causes a stop in case a card should be incorrectly fed or in case an error of calculation should be detected. Then it is possible to withdraw and check the card, which caused the stop. Contacts R7–e, R12–e, R18–c, 2F–11 and R8–f arranged in parallel with contact R4–d help to maintain the operation of the machine until the operations related to the last card are entirely completed. It will be also noted that the preceding contacts are in series with contact R22–b designed to cause an automatic stop when the last card in the feed magazine has left it and when this card is not the last of the work to be performed.

When an automatic stop is wanted after the feed of the last card, it is necessary to set a plug wire connection between hubs 121 and 122. Thus a circuit is completed as soon as contact R4–e is closed, the purpose of which is the energization of relay R22. This circuit first goes through contact R22–a (n/c), then through resistor 124. Relay R22 is held longer by its contact R22–a, and contact R1–b is closed when relay R1 is energized. When the feed of the last card happens, contact 129 opens, leading to the drop-out of relay R4 and to the opening of contacts R4–d and R4–e. The holding circuit of relay R1 is thus cut off, leading to the drop-out of this relay, to the opening of contact R1–b and to the drop-out of relay R22. The presence also of contact 120 will be noted, the purpose of which is to cause the stop when the maximum capacity of the card receiving stacker is reached.

Let us go back to the operations following the first energization of relay R1 when switch 130 is manually operated. Contact R1–e being closed, relay R2 picks up in its turn and remains energized as long as relay R1 is energized, and further when any of contacts 2A–1, 2F–12, R8–g and 2B–4 happens to be closed. The purpose of these contacts is to relay the drop-out of relay R2 in case of stop, so as to allow the completion of the data registering cycles.

Relay R2 operates its contacts R2–a and R2–b (Fig. 3hh) and thus causes the stop of motor 134 designed for the drive of the machine mechanical drive. Rheostat 135 enables adjustment of the speed of this motor to the required value.

It has been noted that contact E1–a (Fig. 3d) was transferred when relay E1 (Fig. 3k) was energized. Contact R1–f (Fig. 3d) being then closed, a circuit is made through wire 127, contacts E12–c, E11–d (n/c), contact R1–f and contacts R23–f and R24–f (n/c) which energizes relay R37. This relay holds through contact R37–a. Another circuit is set up through contacts R10–c, 42A–b, 42B–b (Fig. 3dd), 42C–b, 42D–b, 42E–b, R12–g, R8–h, R23–g, 2B–7 (n/c), the purpose of which is the energization of relay 2F. The energization of this last relay controls many of the functions associated with the card feed.

Contact 2F–3 (Fig. 3d) now being closed, another circuit is set, through line 123, contact E12–d (n/c), contacts 2F–3 and 2F–5 (Fig. 3dd) presently closed, contact R8–i the purpose of which is the energization of relay R5. The energization of this relay checks the performance of a program at an instant. Contact R5–a closes, leading to the energization of relay E6. In parallel, a circuit is set to ensure the holding of relay 2F, through line 123, contact CT0–c (n/c), contact R5–a presently closed, line 136, contact 2F–1 and coil 2F–A.

It has been noted that relay E5 was energized, leading to the opening of contact E5–a (Fig. 3k). Relay E6 being also energized as aforesaid, contact E6–a is also opened, leading to the break of the circuit ending at relay E1. Therefore, this relay drops out and causes the return to n/c position of contact E1–a (Fig. 3d) and subsequent drop-out of relays E3, E4, E5, R37. The energizing circuit of relay 2F is also cut off. However, this relay holds through its coil 2F–A and the above outlined circuit.

Contact E1–a being back to n/c position, various circuits may be set through lines 137 and 137–a. The result is particularly the energization of relays E7, E23 and E19, the pick-up circuit of these two last relays going respectively through contacts E2–b and E20–a (n/c). Contacts E7–c and E7–e (Fig. 3dd) are now closed so that the result is again the energization of relays E11 and CT0. The pick-up circuit of this last relay is the following: line 123 (Fig. 3d), contacts E1–a and E2–b (n/c), line 138, contacts CT8–c, CT7–c, CT6–c (Fig. 3dd), CT5–c, CT4–c, CT3–c, CT2–c all in n/c position, contact E7–e closed, coil of relay CT0. Besides, contact E7–b sets provisionally (Fig. 3d) a direct connection between line 123 and line 137, this connection being effected through contact CT0–c (n/c) and contact R5–a closed.

Relay CT0 holds through its coil CT0A, its contact CT0–a and contact E5–b back to n/c position. The relay operates mainly to open its contacts CT0–b and CT0–c, resulting on the one hand in the break of the connection between line 123 and 137, and on the other hand in the dropping out of relay E6. The holding circuit of relay 2F thus goes through line 136 as already outlined, through transferred contact E7–b, and contact E1–a (n/c). Therefore, this relay will have the possibility to drop out for the next tripping of contact E1–a. Moreover, contact CT0–d causes the energization of relay E20, the opening of contact E20–a and subsequently the dropping out of relay E19.

Contacts 2F–18 to 24 being closed, Fig. 3dd, circuits may be set through these contacts and hubs 139, these circuits being also controlled by contact E1–a. The pick-up time of these circuits is shown in Fig. 9a. Hubs 139 may be connected either to hubs 140 so as to energize some of relays 42A, 42B, etc., or to hubs 143 (Fig. 3j) so as to control the setting by one of the relay-operated storage units, or also to hubs 144 or 145 (Fig. 3e) so as to control the registration in addition or subtraction in any of the electron counters. Other connections may be realized also from hubs 139 as noted hereinafter.

It has been noted that relay E7 (Fig. 3d) was energized. Therefore, contact E7–a is closed so that the following circuit may be set at the closing of the contact of cam C17 (Fig. 3bbb): line 123, contacts E1–b and E2–a (n/c), contact E7–a closed, switch 146, commutator 230–b, contact 2F–6 presently transferred, contact of cam C17, contacts R23–e, R33–e, R35–E all in n/c position, and the coil of relay R6. Relay R6 is therefore energized and leads to the following functions:

(1) Holding of relay R6 and energization of relay 2A (Figs. 3a and 3aa) at the closing of the contact of cam C6 through the circuit: line 123, contact of cam C6, contact 2F–8 transferred, contact R6–a closed, coil R6a and coil of relay 2A in parallel.

(2) Energization of relay R9 over a branch of the preceding circuit through contact 2F–9 closed and contacts R7–b and 2D–2 (n/c).

(3) Holding of relay R9 through its coil R9A, its contact R9–a and contact 2D–3 (n/c).

(4) Energization of the card feed electromagnet 148, Fig. 3aa, at the closing of the contact of cam C10, through contacts R4–b, 2F–2, R6–b presently closed.

(5) Energization of relay R8, at the closing of the contact of cam C9, through contacts R6–c and 2F–25.

(6) Holding of relay R8 through its coil R8A, its contact R8–a and the contact of cam C7.

(7) Drop out of relay R5 (Fig. 3dd) contacts 2F–5 and R8–i being both opened.

(8) Energization of relay R35 (Fig. 3b) when cam C13 makes its contact, contact R6–g being closed.

(9) Holding of relay R35 through its coil R35A, Fig. 3bbb, contact R35–a and an already noted circuit.

The energization of electromagnet 148 (Fig. 3a) causes the drive of the mechanism controlling the card feed. This mechanism is of an already known type and has been particularly described in above-mentioned U.S. Patent 2,120,228. However, it must be specified that functions relating to the card feed unit spread over two cycles of machine operation, while the properly so-called feed is performed during the second cycle. No card is as yet inserted in the machine, the first cycle of starting being an idle cycle. During the second cycle, the first card is pushed in by knives 149 (see Fig. 10) and grabbed by driving rolls 150. It runs then under brushes 152 and stops before brushes 153. The advance of the card also causes the closing of contact 151 (see Fig. 3a) and the energization of relay R7. The latter remains energized during a certain card controlled interval as shown in Fig. 9. Relays 2B and 2C (Fig. 3aa) pick up in their turn when cam C8 closes its contact, contacts R8–b and R7–a being then closed. The energization of these relays controls the associated functions when the card runs under the first row of brushes.

Contacts 2C–1 to 80 (Fig. 3c) then are closed so that circuits may be established from line 123, Fig. 3cc, the contact of cam C1 and brushes 152 to end at contacts 2C–1 to 80 and plug hubs 154. These hubs may be connected mainly: either to hubs 140 (Fig. 3d), so as to energize one of relays 42A, 42B, etc., or to hubs 155 (Fig. 3c), so as to energize any of the selectors or also to hubs 156, 156–a, 157, 157–a (Figs. 3i and 3ii) for the registration of a factor in any of the mechanical storage units, or also to hubs 158, 158–a (Fig. 3j) for the setting of a factor in one of the relay-operated storage units, or also to hubs 159 (Fig. 3ee) for the setting of a factor in the electronic storage units. Other connections may be also realized from hubs 154 and are explained hereinafter.

It has been noted that relay R1 (Fig. 3a) is energized when switch 130 is operated. Contact R1–d (Fig. 3k) is then closed, so that a circuit may be set from line 242 to line 243 through resistors 389. These resistors form a voltage divider controlling the control-grid of thyratron T26 and are proportioned so that the control-grid of this thyratron is distinctly above its cut-off point. It has been noted also that relay 2A (Fig. 3aa) is energized. Contact 2A–13 (Fig. 3k) is then opened, thus cutting off the connection existing between resistors 389 and line 243. The control-grid of tube T26 thus comes back to the potential of the ground line. Tube T26 in this condition is conductive so that a circuit is set up between lines 241 and 242 through contacts E5–a and E6–a (n/c), tube T26 and resistor 390. This results in no other effect at the moment, for contact 2A–12 is opened.

If the drop-out of relay 2A happens (refer also to Fig. 9), contacts 2A–12 and 2A–13 come back to n/c position, leading to the energization of relay E1, as already outlined. This relay closes its contacts E1–a (Fig. 3d) and E1–b (Fig. 3bbb) and again the result is:

(1) Drop-out of relays R6 and R35.
(2) Drop-out of relays E7, E11, E20, E23 and 2F (Fig. 3d).
(3) Circuit cut-off of the exciting coil of relay CT0 (Fig. 3dd).
(4) Energization of relays E3, E4 as already outlined.
(5) Energization of relay E5 as soon as contact E3–a is closed.
(6) Circuit cut-off of the holding coil of relay CT0 due to the shifting of contact E5–b.

PROGRAM UNIT

Calculations are controlled from a program unit comprising a double series of relays referred to as 42A, 42B, 42C, etc., 43A, 43B, 43C (Figs. 3d and 3dd). The first set is meant for the control of the second; they can be energized all together and later on they drop out one after the other under conditions which will be further outlined. The second set is arranged to pick one after the other in a well determined order. Moreover, this order is liable to be modified during the calculation, this modification particularly may be controlled by the very nature of the results obtained during those calculations. In the absence of particular connections to which further reference will be made, relay 43A picks up first, relay 43B the second, etc. These relays comprise contacts 43A–c to f, 43B–c connected respectively to hubs 160, 161, and from where the various controls relating to a well determined operation of calculation may be performed. Thus, hubs 160 may be used for the control of operation A×B, and then control, from hubs 161, 161a other operations of multiplication, division or transfer. Moreover, these operations develop only if the corresponding preparation relay has been energized. Thus, the program of calculation may be modified at will or automatically by energizing or not any of relays 42A, 42B, etc. Generally speaking, the program unit is arranged so that the different cycles of electronic calculation develop one after the other without any loss of time. The machine detects the exact moment when a calculation is completed and immediately initiates the succession of operations necessary to the next calculation.

Relays 42A, 42B, etc., may be energized for example through proper connections joining together hubs 139 and among hubs 140 those corresponding to certain of these relays. They have a double possibility of holding, the latter being performed either through coil 42A–A, contact 42A–a and contact 43A–b (n/c), or through the preceding circuit and contact E19–a (n/c). This holding circuit goes on through contact R4–j or also through one of contacts R12–h, 2D–7 and R7–f when these contacts are closed.

Suppose for example that relays 42A, 42B, 42C have all picked up. Contact E1–a being again transferred, a circuit is set up, as already described, resulting in energization of relays R37 and 43A, Fig. 3d. The pick-up circuit of this last relay goes through contact R10–c (n/c) and contact 42A–b, which is presently transferred. It may be noted that the transfer of this last contact keeps the preceding circuit from going on to contact 42B–b and to the following contacts.

When relay 43A picks up, contact 43A–b is transferred and cuts off one of the holding possibilities of relay 42A. In a parallel way, a circuit is set up through contact 43A–b transferred, line 159, contacts R3–a and 2F–5 (n/c), resulting in energization of relay R5. A holding possibility of relay 43A exists then through coil 43A–A, contact 43A–a, line 136, contact R5–a closed and one of contacts E5–b transferred or CT0–c (n/c).

In a parallel way, energization of relay E1 leads to the functions already described, namely:

(1) Energization of relays E3 and E4.
(2) Energization of relay E5, due to the closing of contact E3–a.
(3) Drop-out of relay CT0.
(4) Then, energization of relay E6, after the return to n/c position of contact CT0–b.

Contacts E5–a and E6–a (Fig. 3k) opened, lead to the de-energization of relay E1 and subsequently to the return to n/c position of contacts E1–a and E1–b (Figs. 3d and 3bbb), as already outlined.

The circuit of relay 43A is then cut off and it is the same for the circuits leading to relays E3, E4, E5 and R37. The return to n/c position of contact E1–a (Fig. 3d) leads to the functions already described, namely:

(1) Energization of relays E7, E23, 219.
(2) Drop-out of relay 42A due to the opening of contact E19a.
(3) Transfer of contact E7–b, thus preparing the control of the holding of relay 43A by contact E1–a.
(4) Energization and holding of relay CT0 as already outlined (it will be supposed at the moment that relays CT1 to CT8 are not energized).

There is also brought about the opening of contacts CT0–b and CT0–c, the drop-out of relay E6, the energization of relay E20, the latter leading, in its turn, to the dropout of relay E19. In parallel, a circuit may be set up through wires 137 and 137a; contacts 43A–c to f and hubs 160. Then impulses are available on hubs 160 from where the various controls relating to the realization of a predetermined calculation may be performed (multiplication, division or transfer for example). Other circuits are set up through line 123 (Fig. 3bbb) contacts E1–b, E2–a (n/c), contact E7–a closed, switch 146, commutator 230b, contacts 2F–6, 3C–3, R6–e, R35–b, resulting in the energization of relay E8. This relay closes, in its turn, its contact E8–a, leading to the energization of relay E9. Contact E9–a (Fig. 3k) is transferred, initiating a cycle of calculation as will be explained hereinafter.

It should be explained now that the end of a calculation is marked by a positive impulse coming to capacitor 388. The purpose of this impulse is to set the control grid of thyratron T26 above its cut-off point. Thus, this tube is made conductive, leading to the energization of relay E1 as already outlined. The energization of this relay follows from the completion of the calculations controlled from the first stage of program. It initiates immediately the cycle of operations shifting to the next stage of program.

Contact E1–a (Fig. 3d) is again transferred, leading to the de-energization of all the relays connected to this contact normally closed. In particular, it has been seen that relay 43A was held through contact E1–a and line 136, contact E7–b transferred and line 147. The transfer of contact E1–a consequently causes the drop-out of relay 43A.

It can be noted that a circuit is set through contact E1–a transferred, line 127, and contact E12–c to cause the energization of relay R37 and 43B, contact 42A–B being maintained in n/c position owing to the drop-out of relay 42A while contact 42B–b is transferred. This relay holds in a similar way to that of relay 43A, such holding being ensured through its coil 43B–A, its contact 43B–a and the previously described circuit. Relays E3, E4, and E5 are then picked up, as previously described, the energization of relay E5 leading particularly to the drop-out of relay CT0 and to the energization of relay E6. The energization of relay E6 leads, in its turn, to the drop-out of relay E1 and to the subsequent energization of relays E7 and E19. This results mainly in the drop-out of relay 42B, contacts E19–b and 43B–b being both opened.

Impulses are then available on hubs 161 with which various controls relating to the realization of a second calculation may be performed. The latter may be either a multiplication, or a division, or a transfer. Moreover, it can be noted that this second calculation succeeds to the first without any loss of time, the various relays involved in the circuits controlling each other.

From the foregoing, it is noted that the successive beats of contact E1–a cause successively the energization of relays 43A, 43B, 43C, etc., the joint energization of each of these relays with that of relay E19 causing the successive de-energization of relays 42A, 42B, 42C, etc. In a parallel way, these impulses are successively available on hubs 160, 161 and 161a, etc., thus effecting the whole of the controls relating to the realization of a predetermined program of calculation.

All this is revealed more clearly in Fig. 9a which, as already explained, shows how certain circuits are spaced out in time. Reading from left to right and from top to bottom, note can be taken principally of:

The successive ionization of thyratron T26.
The successive energizations of relays E1, E3, E5, E6, as well as those other relays so far mentioned.

Fig. 9a shows also the spacing out in time of the impulses available on hubs 139, 160, 161 and 161a (refer also to Figs. 3d and 3dd) and how this spacing is set up with respect to the mechanical cycles.

The operations related to the run of any card comprise a read-out cycle, in a way materialized by impulses 139 and a certain number of program stages, which is variable according to the nature of work to be performed. In the case of Fig. 9a, the number of program stages provided for is three (impulses at 160, 161 and 161a) and it can be noted that an impulse at 139 begins stepping again from the end of one program.

However, in referring to Fig. 9b, it can be noted that an idle time interval appears sometimes between the last program and the next read-out cycle. This is made necessary to allow the realization of certain auxiliary functions. Anyway, the calculation time is essentially variable, so that the end of the calculation may happen at any moment. On the other hand, the read-out cycle is under control of cams C17 (Fig. 3bbb) and C10 (Fig. 3a) controlling the energization of relay R6 and of electromagnet 148. In these conditions, feed functions can start again only when these cams close their contacts.

By referring to Fig. 9a, it can be noted also that relays 42A, 42B, 42C pick up in synchronism with impulses 139, as shown by the dotted reference line 125. This is the case when these relays are energized through connections joining together hubs 139 and 140 (see Fig. 3d). It can be verified also that the energization of relay 43A is accompanied by the drop-out of relay 42A, that the energization of relay 43B is accompanied by the drop-out of relay 42B and that the energization of relay 43C, at last, is accompanied by the drop-out of relay 42C.

By referring to Figs. 3d and 3dd it can be noted that 5 program stages have been shown (relays 42A to 42E and 43A to 43E), but it is obvious that the machine may comprise more of them. Besides, several program stages may develop simultaneously, either if hubs 160 are in an insufficient number (in the case, for example, where 6 separated controls must be performed), or if it is wanted to perform simultaneously and optionally two different programs. In case the simultaneous performance of stages 1 and 2 should be wanted, for example, it is necessary to energize simultaneously relays 42A and 42B and also to set a connection between hubs 179 and 179a. A circuit then may be set up as already described from contact E1–a transferred (Fig. 3d) resulting in the energization of relay 43A. Contacts 42A–c and 42B–c being closed, a circuit may be set from contact 42A–b through contact 42A–c, hub 179, the connection leading to hub 179a, contact 42B–c, contact 42B–b transferred, and the coil of relay 43B. Relays 43A and 43B thus are energized in parallel and hold in the way already described through their coils 43A–A and 43B–A, contacts 43A–a and 43B–a and line 136.

In parallel, contacts 43A–a and 43B–b are both transferred, initiating the simultaneous drop-out of relays 42A and 42B. The return to n/c position of contact E1–a causes, as it has been seen, the energization of relay E19. Contacts E–19a and E19–b open, leading to the simultaneous drop-out of relays 42A and 42B. Relays 43A and 43B will also drop out themselves at the next tripping of contact E1–a. Previously, contacts 43A–c to f and 43B–c to f happen to close simultaneously, so that 8 various circuits may be set up from hubs 160 and 161.

It is obvious also that it is possible to energize either relay 42A, or relay 42B, or both at the same time, so that the first stage may be realized in three different manners, the first corresponding to the energization of relay 43A alone, the second corresponding to the energization of relay 43B alone, the third corresponding to the simultaneous energization of relays 43A and 43B.

The program unit now described also allows the flexible complete change of a same program, program 1, for example. In this case, a connection must be set from one of hubs 160 to that of hubs 140 corresponding to relay 42A.

By referring to Fig. 9a, it can be noted that relay E19 drops out a little before the impulses of relay 43A are cut off. Under such conditions contact E19–a (Fig. 3d) comes back to n/c position. Therefore, a holding circuit may be set for relay 42A during the short moment when the impulses of relay 43A are continued. Later on, the complete change of the first program stage may be countered by interruption of the connection set from one of hubs 160 to relay 42A.

The program unit now described can also perform a back-step and reversal or a complete change of the same series of steps of a program. Relay 42A may be energized, for example, on the one hand, from hubs 139 and, on the other hand, from hubs 161, relay 42B itself being energized from hubs 139. In this case, the energization of relay 42A causes a first stage of the program, the energization of relay 42B causes a second stage of program, while the connection set from one of hubs 161 to relays 42A causes a complete change of the first stage of program.

It is quite obvious that the complete change of two or several stages of program may be caused in case these stages should be controlled by an impulse from the 5th or from the 10th stage of program.

If desired, all the controls of program stages may also be cancelled and replaced by others. In this case, it is enough to set a connection from any impulse supply to hubs 162. This impulse supply may be, for example, an impulse of a negative balance of an account coming from an electronic counter, as it will be seen later on. In this case, relay E12 picks up and holds through its coil E12–A, its contact E12–a and contact E14–a (n/c). Contact E12–d opens, thus causing the drop-out of all the program control relays which should happen to be still energized. In parallel way, contact E12–c prevents a new stage of program.

When contact E1–a is transferred, a circuit is set up through contact E12–b closed, resulting in the energization of relay E13. Contacts E13–c to f then are closed, so that impulses are available on hubs 163. These impulses may be directed to certain of jacks 140. Relay E13 closes its contact E13–a meant for its holding, and contact E13–b is also closed. Relay E14 then picks up, leading to the drop-out of relay E12. Contacts E12–d and E12–c thus come back to n/c position resulting in the reset of the holding circuit of the program control relays. Moreover, the new program may develop itself, due to the return to n/c position of contact E12–c. It will result principally in the return to n/c position of contact E1–a and in the drop-out of relays E13 and E14.

MULTIPLICATION AND DIVISION CIRCUIT COORDINATING DEVICES

The coordination of the multiplication and division circuits is realized in a way about to be described; by relays CT1 to CT8 (Figs. 3d and 3dd), by relays SC1, SC2 and SC4 (Figs. 3e and 3ee) and by three sets of transfer contacts associated with the latter relays. These contacts shift the multiplication and division circuits by 1, 2 and 4 columns, respectively. Intermediate and higher shifts may be obtained by simultaneous action of combined sets of contacts. In that way, all the connections required for multiplying any number by a multiplier having a maximum of 8 digits, may be performed. In this case, relay CT1 controls the multiplication by the first right-hand digit of the multiplier, while relay CT8 controls the multiplication by its first left-hand digit (viz. the 8th digit from the right). Multiplication and division circuits are arranged so that relay CT1 does not cause any shift to these circuits, while relay CT8 controls the maximum shift, but it is quite obvious that the contrary could have been done. On the other hand, the capacity of the device thus realized may be increased by adjunction of additional transfer contacts.

Multiplication and division circuits are also arranged so that the multiplication starts from the left. In this way, the operational process is common for both multiplication and division. In general, multiplication is initiated by energizing those relays CT1 to CT8, corresponding to the highest order of the multiplier. This is obtained in the most general case of a multiplier having the maximum capacity, by an appropriate plug connection, for example, one of the hubs 160 (Fig. 3d) and hub 233. A circuit then may be set, as soon as contacts 43A–c to f are closed, resulting in the energization of relay CT8. The circuit is as follows: line 123, contact E1–a (n/c), lines 137 and 137a, one of contacts 43A–c to f, corresponding hub 160, a plug wire to hub 233, contact E11–a (n/c) and the coil of relay CT8. The energization of relay CT8 (or of one of relays CT1 to CT7, in case one of these relays should have been selectively energized), is concomitant with the energization of relay E7. Later on, as it has been seen, the energization of relay E11 occurs. Contacts E11–a to h are then opened, so that no new circuit can be completed for the energization of one of relays CT1 to CT8.

Relay CT8, energized as it has just been noted, holds on line 138 through its contact CT8–a. It transfers its contact CT8–c, thus causing the energization of relay CT7. Moreover it prevents relay E22 from energization, contact CT8–b opening at the same time as contact E7–c closes. In parallel way the energization of relay CT7 causes the transfer of contact CT7–b and thus causes a break in the circuit leading to relay E22. Two possibilities of holding exist for relay CT7; the first through the circuit: line 123, contact E1–a and E2–b (n/c), line 138, contact CT7–a closed and coil CT7; the second through circuit: line 123, contact E1–a (n/c), line 137, contact E7–c closed, line 232, contacts CT1–b and CT6–b (n/c), contact CT7–b transferred, coil CT7A. Generally speaking it is the same for relays CT1 to CT6.

The energization of relay CT8 also causes the transfer or closing of contacts CT8–d, e, f (Fig. 3e) and the energization of relays SC1, SC2 and SC4. The latter effect is produced through the circuit: line 123, contacts E1–f and E2–c (n/c) and, on the one hand, contact CT8–d transferred and the coil of relay SC4, on the other hand, contact CT8–e transferred and the coil of relay SC2, and, in the third place, contact CT8–f closed and the coil of relay SC1. The transfer of contacts CT7–e and CT7–f is ineffective, due to the fact that these contacts are in parallel with contacts CT8–d and CT8–e. A shift toward the lefthand side of seven columns is thus introduced into the input circuits of the electronic counters. Then 10 successive cycles of addition occur as it will be described later, followed by the energization of relay E2 (Fig. 3k) at the end of the 10th cycle. Contact CT0–d is then in n/c position, while contacts E11–k and E11–j are respectively closed and opened. Contacts E2–a, E2–b and E2–c (refer to Figs. 3bbb, 3d and 3e) are then opened or transferred. This results in energization of relay E17 and, on the other hand, in the interruption of all the circuits controlled by these contacts in n/c position. There then follows the deenergization of relays E8 and E9 (Fig. 3bbb), that of relay CT8 (Fig. 3d), and that of relays SC1, SC2, SC4 (Fig. 3e). On the other hand, relays 43A, E7, E11, and CT7 remain picked up (Fig. 3d). Concerning the latter, its holding is always ensured through the circuit leading to its coil CT7A.

The energization of relay E17 causes the closing of contacts E17–a and E17–b and the energization of relay E5. The latter opens its contact E5–a (Fig. 3k) and causes the drop-out of relay E2. It can be noted that contact E6–a is then opened, relay E6 (Fig. 3d) remaining picked up, due to the fact that contacts CT0–b and c are in n/c position and that contact R5–a is closed. The drop-out of relay E2 causes the return to n/c position of contacts E2–a (Fig. 3bbb), E2–b (Fig. 3d) and E2–c (Fig. 3e). Line 138 thus is again under voltage, so that a circuit is completed first through contact CT7–a and the coil of relay CT7, giving thus a new holding action to this relay. Another circuit is set, through contact CT8–c back to n/c position and contact CT7–c transferred, resulting in the energization of relay CT6. This relay holds, on the one hand, through its contact CT6–a and, on the other hand, through the circuit leading to its holding coil CT6A. The circuit leading to coil CT7A is thus cut off, which prepares the drop-out of relay CT7. There also occurs:

(7) The energization of relays SC2 and SC4 (Fig. 3e), the transfer of contacts CT7–e and CT7–f being at present effective (since contacts CT8–d and CT8–e are back to n/c position).

(2) The energization of relay E8 followed immediately by that of relay E9 (Fig. 3bbb).

The energization of relays SC2 and SC4 (Fig. 3e) causes now a shift of 6 columns to the registering circuits of the electronic counters. Again, 10 cycles of addition occur, followed as before by the energization of relay E2 (Fig. 3k) and by the opening or transfer of contacts E2–a, b and c (refer mainly to Fig. 3d). Relay CT7 then drops out, at the same time as relays E8, E9 (Fig. 3bbb), SC2 and SC4 (Fig. 3e).

Similar operations recur for each transfer of contact E2–b (Fig. 3d) so that the successive energization of relays CT5, CT4, CT3, CT2 and CT1 is obtained. When the latter is energized a circuit is set through contact E2–b (n/c), contacts CT8–c, CT7–c . . . CT2–c (Fig. 3dd) all in n/c position, and through contact E7–e closed, resulting in the energization of relay CT0. The latter controls as an indication of completion of all the combinations of the column shift device. It holds through its coil CT0–A (Fig. 3d), its contact CTC–a and contact E5–b (n/c). It opens its contact CT0–b and thus causes the drop-out of relay E6 and the return to n/c position of contact E6–a (Fig. 3k). It trips also its contact CT0–d, so that the circuit coming from thyratron T26 is directed to relay E1. Ten cycles of successive additions occur again, as it will be further described; however, these cycles are now followed by the energization of relay E1. The consequence is the tripping of contact E1–a (Fig. 3d) and the various functions related to the tripping of this contact (for example, the drop-out of relay 43A, the energization of relay 43B, etc.). A new multiplication or division may be then controlled by renewed energization of relay CT8.

The whole series of the described operations occurs again (successive energization of relays CT8, CT7 . . . CT2, CT1, and of the column shift relays associated with these relays), causing a renewed energization of relay CT0. Then occurs the drop-out of relay 43B, in the same condition as that of relay 43A, and later on the energization of relay 43C in the same condition as that of relay 43B.

The energization of the latter is followed by a new cycle of electronic calculations. This cycle ends, as the preceding ones, with the energization of relay CT0, which causes the drop-out of relay 43C. Other relays, such as 43D, 43E, . . . may also pick up if necessary, initiating again other cycles of electronic calculation.

Various arrangements serve to improve the operational flexibility of the machine. The number of successive addition cycles may be limited to the maximum number of digits a multiplier can have. For example, three combinations only of the column shift device may be used, in case a multiplier should have more than three digits. This can be obtained first by shifting the connection already pointed out from hubs 160 and 233 to hub 234, in order to directly energize relay CT3. The energization of relays CT2, CT1 and CT0 then follows in the already described way. The same calculation may be also directed, for example, by relays CT6, CT5 and CT4 (mainly in case the result of this calculation should be added to another number calculated in another way). In this last instance the above-mentioned connection must be shifted to hub 235, so as to first energize relay CT6. The energization of relay CT6 causes that of lower relay CT5 and controls multiplication by the first lefthand digit of the multiplier. Later on relay CT6 drops out, while relay CT4 picks up, so that multiplication by the second digit of the multiplier is controlled by the energization of relay CT5 and of lower relay CT4. In same way, multiplication by the third and last digit of the multiplier is controlled by the energization of relay CT4 and of lower relay CT3. Then relay CT0 must be again energized, so as to stop the calculations. This is obtained through a connection set from one of hubs 160 and leading to hub 236. A circuit then is completed through contact CT3–d closed, contact CT2–c (n/c) and contact E7–e closed, resulting in the energization of relay CT0 and in the initiation of the corresponding functions.

FEED OF THE SECOND CARD

The program having been fully developed, relay 2F (Fig. 3dd) may pick up again at the next transfer of contact E1–a, contacts 42A–b and 42E–b being all back to n/c positions. For the moment it shall be supposed that it is the same for contacts R12–g, R8–h, R23–g and 2B–7.

Relay 2F holds through its coil 2F–A in the described way. Later on there occurs the energization of relay R6 (see Fig. 3bbb), the holding of this same relay and the energization of relay 2A (Fig. 3aa), when cam C6 closes its contact. The sequence of the circuits, however, is a little different, due to the fact that relay R7 is now energized.

It should be noted that this relay has been energized at the feed of the first card. Subsequently, the pickup circuit being realized from contacts R6–a and 2F–9 is no longer directed to relay R9, but to relays 2D and 2E. Contact 2D–1 is then closed, causing the holding of these relays, while contact 2D–2 opens, preventing relay R9 from being energized when relay R7 drops and contacts R7–b returns to n/c position.

The energization of relay R6 causes also the energization of card feed 148, when cam C10 closes its contact. The feed mechanism then resumes driving the first card, which was stopped before the second reading brushes. Contacts 2E–1 to 80 (Fig. 3c) being closed, circuits may be completed through brushes 153, contacts 2E–1 to 80 and hubs 164.

At the end of the reading cycle there occurs the energization of relay R12 (Fig. 3aa) when cam C11 closes its contact, contact 2D–4 being still closed. This relay holds through its coil R12–A (Fig. 3b) its contact R12–a and contact R20–a (n/c). The card which has been just read still closes contact 165 (Fig. 3aa) thus causing the energization of relay R14, contact R12–b being closed. Relay R14 holds through its coil R14–A (Fig. 3b) its contact R14–a and the holding circuit of relay R12. Contact R14–b is closed then, so that a circuit may be completed through contact R20–a (n/c), contact R14–b transferred, closed contacts R13–a, R21–a, R1–h, R24–c and the coil of relay R15. It will be recalled that relay R1 (Fig. 3a) was picked up when switch 130 was manually closed and that relay R13 is also energized due to the fact that the rack of the card punching device is now in the end position of the 80th column. Contacts R13–a and R1–h are subsequently closed, thus completing the pickup circuit of relay R15 (Fig. 3b). This relay holds through its contact R15–a and contact R20–a (n/c). Through its contact R15–b, it causes immediately the energization of relay R16.

Contact R16–a is thus transferred, so that the result is again the energization of relays R17, R18, R19 and of 182 (Figs. 2 and 3b). Relay R19 holds through its coil R19A (Fig. 3a), contact R19–a and contact R21–b (n/c). The energization of magnet 182 causes the feed of the card into the punching unit. This operation is performed in a way similar to that described principally in above-mentioned Patent No. 2,120,228. However, the drive of the rack is performed through a clutch directly actuated by the continuously rotating mechanisms. In that way, the idle time usually lost by the starting of a motor may be avoided. The feed of the card is accompanied by the opening of contact 128 and the drop-out of relay R13 and by the closing of contact 183 and the energization of relay R21.

Concurrent with these operations there occurs the closing of contact R17–a (Fig. 3b) and the energization of relay R20. Contact R20–a is transferred thus ensuring the drop-out of relays R12, R14, R15 and R16. A circuit is also completed through contact R20–a transferred, contact R18–a and coil R18A, ensuring a provisional holding of relay R18. The return to n/c position of contact R16–a completes this holding action. It causes, at the same time, the drop-out of relay R17, of feed magnet 182, the opening of contact R17–a and also the drop-out of relay R20. Relay R19 drops later on through the release of R19A (Fig. 3aa), at the energization of relay R21 (Fig. 3a) and at the opening of contact R21–b. As to relay R18, it still holds until the next energization of relay R16.

THE COLUMN BY COLUMN CARD PUNCHING MECHANISM

Figure 2B:
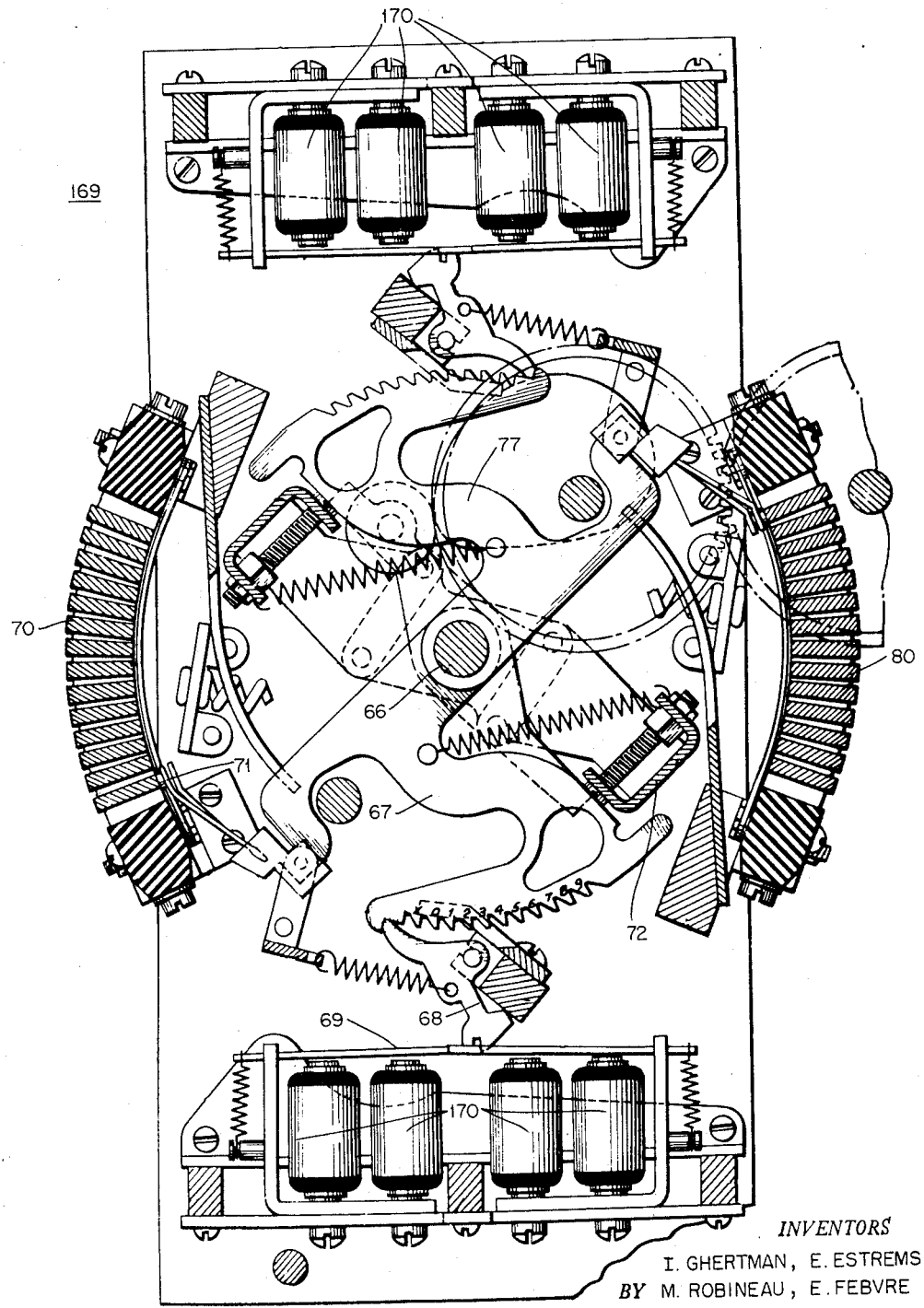
Fig. 2b is a sectional elevation view showing one portion of another form of electromechanical storage unit.

It is noted hereinbefore with reference to Fig. 1 that the card was initially advanced across its short dimension and digitally along indicia columns in a curved path under sensing brushes 152 and 153. Now it is to be considered how it is advanced lengthwise, column by column, along a flat punch bed as shown in Figs. 2c and 2d, to be punched denominationally in a manner such as set forth in Patents 2,120,228, 2,333,461, 2,566,920 and 2,660,373.

Figure 2C:
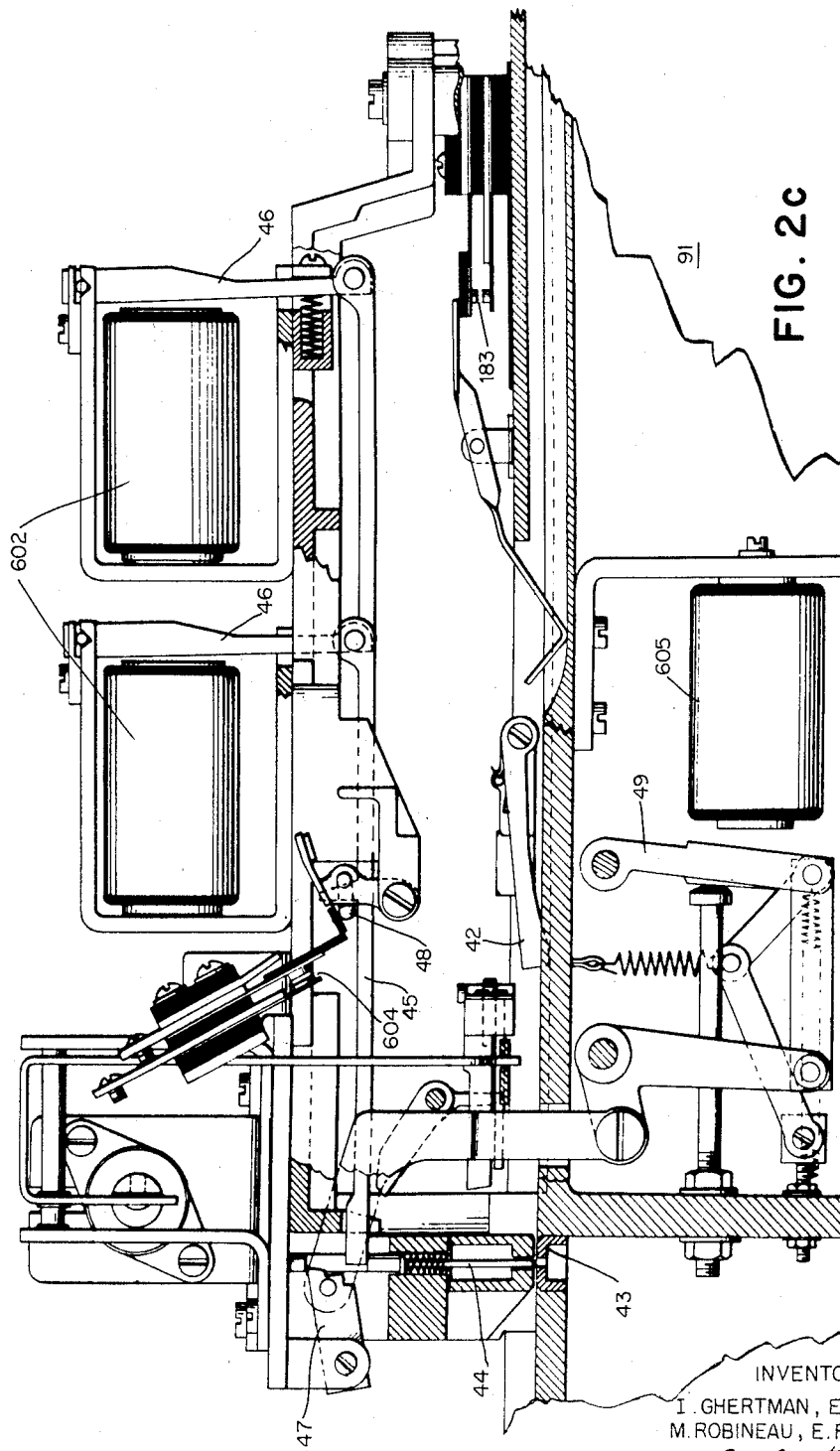
Fig. 2c is a general view of the card punching mechanism.
Figure 2D:
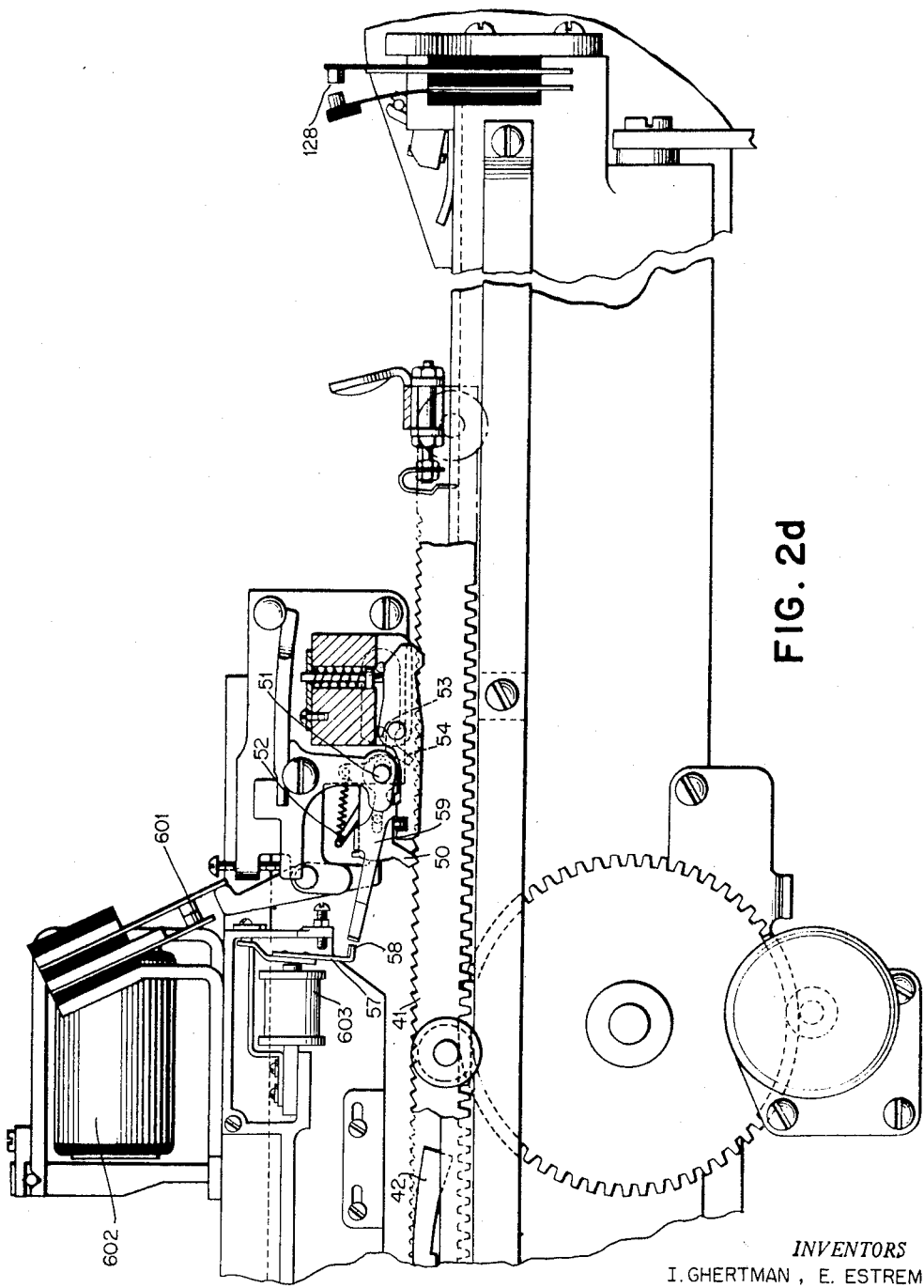
Fig. 2d is an elevation view of the escapement mechanism of the card punch with the improved card shifting means.

In Fig. 2c it is seen that a card delivered from the feed unit of Fig. 1 arrives in the magazine bed of the punch after passing under a card lever which closes a magazine contact 165 (Fig. 3aa). The card lies face up in the magazine with its right edge next to a first pusher which is reciprocated to advance the card toward the punch station and then return to engage the next incoming card.

While going toward the punch station the card raises a die card lever and closes contacts 183 (Fig. 2c). The card is delivered to a card carriage comprising a rack 41 (Fig. 2d), from which there extends a second card pusher 42 which takes over to control card positioning during punching.

The card carriage is controlled to escape column by column to position successive card columns for punching and it can be controlled to travel in a continuous movement for skipping.

The card passes over a die 43 and above it are twelve punches 44 which are arranged in a column over the respective index points on the card. Each punch 44 is slotted to receive the end of a related interposer 45 which is articulated at its right end on the end of an armature 46 of a punch selecting magnet 602. When a magnet is energized, its interposer is moved to the left under a shoulder or a motor bar 47 common to the actuation of all punches.

When any interposer is moved it operates a bail 48 to close a punch contact 604 which is in circuit with the punch magnet 605. An armature 49 of the punch magnet is connected by a linkage to the motor bar 47 which presses an operated interposer against the punch to drive it through the card.

The card carriage is held in position for punching by a holding dog 50 (Fig. 2d) engaging a tooth of the rack 41. This dog is pivoted by an elongated slot on a rod 51 and is driven toward the right by the force of a spring drum acting on the rack. A small spring urges the dog toward the rack and hooks onto an arm 52 which is pivoted on rod 51 and has a pin 53 which engages in a fork of an escapement dog 54 mounted on a stationary pivot. The escapement dogs are alternated in position with each punching operation to permit a card carriage skip of one column.

When the motor bar 47 is depressed to effect punching it also operates a linkage to lift the holding dog 50 out of the rack as the other dog 54 is lowered into the rack. As the holding dog clears the rack it is pulled to the left (Fig. 2d) by its spring to the right end of its elongated slot. This positions its tooth in front of the next rack tooth but leaves the holding dog 50 above the rack for the present. When the motor bar rises, the holding dog is dropped in front of the next tooth on the rack as the escapement dog is lifted. The spring drum moves the rack to the right as far as permitted by the shift of the slotted holding dog which is one column space.

A normally closed escape contact 601 (Fig. 2d) is operated by the holding dog 50 through a lever 56. This contact is held open from the time the holding dog jumps to the left until it is brought back by columnar spacing. Contact 601 opens the circuits to the interposer magnets 602 and to the punch magnet 605 during escapement time.

A skipping control device is provided for causing the card carriage to escape directly over a plurality of columns in a continuous movement. This is done by latching the holding dog 50 in the raised position at a time when the other dog 54 is being lifted. The latch 57 is in the form of an armature lever operated by a magnet 603. When the latch is released, a lug 58 thereon passes under an extension on a sleeve 59 which is formed to embrace the holding dog 50 and hold it up. Sleeve 59 is pivoted on rod 51 and formed around dog 50 to permit free sliding movement thereof but to cause latching of dog 50 and consequent long, swift card movement as governed by magnet 603, which is explained more fully hereinafter.

STORAGE UNITS

Various elements may be used for the registration of factors, mainly those described in Patents Nos. 1,976,617, 2,120,229, 2,359,670 and 2,569,829. The factors may be registered also in relay-operated storage units or also directly in storage units or electronic counters.

The elements described in Patent 1,976,617 are mechanical counters, which can be used, just as they are, for accessory operations of addition and comprise two independent reading devices respectively shown in 166 and 166a in Fig. 3i and 167 and 167a in Fig. 3h. Reading devices 166 and 166a are used in conjunction with the unit of electronic calculation, while the reading devices 167 and 167a are used solely for controlling punching operation.

The electromechanical counter storage units 166 and 167 (Figs. 2a, 3h and 3i) comprise a control magnet 168, a clutch 60 operated thereby with differential timing to set a wheel 61 which is geared to a brush structure 62 for making different digital representing contact around a semi-circular top-counter readout device 63. The counter 166 is reset by the notched shaft 64 which when rotated picks up pawls on the wheels and brings them back to the home position.

In Fig. 3i can be noted also relays 20A, 20B, 21A, 21B, 23A, 23B devised for the control of the counter input reception, magnets 22A and 22B devised for the control of the zero reset devices and setting control magnets 168 and 168a. In Fig. 3hh can be noted also relays 24A, 24B devised for the control of the exit through reading devices 166 and 166a (Fig. 3i), as well as relays 25A, 25B (Fig. 3h) devised for the control of the exit through reading devices 167 and 167a Other relays 26A, 26B, 27A, 27B, 28A, 28B, 29A, 29B are used for controlling punching operation and their purpose will be noted hereinafter. Generally speaking, the circuits corresponding to two mechanical counter units have been shown at Figs. 3h and 3i. This has been made in order to avoid the unnecessary enlargement of the drawing and it is quite obvious that the machine can comprise more of them. Besides, the corresponding circuits may be obtained without difficulty by substitution of indexes C, D, E, F . . . to indexes A and B.

The storage elements described in Patents 2,359,670 and 2,569,829 are other mechanical units, which are also not fitted for the operations of addition. They have been also provided with a reading device shown in Fig. 3ii as 169 and 169a. They operate in a similar way to the units 166, 167 and have the advantage to be more compact and they can be more rapidly reset. On the same figure, can be noted also, relays 30A, 30B, 31A, 31B, 33A, 33B, devised for the control of the registration, magnets 32A, 32B devised for restoration (in other words, the cancellation of a previously recorded quantity), and registering magnets 170 and 170a.

The mechanical storage element 169 is similar to that of Patent 2,569,829 and is shown in Figs. 2b and 3ii. There it is seen that a control magnet 170 is one of several such controls arranged in staggered placement in upper and lower tiers as shown in Fig. 2b. The lower set of magnets 170 operates armature trip levers 69 for releasing stop pawls 68 differentially to govern the setting of sector levers 67. A resetting bail 72 is rocked at appropriate times to swing sectors 67 to either take new positions as determined by the timing of the action of pawls 68, or to be reset if the pawls are inactive. It is possible to wipe out an old setting and rearrange the lever positions for a new storage setting all in one cycle.

As each sector 67 is set, contact blades 71 thereon wipe over an arcuate array 70 of commutator spots of a duo-decimal number and corresponding to the twelve index point positions of the IBM code on a card. When differentially stopped or registered, the sector blades establish contact with one of the spots and provide an electrical reading of a decimal or duo-decimal value which is then available as a stored number. Resetting is effected rapidly by the swinging of bail 72 when it is released by a reset magnet.

Another similar set of sectors 77 is controlled by the top set of magnets 170 and provide electrical storage settings along commutator segments 80 at the right. The parts of Fig. 2b are noted to be compact, handy for extra storage and for fast electromagnetic operation.

Other relays 34A, 34B, 35A, 35B, 36A, 36B are used, as will be noted later, for calculations in British currency. The exit relays are relays 37A, 37B, shown in Fig. 3hh.

As it can be realized by the examination of Fig. 3ii only circuits to two mechanical storage units 169 and 169a have been shown, but it is obvious that the machine can comprise more of them. As in the case of mechanical counters, the corresponding circuits will be obtained without difficulty by substitution of indexes C, D, E, F . . . to indexes A and B.

The relay-operated storage units are shown in Fig. 3j in the form of two 3-position units. It is quite obvious that the machine may comprise more of them, and that each unit may comprise more than three positions. The combination used is the arithmetical combination 1, 2, 3, 4. The position of the hundreds order of the first relay-operated unit, for example, comprises four relays 15A, 16A, 17A, 18A which, when they are energized, serve to accumulatively represent digits 1, 2, 3, 4, respectively. Digits 5, 6, 7, 8, 9 are represented by the simultaneous energization of two or more of the preceding relays, digit 8 for example, being represented by the simultaneous energization of the relays corresponding to digits 4, 3 and 1. It is quite obvious that any other combination, if it proves to be advantageous, may be used, for example, combinations 1, 2, 3, 6 or 1, 2, 4, 5, or 1, 2, 4, 8. Relays 10, 11, 12, 13 are devised to direct the energization of relays 15A, 16A, 17A, 18A, and of similar relays, according to the selected combination. The entering and exit controls are respectively controlled by relays 19A, 19B and 14A, 14B.

There is the possibility to perform also any of the transfer operations, in which the factor to be transferred would be read in any of the mechanical counter units, mechanical storage units, relay-operated storage units or of electronic storage, or counter units, the transfer being performed in any of these same units. In this case, the connections formerly set from hubs 164 (Fig. 3c) must now be set:

(1) From hubs 171a (Fig. 3i), if this transfer is to be performed from the second mechanical counter unit.

(2) From hubs 172a (Fig. 3ii), if this transfer is to be performed from the second mechanical storage unit.

(3) From hubs 173a (Fig. 3jj), if this transfer is to be performed from the second relay-operated storage unit.

(4) From hubs 174a (Fig. 3ff), if this transfer is to be performed from the second electron counter unit.

It is quite understood that the receiving hubs may be, in this case:

Either hubs 156 (Fig. 3i) or any of a series of similar hubs, which have not been shown (exclusive of hubs 156a, if the emitting unit is the second mechanical counter unit);

Or hubs 157 or similar hubs not shown;

Or hubs 158 (Fig. 3j) or similar hubs not shown.

Or also hubs 159 (Fig. 3ee) or similar hubs partially shown.

The entry into mechanical counters or mechanical storage units requires preliminary controls, which will be performed for example from hubs 178 (Fig. 3dd). In this case, it is necessary to control the 5th stage of program (in other words, relay 42E), so as to obtain thereafter the energization of relay 43E, when contact E1–a is tripped on. Furthermore, hubs 180 and 181 may be joined together, so that the 5th stage of program develops at the same time as the third, without any idle time as a result.

In a parallel way, it is necessary to establish the following connections:

(1) From one of hubs 178 to a hub 141, corresponding to relay 20A (Fig. 3i), so as to control the entry into the first mechanical counter unit.

(2) From one of hubs 178 (Fig. 3dd) to a hub 142, corresponding to relay 30A (Fig. 3ii), so as to control the entry into the first mechanical storage unit.

Contact E1–a (Fig. 3d) when once back to n/c position, the following circuits are completed: line 123, contact E1–a (n/c), lines 137 and 137a, contacts 43E–c to f presently closed, hubs 178 and from there: on the one hand to one of the hubs 141 (Fig. 3i), contact R34–d and the coil of relay 20A, and, on the other hand, to one of the hubs 142 (Fig. 3ii) contact R34–b and the coil of relay 30A.

Relays 20A and 30A thus pick up and hold, the first through coil 20A–A, contact 20A–1 and the contact of cam C14; the second through coil 30A–A, contact 30A–1, line 175 and the contact of cam C15 normally shunted by contact R6–f. They operate their contacts 20A–3, 20A–4 and 30A–4 (Fig. 3bbb). In a parallel way, relay E7 (Fig. 3d) picks up. As already described, contact E7–a (Fig. 3bbb) is subsequently closed, so that the following circuit may be completed: line 123, contacts E1–b, E2–a (n/c), contact E7–a closed, switch 146, commutator 230b, contacts 2F–6, 3C–3, R34–f all in n/c position, contact 20A–3 transferred and the coil of relay R36. This relay then opens its contacts R36–c and R36–b (Fig. 3k) thus cutting off the ciruits leading to relays R6 (Fig. 3d) and E1 (Fig. 3k).

The energization of relay E1 is thus delayed till the completion of the functions, which are about to be described. Relay R36 again closes its contact R36–a (Fig. 3bbb), thus putting the exciting circuit of relay R33 under control of the contact of cam C19. Then, as it can be realized by referring to the cam chart of Fig. 6, the closing time of cam C19 precedes that of cam C13. In this way, the functions dependent on this last cam can be ensured. Again, in Fig. 3bbb it can be noted also that the exciting circuit of relay R33 is cut off if contacts such as 20A–4, 28A–3 are opened together. The purpose of this arrangement is to prevent the preliminary functions from performing an entry into a mechanical counter, in case the quantity stored in this counter has not yet been punched (it will be learned later that relay 28A (Fig. 3*h*) is energized, as soon as the punching of the quantity stored in the first mechanical counter is controlled).

Therefore, if it is assumed that contact 28A–3 is back in n/c position (Fig. 3*bbb*), relay R33 picks up through the above-outlined circuit portion and the circuit: contact of cam C19, contact R36–*a* closed and contacts 28A–3, 28B–3, 28C–3 (n/c). The energization of relay R33 initiates immediately the following functions:

(1) Holding of this same relay, through its coil R33A its contact R33–*a* and the contact of cam C15 shunted by contact R6–*f*.

(2) Closing of contacts R33–*c* and R33–*d* (Figs. 3*i* and 3*ii*).

(3) Closing of contact R33–*b* and energization of relay R32 (Fig. 3*bbb*) when cam C16 closes its contact.

(4) Holding of relay R32 through its coil R32A, its contact R32–*a* and the contact of cam C15.

(5) Closing of contact R33–*f* (Fig. 3*k*) and restoration of the pickup circuit of relay E1.

It may be noted also that an electronic cycle occurs, as it will be described later on and that thyratron T26 gets ionized at the end of this cycle. The result is the energization of relay E1, which occurs, as soon as contact R33–*f* is closed. Contact E1–*a* (Fig. 3*d*) is thus transferred, causing the drop out of relay E7 and the interruption of the circuits, which were set from jacks 178, and concurrently the energization of relay R34, due to the presence of contact R33–*g* presently closed. The latter relay holds through its coil R34A (Fig. 3*bbb*), its contact R34–*a* and the contact of cam C15.

Contact E1–*b* being also opened, the circuit leading to relays R33 and R36 is also cut off. No reenergization of these relays can take place for the moment, due to the opening of contact R34–*f*. Contacts R34–*b* and R34–*d* (Figs. 3*i* and 3*ii*) also open, preventing for the moment any further energization of relays 20A and 30A. Nevertheless, these relays remain picked up, their holding being performed through coils 20A–A and 30A–A and the already described circuits.

Contact R33–*d* being closed, a circuit is completed when cam C13 closes its contact, causing the energization of relay 21A. Contact 20A–2 is closed at the time. This relay holds through its coil 21A–A, its contact 21A–1 and the contact of cam C15. In a parallel connection, there is magnet 22A which controls the resetting to zero of the first mechanical counter unit. This operation is performed in the already known way as presented in the above-mentioned Patent 1,976,617.

Contact R33–*c* being also closed (Fig. 3*ii*), another circuit is set up when cam C9 closes its contact, causing the energization of relay 31A and of magnet 32A. Contacts 30A–2 and 30A–3 are closed at the time. Relay 31A holds through its coil 31A–A, its contact 31A–1, contact R35–*f* (n/c) and the contact of cam C7. The energization of magnet 32A controls the restoration of the first mechanical storage unit 169 (in other words, the cancellation of the quantity registered therein in the way already described with reference to Patents 2,359,670 and 2,569,829.

In a parallel way, circuits may be completed through contacts 35A–1 and 36A–1, if these contacts happen to be closed, the purpose of which is the energization of coils 35A–D and 36A–D. The latter belong to latch relays 35A and 36A and cause the release of their armatures.

FACTOR REGISTERING

The setting up of factors requires the previous establishment of the following connections:

(1) From hubs 164 (Fig. 3*c*) to hubs 156 (Fig. 3*i*), if this setting is to be performed in the first mechanical counter unit.

(2) From the same hubs 164 (Fig. 3*c*) to hubs 157 (Fig. 3*ii*), if the setting is to be performed in the first mechanical storage unit.

(3) From same hubs 164 (Fig. 3*c*) to hubs 158 (Fig. 3*j*), if the setting is to be performed in the first relay-operated storage unit.

(4) At last, from same hubs 164 (Fig. 3*c*) to hubs 159 (Fig. 3*ee*), if this storage registering is to be performed by the first electronic counter unit.

The registering connections in the other mechanical counter, mechanical storage units, etc. are easily determined from the foregoing. Moreover, certain of the preceding connections could be made from hubs 154 (Fig. 3*c*) in case a factor should be set up from the first row of brushes.

In a parallel way, the following connections should also be set:

(1) From hubs 139 (Fig. 3*dd*) to hubs 143 correspond to relay 19A (Fig. 3*j*), so as to control the registering in the first relay-operated storage unit.

(2) From same hubs 139 (Fig. 3*dd*) to hubs 144 or 145 corresponding to relay 42A (Fig. 3*e*), so as to control the registering in the first electronic counter unit. In this last case the registering may be made either in addition or in subtraction.

As has been already noted, the registering of the factors is generally controlled by the energization of relay 2F (Fig. 3*dd*). This relay picks up when contact E1–A is transferred and when all contacts 42A–*b*, 42B–*b*, 42C–*b*, 42D–*b*, 42E–*b* and R12–*g*, R8–*h*, R23–*g*, 2B–7 are back to n/c position. The first set (42A–*b*, 42B–*b* . . .) control the completion of the preceding calculation program: the second set controls the completion of the operations related to the reading of the preceding card.

The energization of relay 2F leads to the energization of relay R5, and then to the energization of relay E6, owing to the closing of contact R5*a*. In a parallel way, the already outlined circuit is completed, leading to coil 2F–A and ensuring the holding of relay 2F.

The energization of relay E6 causes, in its turn, the opening of contact E6–*a* (Fig. 3*k*) and the drop out of relay E1. Contact E1–*a* (Fig. 3*d*) thus comes back to n/c position, so that the following circuits may be completed: line 123, contact E1–*a* (n/c), lines 137 and 137*a*, contacts 2F–18 to 24, hubs 139 and, from there, on the one hand: toward those hubs 140 corresponding to relays 42A, 42B, 42C, 42D, 42E, if the first five stages of program are to be controlled and, on the other hand: toward one of the hubs 143 (Fig. 3*j*) and the coil of relay 19A and, in third place: toward one of the hubs 144 or 145 (Fig. 3*e*) and the coils of relays 42A and 43A.

The operation of the machine continuing, cam 17 (Fig. 3*bbb*) closes its contact. Contact R32–*b* being closed, results in the energization of relay R6 and the following functions:

(1) Holding of relay R6 and energization of relay 2A (Fig. 3*aa*), as already described.

(2) Energization in parallel of relays 2D and 2E, as already described.

(3) Energization of relay R8 and of card feed magnet 148, as already described.

(4) Energization of relay 3B (Fig. 3*hh*), when cam C21 closes its contact.

(5) Later, energization of relay R35 (Fig. 3*b*), when cam C13 closes its contact.

This last relay holds through its coil R35A (Fig. 3*bbb*), its contact R35–*a* and the other part of the circuit, which is also for the energization of relay R6. It opens its contact R35–*e* and prevents relay R6 from reenergization. In a parallel way, contact R35–*f* (Fig. 3*ii*) opens and cuts off the connection between coil 31A–A and cam C7. Thereafter, the holding of this last relay is ensured by the closed contact 2F–21 and the contact of cam C6.

Relay 3B (Fig. 3*hh*) having picked up (owing to the

23 presence of contact R6–*j* closed), contacts 3B–3 (Fig. 3*i*) and 3B–1 (Fig. 3*ii*) are closed. The result is:

(1) Energization of relay 23A through the circuit: line 123, contact R6–*k* closed, contacts 21A–2 and 3B–3 presently closed, coil of relay 23A.

(2) Energization of relay 33A through the holding circuit of relay 31A and contact 3B–1 closed.

These relays are held respectively through their contacts 23A–1 and 33A–1.

Along with these operations, relay 2E (Fig. 3*aa*) is picked up and magnet 148 energized. The card previously inserted into the machine is immediately driven under brushes (Fig. 3*c*) 153. Circuits are completed through the data perforations of the card and synchronized with its run, leading to contacts 2E–1 to 80 presently closed, to hubs 164 and from there, on the one hand toward hubs 156 (Fig. 3*i*), contacts 23A–2 to 11 presently closed, and counter magnets 168, on the other hand toward hubs 157 (Fig. 3*ii*), contact 33A–2 to 11 presently closed, and magnets 170, in third place toward hubs 158 (Fig. 3*j*), contacts 19A–1 to 3 presently closed, in fourth and last instance toward hubs 159 (Fig. 3*ee*), contacts SC1–1 to 8, SC2–1 to 8, SC4–1 to 8 all in n/c position and contacts 42A–1 to 8 presently closed. The registering of the factors thus is performed according to a novel selective plan which will be further explained.

REGISTERING OF VALUES IN ENGLISH CURRENCY

Provision of a device is made for the entry of values in English currency, in other words in a duodecimal numeration system. This device can be used in case a unit of the 12 basis should be represented in a single column. In this case, the values assigned to the various punched holes are those shown in Fig. 11. However, it is quite obvious that other codes may be utilized without any risk of deviation from the teachings of the invention. The storage device for English currency values has been shown associated with the mechanical storage units, but, again, it is quite obvious that, if necessary, it can be adapted to other units.

By referring to Fig. 3*ii*, it can be noted that relay 34A has been arranged in parallel with magnet 184. The pickup circuit of this relay is controlled by a contact of relay R31 (Fig. 3*cc*) which picks up for each cycle when cam C22 closes its circuit. This happens, as noted in Fig. 6, towards the end point 0. Consequently, the circuit of relay 34A (Fig. 3*ii*) is maintained for the passage of all the punched holes 9, 8, 7, . . . 1 and 0. If relay 34A happens to pick up, it holds through its coil 34A–A, its contact 34A–1 and the contact of cam C6; and then it prevents the completion of the circuits to be described now.

In case hub 185 should be in connection with a column of the card where a punched hole of value 10 (refer also to Fig. 11) is entered, contact R31–*m* is transferred, so that the circuit coming from hub 185 is directed to latch relay 35A. This circuit is directed by contact 34A–2 (n/c) and can be completed only if relay 34A happens to pick up.

Later on, cam C9 closes its contact causing the energization of relay 3D and the closing of contact 3D–1 (contact 2D–8 is presently closed). By referring to Fig. 6, it can be noted that the closing time of the contact of cam C9 corresponds to the reading of the punched hole row to which value 11 has been assigned. Consequently, relays 35A and 36A pick up in parallel, when hub 185 is connected to a field of the card where such an "11" punched hole is sensed.

By referring to Fig. 3*ii*, it is noted that the energization of relay 35A corresponds to the reading of a 10, while the dual energization of relays 35A and 36A corresponds to the reading of an 11, the reading impulses being available on hubs 186 and 187.

24

REGISTERING IN THE RELAY-OPERATED STORAGE UNIT

Data entry into the relay-operated storage units requires the presence of all the already mentioned connections and of an additional connection going from hubs 139 (Fig. 3*dd*) to hubs 195 (Fig. 3*ii*), so as to energize also relay 3C. This relay holds through its contact 3C–1 and contact E1–*d* (n/c). Relays 14A and R6 being also energized, contact R6–*n*, 3C–5 and 19A–4 (Fig. 3*j*) are all opened, so that relays such as 15A, 15B, 15C . . . may drop out when cam C27 opens its contact. On the other hand, cams C23, C24, C25, C26 close their contacts serially (refer also to Fig. 6), causing a periodical energization of relays 10, 11, 12, 13, devised to direct the entry into the relay-operated storage units. By referring to Fig. 6, it can be seen for example that the contacts of cams C23, C25, C26 are closed together at point 8. Thus, relays 10, 12 and 13 pick up, so that contacts 10*a*, 12*a*, 13*a* are closed. Consequently, relays 15A, 17A and 18A may pick up in their turn, if an impulse is transmitted at this same moment to hub 158 and through contact 19A–1. The energization of these three relays causes the entry of an 8. These relays hold through their coils 15A–A, 17A–A, 18A–A, their contacts 15A–1, 17A–1, 18A–1 and the contact of cam C27. Later on, relays 3C, R6 and 19A drop out, causing the return to n/c position of contacts 3C–5, R6–*n* and 19A–4 and thus completing the holding-circuit of relays 15A, 17A and 18A during the cut-off time of the contact of cam C27.

CONTROL CIRCUITS OF THE ELECTRONIC ACCUMULATORS OR COUNTERS

As already explained, the electronic circuits are supplied by a transformer for the conversion of the current as schematically shown at 111 in Fig. 3*hh* and the output terminals of which are shown on Fig. 3*k*. These terminals are connected to lines 239 to 243, which are thus brought to the following potentials:

| | Volts |
|---|---|
| Line 239 | 150 |
| Line 240 | 75 |
| Line 241 | 50 |
| Line 242 | 0 |
| Line 243 | −100 |

Of course, these values are only given as an indication for the understanding of the text. Moreover, it has been noted that line 243 is the first energized when the machine is charged. This arrangement is devised to ensure the bias of the various control-grids of the electronic tubes, and to avoid too high a charge of the other lines.

Figure 3M:
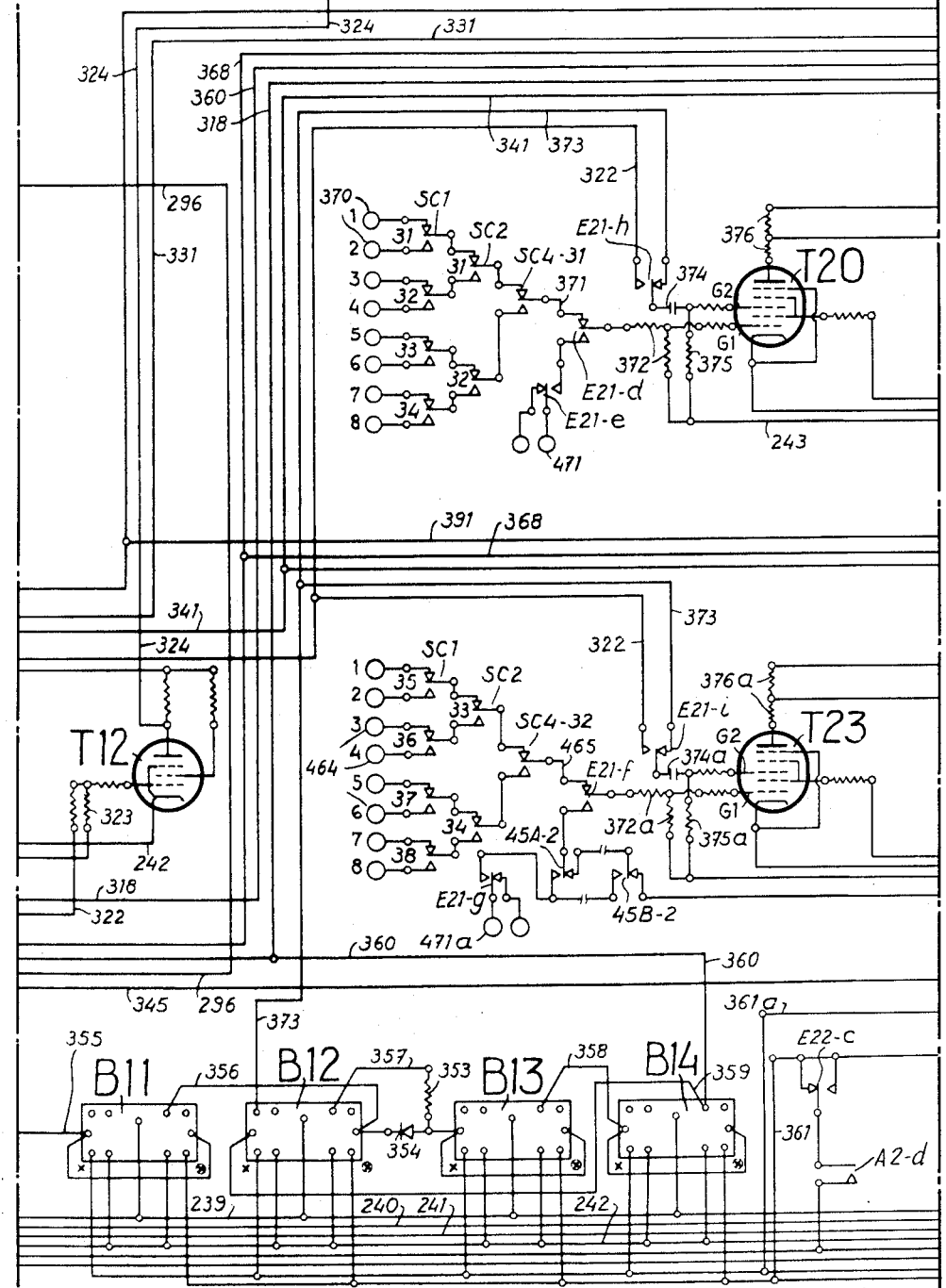
Figure 3M:
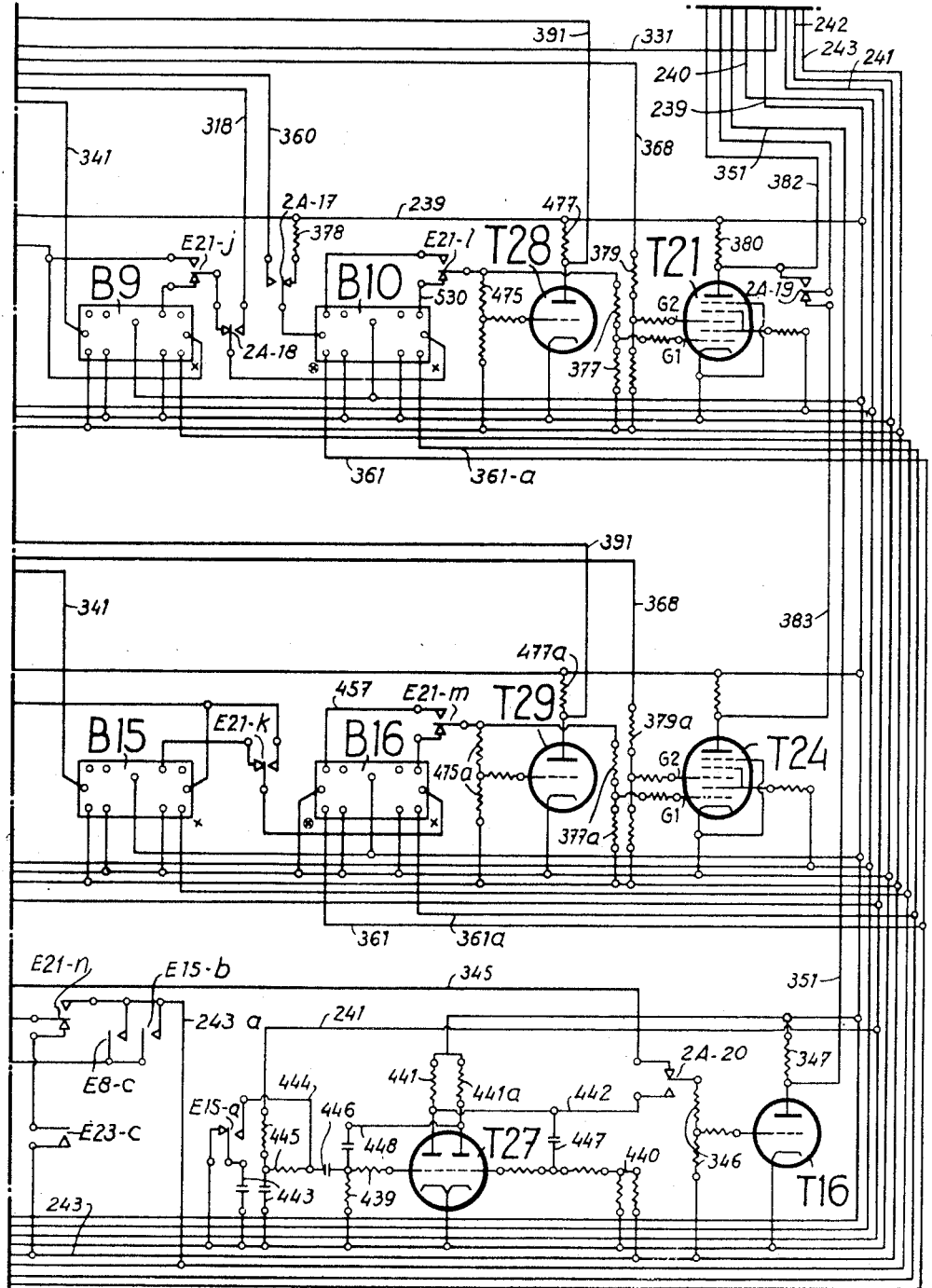

It has been noted also that contact A2–*d* (Fig. 3*m*) was closed when relay A2 (Fig. 3*k*) picked up, thus connecting line 243 to line 361 (Fig. 3*m*). Thus the latter is brought to a potential of −100 volts, but can be temporarily disconnected when contacts E22–*c* is tripped. In the same way, lines 361*a* and 243*a* are brought to this same potential of −100 volts, when one of contacts E23–*c*, E8–*c* or E15–*b* (Fig. 3*mm*) is closed. Various effects result from this, which will be explained hereinafter.

The control circuits of the electronic counters comprise tripping devices of "Eccles-Jordan" type to be described right now. These tripping devices, which are to be designated hereafter by simpler vocable of "trigger," comprise 2 triodes 244, 244*a* (see Fig. 5) or a double-triode 6J6 (or of a similar type) the anodes of which are connected to load resistors 245, 245*a* and to a terminal 246 connected to a positive supply. This supply is constituted by line 239. The cathodes are connected to ground line 242 through hubs 247, 247*a*. The grids are connected, on the one hand, to bias line 243, 243*a* through resistors 248, 248*a* and terminals 249, 249*a* and, on the other hand, to the non-corresponding anodes through resistors 250, 250*a* and capacitors 251, 251*a*.

Capacitors 252, 252a connected to each grid and, respectively connected to hubs 253, 253a, allow the reception of the impulses. Terminals 254, 254a connected respectively to the anodes allow the emission of impulses. Other terminals 255, 255a connected to the mid-point of load resistors 245, 245a allow the emission of half-amplitude impulses.

As is known, the trigger circuit, such as that just described comprises two stable states only. In the first for example, the right hand tube is conductive. In this case, the corresponding anode has a relatively low potential, a voltage drop occurring then in load resistor 245a. A derivation circuit is completed towards bias line 243, through line 256 and resistors 250 and 248. These resistors are selected so that their mid-point, which is connected to control grid G1 of the left hand tube, has in this case a lower potential than the cut-off bias of that grid, so that conduction in this tube is thus stopped. The only circuit going through load resistor 245 is then the derivation circuit allowed through line 257, resistors 250a and 248a and leading to bias line 243a. Resistors 250a and 248a, of the same value as resistors 250 and 248, are also selected so that the mid-point connected to control-grid G2 of the right hand tube has, in this case, a positive potential and the tube can be conductive.

The second stable state is that in which the left hand tube is conductive. For this purpose, the mid-point of resistors 250a, 248a has a negative potential, thus stopping any conduction into the right hand tube; the mid-point of resistors 250, 248 has, on the contrary, a positive potential. In that way, the conduction in the left hand tube maintains itself.

It is known that a trigger circuit, such as shown in Fig. 5, may be changed at will from one of its stable states to the other through positive or negative impulses applied to terminals 253 and 253a and transmitted to grids G1 and G2, respectively, through capacitors 252, 252a. However, the constants of the circuit are generally selected so that the positive impulses have no effects. It is the same for the trigger circuits of the present machine. Concerning the negative impulses, two cases should be considered according to whether they are applied either to a conductive tube or to a non-conductive tube.

Let us assume first that the right hand tube is non-conductive and that a negative impulse is applied to its control-grid through capacitor 252a. The effect of this impulse is to bring this grid to a still more negative potential, so that the cut-off power of this grid is simply increased. Under these conditions, no change happens in the state of the tube; initially non-conductive, it is still in the same condition after reception of the impulse.

Assume now that this tube is conductive. In this case the mid-point of resistors 250a, 248a and, consequently, grid G2 have a slightly positive potential. A negative impulse transmitted through capacitor 252a results in bringing the potential of this mid-point to a negative value, which can be quite lower than the cut-off potential value, if the impulse amplitude is properly selected. Consequently, the conduction in this tube is momentarily cut off. The result is a marked decrease of the current allowed through load resistor 245a, a corresponding decrease of the voltage drop through this resistor and then a voltage increase of the anode of this tube. Another result is also the potential change of the mid-point of resistors 250 and 248, which rises above the cut-off point of the grid to which it is connected. Thus, conduction of the left hand tube is initiated. It is accompanied by an increase of the current intensity allowed through load resistor 245 and by an increase of the voltage drop through this resistor. It causes a potential decrease of the anode of the corresponding tube and consequently a decrease of the potential at the mid-point of resistors 250a, 248a, connected to this anode by line 257. The potential of the control-grid of the right hand tube is thus brought above the cut-off point, which completes the effect of the negative impulse transmitted through capacitor 252a. Finally, a negative impulse applied to the control-grid of a conductive tube changes over the condition of the system: from conductive, the right hand tube becomes non-conductive, while the left hand tube from non-conductive becomes conductive. Moreover, the trigger circuit thus changed becomes non-sensitive to the negative impulses, which may be applied to its right hand tube, because these impulses can make this tube non-conductive, but cannot produce the opposite effect. On the other hand, a negative impulse may be applied simultaneously to the two tubes. In this case, the trigger circuit is changed from one of its states to the other at the reception of each impulse, for the impulse transmitted by capacitors 252, 252a is always applied to a tube in conductive condition and liable, consequently, to be changed into the non-conductive condition. It should also be explained that the value of resistors 250, 248 and 248a, 250a is relatively high compared with the value of load resistors 245, 245a. The current which flows in them and which is necessarily allowed through one of the load resistors, has therefore a relatively low intensity and causes, consequently, only a low voltage drop through the resistors. It can be considered that the anode of a non-conductive tube has the potential of line 239, in other words, about 150 volts. This same anode has a potential of about 50 volts when the tube is conductive owing to the high potential drop which occurs then in the load resistor. Consequently, the amplitude of the impulses likely to be collected on terminals 254, 254a connected to the anodes is about 100 volts. These impulses are negative in case the corresponding tube is changed from the non-conductive condition over to the conductive condition; they are positive in the opposite case. Terminals 255 and 255a being connected to the mid-point of load resistors 245, 245a, the amplitude of the impulses liable to be collected there is half of the preceding ones, in other words about 50 volts.

The above outlined trigger circuit may be changed over when it is desired to restore it to a certain condition by cancellation of the bias of one of the control-grids (that of grid G2 of right hand tube for example). For the purpose, it is enough to disconnect line 243a ensuring this bias. In this case, current allowed through resistors 250a, 248a is cut off, so that the whole circuit tends to take the potential of the anode of tube 244, in other words, a highly positive potential. In that way, conduction is maintained or starts in the right hand tube, thus cutting off the conduction that can exist in the left hand tube, through the mechanism already described. This condition is maintained when the bias of line 243a is restored.

It is in order to note also that the state of a trigger or of an assembly of triggers may be systematically changed over either by a sudden and momentaneous increase of the cathode potential, or by a sudden and momentaneous decrease of the line potential which feeds the anode circuit. These arrangements have been described in the patent applications Serial Nos. 202,120, filed December 21, 1950, now Patent No. 2,731,201, and Serial No. 406,490, filed January 27, 1954, now Patent No. 2,813,676, and to which reference may be made for more details.

The trigger circuit of Fig. 5 has been conventionally represented in Figs. 3f, 3ff and 3k to 3m by the small rectangle of Fig. 5a, where arrangement of the terminals corresponds to the terminals at Fig. 5. The tube which is normally conductive after restoration, is marked with a little cross (right hand tube for example in the case of the trigger of Fig. 5a). The potentials of terminals 254, 255 and 254a, 255a in this case are the following:

About 150 volts for terminals 254 and 255
About 100 volts for terminals 255a
About 50 volts for terminals 254a Turning back to Fig. 3bbb, it has been noted that the energization of relay 43A, for example, was followed by the successive energization of relays E8 and E9. Relay E9 comprises a contact E9–a (Fig. 3kk), the transfer of which starts the electronic calculation. The latter is preceded by a general restoration of certain circuits, which will be described later and the effect of which is mainly to make trigger B1 conductive on its right hand triode. Terminal 254a of this trigger then has a potential of about 50 volts; it is connected to bias line 243 through resistors 259, 260, the values of which are selected so that their mid-point has a highly negative potential. The impulse receiving terminal 253a is connected to line 241, through connection 261 and resistor 262. This terminal being connected to a capacitor, the corresponding circuit has then the potential of line 241 or 50 volts. Another circuit exists which comprises capacitor 264 and contact E9–a, all the elements of which are connected to ground line 242, which has the ground potential of 0 volts.

The transfer of contact E9–a causes the connection of one of the ends of resistor 262 to the ground, through capacitor 264. The result is a sudden potential drop and consequently a negative impulse, which is transmitted through line 261 and applied to terminal 253a. The effect of this impulse is to change over the state of trigger B1, thus making its right hand triode non-conductive. The potential of terminal 254a then goes up to its highest value, 150 volts, which brings the potential of the mid-point of resistors 259 and 260 to a positive value.

These resistors belong to the circuit of a multivibrator MV comprising a double triode T1, of the 6J6 type for example, the anodes of which are retroactively coupled with grids G1, G2, through capacitors 267, 267a. Grid G2 is also connected to ground line 242 through resistors 268, 269, while grid G1 is connected to bias line 243, through resistors 270, 271 and 260. The 6J6 tube is so constituted that the cut-off point of its grids is quite negative; grid G2 being connected to the ground is consequently above the cut-off point, so that conduction is normally performed on the right hand side from anode A2 and load resistor 272. Grid G1 being connected to mid-point of resistors 259, 260, which point initially has a very high negative potential, no conduction is performed on the left hand side.

The state of trigger B1 having been changed over in the way just described, the mid-point of resistors 259, 260 has now a positive potential, bringing grid G1 above its cut-off point. Thus, conduction starts on left hand side, causing a sudden potential drop through load resistor 273, which is connected to line 239 having a potential of 150 volts. The result is a negative impulse, which is transmitted to the mid-point of resistors 268, 269, through capacitor 267a and which brings the potential of grid G2 of the right hand triode below its cut-off point. Conduction thus is stopped on the right hand side, causing an increase of anode A2 potential and, consequently, a positive impulse transmitted to capacitor 267. The only effect of this impulse is to reinforce conduction on the left hand side.

The charge of capacitor 267a being dissipated, resistors 268, 269 come back to their original potential, which is that of ground line 242. This potential being higher than the cut-off point of grid G2, conduction starts on the right hand side, causing a sudden potential drop through load resistor 272. The result is a negative impulse, which is transmitted to the midpoint of resistors 270, 271, through capacitor 267, the effect of which is to now bring the potential of grid G1 of the left hand triode below its cut-off point. Thus conduction is stopped on the left hand side, causing an increase of anode A1 potential and, consequently, a positive impulse which is transmitted to capacitor 267a and which reinforces the conduction of the right hand side.

The charge of capacitor 267 being spent, grid G1 comes back to the potential of the mid-point of resistors 259, 260, in other words to a positive potential. Therefore, conduction starts again on the left hand side, causing a negative impulse, which stops the conduction of the right hand side. Then conduction starts again on the right hand side, causing a negative impulse, which stops the conduction of the left hand side. Finally, conduction occurs alternately on the left and right hand sides, these alternations recurring indefinitely but can be stopped by a return of trigger B1 to its original state. In this last case the potential of terminal 254a comes back to its initial value; 50 volts, bringing the potential of the mid-point of resistors 259, 260 above the cut-off point of grid G1. A variable resistor 274 provides adjustment for the alternation frequency, which is selected at about 20,000 per second, this number being only given as an example.

Two series of impulses, alternately negative and positive may be collected on the terminals of anode A1, A2, but only the impulses occurring on anode A1 are utilized. First, the latter are negative, when the left hand side of tube T1 becomes conductive, then positive, when this same side becomes again nonconductive. The alternation thus constituted forms a cycle point. These impulses are collected on line 276 and are directed, on the one hand, to resistors 275 and, on the other hand, to resistors 343 (Fig. 3–ll).

Resistors 275 connected to bias line 243, form a voltage divider controlling the grid of tube T2. At a stand-still, when the multivibrator is not yet started, anode A1 of the left hand tube of the multivibrator and, consequently, line 276 have practically the potential of line 239, about 150 volts. In this case, the mid-point of resistors 275 has a slightly positive potential, so that tube T2 is conductive. A voltage drop then occurs in load resistor 277, so that the mid-point of this resistor has a potential of about 100 volts.

The first impulse transmitted by the multivibrator, which is negative, brings the mid-point of resistors 275 below the cut-off point of the control-grid of tube T2, thus breaking the conduction of this tube. Then there occurs an increase of the anode voltage, which is practically brought back to the potential value of line 239, and which then initiates a positive impulse of 50 volts collected on the mid-point of resistor 277 and transmitted through line 278.

The second impulse transmitted by the multivibrator, which is positive, causes the opposite effect, in other words it brings the mid-point of resistors 275 above the cut-off potential. Conduction is restored in tube T2, resulting in the return of the mid-point potential of resistor 277 to its original value and also in a negative impulse, which is transmitted through line 278.

A left branch of line 278 leads to commutator 230, then to contact 2A–14 (n/c), if the commutator is properly positioned, then to line 279 and to the input terminal of the left hand tube of trigger B1. A negative impulse may then be transmitted to the tube presently conductive in this trigger to change it over into the non-conductive condition and thus bring back trigger B1 to its initial state. In this case the operation of the multivibrator is immediately stopped, after the emission of one single impulse alternation. This possibility is only used when the circuits are tuned up; as many alternations as necessary may be initiated by a simple manual action on one of contacts 266 (Fig. 3bbb). Commutator 230a being positioned on one of contact-studs 263, a series of discharges from capacitor 265 occurs, which cause successive energizations of relay E9. Contact E9–a (Fig. 3kk) is then transferred, causing the emission of a series of impulse alternations in the way just described.

Assuming that commutator 230 is in the position shown, the impulses transmitted through line 278 have no effect on the condition of trigger B1, so that the multivibrator keeps on operating.

The two impulses constituting an alternation will be conventionally designated subsequently by the name of "Impulse A" for the first, and "Impulse B" for the second. These impulses may be optionally of 100 volts or 50 volts, according to the way the output lines are connected with respect to the load resistor. In the case of multivibrator for example, there are:

Negative impulses A of 100 volts.
Positive impulses B of same value.

These impulses are transmitted through line 276.

In the case of tube T2, in the same way impulses transmitted through line 278 are:

Positive impulses A of 50 volts.
Negative impulses B of same value.

As it will be seen later, the impulses supplied by the multivibrator are grouped into cycles comprising a certain number of impulse alternations.

For this purpose, the machine comprises a certain number of circuits designated by the name "primary chain," one of the functions of which is to count the number of impulse alternations supplied by the multivibrator and to associate various functions for each emitted impulse, these functions varying with the time of the emission of the various impulses. Another element of the machine is devised to count the primary cycles. The multivibrator stop is then automatically obtained after the completion of a whole number of primary cycles, this number being essentially variable, according to the nature of the operation to be performed. Thus, the multivibrator stop is obtained after the completion of 10 primary cycles, in the instance of the multiplication operations.

*Primary chain.*—A second branch of line 278 leads to trigger B2 (Fig. 3–*l*) and simultaneously to the two control-grids of the triodes of this trigger. Trigger B2 is normally conductive on its right hand tube, as it is shown by the little cross on the drawing, so that the corresponding output terminals have presently their lowest potential.

The first impulse transmitted by line 278 is a positive impulse A of 50 volts. It has no effect since the circuits of trigger B2 are non-sensitive to the positive impulses. The second impulse transmitted through the same line is a negative impulse B. This impulse is effective for the change-over of the trigger condition, so that the latter is now conductive on its left hand tube. The right hand tube becoming non-conductive, the corresponding output terminals reach their highest potential and the result is:

(1) A positive impulse of 100 volts transmitted through line 280.

(2) Another positive impulse of 50 volts, transmitted through line 281.

This last impulse enters the control-grid of the left-hand triode of trigger B8; it has no effect, since the circuits of this trigger are non-sensitive to the positive impulses.

As the multivibrator keeps on operating, a second impulse alternation is transmitted through line 276 (Fig. 3*kk*), then through line 278 (Figs. 3*kk* and 3–*l*). The first impulse then transmitted through line 278 is, as before a positive impulse A of 50 volts. It has no effect. The second impulse transmitted through this same line is a negative impulse B; it is effective for the change-over of trigger B2 condition; however, since this trigger is now conductive on its left hand tube, it is changed over to be conductive on its right hand tube. The result is a voltage drop in the corresponding load resistor and, subsequently negative impulses which can be collected on the corresponding output terminals. Thus there are obtained:

(1) A negative impulse of 100 volts transmitted through line 280.

(2) A negative impulse of 50 volts transmitted through line 281.

This last impulse is transmitted to the control-grid of the left hand triode of trigger B8; it has no effect, because this triode is non-conductive at the moment and because an impulse applied in such conditions cannot change over the condition of a trigger circuit.

Finally, trigger B2 stops all impulses A coming in through line 278; it reacts only under impulses B and associates these impulses, first with a positive impulse, then with a negative impulse, then again with a positive impulse, and so on.

The impulses transmitted through line 280 enter resistors 282, connected to bias line 243 and forming a voltage divider, which controls the control-grid of tube T3. Line 280 has initially a potential of about 50 volts, so that the mid-point of resistors 282 has a negative potential. In this case, conduction is cut off in tube T3, so that its anode and its load resistor 283 have practically the potential of line 239: 150 volts.

The first negative impulse transmitted through line 278 makes the right hand tube of the trigger B2 non-conductive. At this moment, the corresponding output terminals have a potential of about 150 volts, so that the mid-point of resistors 282 is above the cut-off point. Conduction starts in tube T3, causing a voltage drop in load resistor 283 and initiating negative impulses collected on lines 284 and 285.

The second impulse transmitted through line 278 results in making the right hand tube of trigger B2 conductive, thus bringing back the potential of line 280 to its initial value of 50 volts. Conduction in tube T3 is then again broken, so that the anode of this tube and the load resistor 283 come back to their original potential, thus initiating positive impulses.

The impulses received by line 284 are transmitted to triggers B4, B5 and B6. The positive impulses have no effect (since such impulses have no action on the condition of a trigger circuit) and the negative impulses have also no effect since they are applied to the control-grids of tubes which are not conductive.

The impulses collected on line 285 are directed, on the one hand, towards capacitors 308 and 328*a* (Fig. 3–*ll*), the controlling grids G1 of thyratrons T6 and T7. They have no effect for the moment, for grids G2 are now cut off as it will be explained later. These same impulses lead to resistors 316, which form the voltage divider controlling grid G2 of tube T10 (Fig. 3*kk*) and also to resistors 286 (Fig. 3*k*), which forms the voltage divider controlling the grid G1 of tube T4.

Only the last case will be considered for the moment. To begin with, it will be explained that the electronic circuits are arranged to operate through cycles, each cycle being constituted by a certain number of sub-cycles or by a certain number of impulse alternations.

As already mentioned, the most basic subcycle is formed by an impulse alternation supplied by the multivibrator; this alternation comprises two impulses called A and B, which may be of different amplitude or of different sign. Each alternation constitutes what has been called a "cycle point."

The cycle points are grouped togethed in cycles called primary cycles which can comprise a certain number of cycle points; this number may be variable. Thus, for the machine to be described, each primary cycle comprises 18 cycle points, but it is quite obvious that this should not constitute an invariable characteristic of the invention. It is possible, without departing from the teachings of the invention, to adopt primary cycles comprising a different number of cycle points (for example 12 for the first; 16 or 18 for the following, etc.). In the case of a primary cycle comprising 18 cycle points, these cycle points will be conventionally numbered: 9, 8, 7, 6, 5, 4, 3, 2, 1, 0, 11, 12, 13, 14, 15, 16, 17, 18.

Fig. 8 indicates in a general way how the impulses are spaced out in the course of a primary cycle. The references facing each line refer to part numbers appearing in Figs. 3k to 3mm. The bias of the different lines is indicated in relative height. The existing bias is also indicated when the multivibrator is stopped, or when it comes back to stop after the emission of the 18 impulse alternations constituting one primary cycle. Thus, for example, line 276 has first a high potential and is alternately brought to a low and to a high potential, when the multivibrator starts up.

Similarly, line 280 has initially a low potential; it is alternately brought to a high and to a low potential, when the multivibrator starts up, however, the frequency of these alternations is one half of the alternation frequency of the multivibrator. Moreover, it can be noted that the potential variations occur in concordance with impulses B of the multivibrator.

It is noted also that the primary cycles are grouped together in cycles called secondary cycles, each secondary cycle comprising 10 primary cycles, but it is also possible to adopt secondary cycles, comprising more or less than 10 primary cycles. That is a purely technical question which depends upon the nature and the complexity of the work to be performed by the machine. If these calculations are relatively simple, and can be performed very easily during the idle time related to other functions of the machine, a great rapidity of calculation should not be required, and it should be possible to leave a few cycles unused.

If these works are more complex and if the duration of the electronic calculations tends to become too important, then it can be well to reduce this duration, which can be obtained by following the general teachings of the invention. Occasion will arise to mention the case where the mode of operation will be different.

Coming back to tube T4 (Fig. 3k), grid G2 of this tube is controlled by the voltage divider formed by resistors 287, which are connected together through line 288 to one of the output terminals of the left hand triode of trigger B3. This triode is now non-conductive, so that line 288 has its highest potential and grid G2 of tube T4 is biased above its cut-off point. Similarly, grid G1 of this same tube is also biased initially above its cut-off point. As a matter of fact, tube T3 (Fig. 3–l) is first non-conductive, so that its anode and the output line 285 have then their highest potential. Consequently, tube T4 (Fig. 3k) is initially conductive, so that a voltage drop occurs in load resistor 289 of its anode and the latter has then its lowest potential.

The first impulse transmitted through line 285 is a negative bias, the result of which is to bring grid G1 of tube T4 below its cut-off point. Conduction in this tube breaks, causing a sudden increase of the anode voltage and, consequently, a positive impulse, which is transmitted through line 290. This impulse occurs at the moment of the first alternation of the multivibrator, in other words at point 9 of the first primary cycle. It is transmitted to the grids G1 of thyratrons 9U, 7U, 5U, 3U and 1U, through capacitors 291; however, it has some effect only on thyratron 9U; as a matter of fact, grid G2 of this thyratron is connected to the inter-connection point of resistors 293, which are installed in a cross connection between lines 241 and 243, the values of which are so selected that this inter-connection point has already a positive potential. This grid, consequently, has always a positive bias. Grid G1 of the same thyratron is connected to bias line 243, through resistor 292, however, the impulse transmitted through capacitor 291 gives this grid a positive bias. Thus thyratron 9U becomes a capacitor.

The anode of thyratron 9U is directly connected to line 241, which has a potential of 50 volts. Consequently, its potential is invariable. The cathode of this same thyratron is connected to ground line 242 through load resistor 294 and auxiliary resistor 295. The output line 296 has then initially the potential of the ground. On the other hand, it has a potential of about 40 volts when the thyratron becomes conductive, resistor 295 having a relatively low value in comparison with that of resistor 294.

The thyratron is a gas-filled tube, the property of which is to maintain its conductivity when it is started and which is then non-sensitive to the bias of its control-grids, branch circuits being completed from line 241 to grids G1 and G2, resistors 292 and 293 and bias line 243. Consequently, conduction, when it is started, is kept up, thus maintaining the line in its maximum potential.

The impulse, which causes thyratron 9U to fire, is impulse B, which occurs at the first point of the primary cycle, in other words, at point 9. This thyratron may be extinguished by an impulse, which is transmitted through line 297 and capacitor 298. This is to be connected later on.

In a branch off line 296 there are resistors 299, which form a voltage divider controlling grid G2 of thyratron 8U. This line having presently its highest potential, this grid has a positive bias, thus placing thyratron 8U in a receptive condition. Nothing else occurs, however, for grid G1, which is connected to bias line 243, through resistor 300, has, presently, the potential of this line.

It has been noted that the first impulse received by tube T4 results in making this tube non-conductive and in bringing the potential of line 290 up to its highest value. The voltage divider formed by resistors 301 places the grid controlling tube T5 above its cut-off point, thus making this tube conductive. A voltage drop then occurs in load resistor 302, hence a negative impulse is transmitted through line 303 towards grids G1 of thyratrons 8U, 6U, 4U and 2U. This impulse does no more than reinforce the negative bias of these grids, so that it has no effect.

Reversal effects occur at point 8 of the cycle: tube T4 becomes again conductive, so that the potential of line 290 is brought back to its lowest value. A negative impulse is thus applied to thyratrons 9U, 7U, 5U, 3U and 1U, which is ineffective for the reason which has just been given and, concerning thyratron 9U, due to the fact that a fired thyratron is non-sensitive to negative impulses. A similar impulse is applied to the control-grid of tube T5 and places this grid below its cut-off point. Consequently, conduction stops in tube T5, hence a positive impulse is transmitted through line 303, which causes the firing of thyratron 8U (already in a receptive condition). The potential of line 304 then reaches its highest value which places thyratron 7U in a receptive condition.

At point 7 of the cycle, the opposite effects occur again: line 290 is brought to its highest potential, hence a positive impulse fires thyratron 7U and places thyratron 6U (Fig. 3–l) in receptive condition. In a parallel way, line 303 transmits a negative impulse, which is ineffective.

Generally speaking, line 290 transmits positive impulses to points 9, 7, 5, 3, and 1 of the cycle, resulting in the firing of thyratrons 8U, 6U, 4U and 2U. Explanations will be given hereinafter on the purpose of output lines 296, 304 (Fig. 3kk) and of the similar output lines coming from thyratrons 7U to 2U.

With thyratron 1U firing (Fig. 3–ll), a voltage drop occurs in resistors 294a, 295a, causing the voltage increase of line 305. This line leads mainly to resistors 306 forming a voltage divider controlling grid G2 of thyratron T6, thus placing this thyratron in receptive condition. However, for the moment, the result is ineffective, for grid G1 of this thyratron controlled by the voltage divider formed by resistors 307, has always a negative bias. On the other hand, it has been seen that tube T3 emits, through line 285, alternately negative and positive impulses, the negative impulses being transmitted to points 9, 7, . . . 1 of the cycle and the positive impulses transmitted to points 8, 6, 4, 2, 0, . . . . These impulses enter capacitor 308 associated with grid G1 of thyratron T6. However, they have remained so far ineffective, due to grid G2 of the same thyratron which has a negative bias. This grid has a positive bias at point 1 of the cycle; however, the impulse transmitted at the moment, through line 285, is a negative impulse, which cannot have any other effect than the reinforcement of the cut-off action of grid G1. The next impulse, transmitted through the same line, at point 0 of the cycle, is a positive impulse. It brings the potential of grid G1 above its cut-off value, so that thyratron T6 then may fire.

The anode of this thyratron is connected to line 241 (potential 50 volts), through load resistor 309 (Fig. 3–*l*), which is common to three thyratrons T6, T7, T8. The cathode of the same thyratron is connected to ground line 242, through resistor 310 and a very strong capacitor 311; moreover, it is connected to output line 297, which then has initially the potential of the ground line. Conduction starts, and a positive impulse is transmitted to capacitors 298, through line 297, which causes the extinction of all thyratrons 9U to 1U. This extinction is the result of the potential increase of the cathode above the anode potential. The purpose of capacitor 311 is to maintain, during a certain time, line 297 at high potential, in case thyratron T6 would be prematurely extinguished. Capacitor 311 then discharges, through resistor 310.

In parallel with the firing of thyratron T6 occurs that of tube T10 (Fig. 3*kk*), through the same impulses. As a matter of fact, line 305 is also connected to resistors 315, which form a voltage divider controlling grid G1 of tube T10. This line is brought to its highest potential at point 1 of the cycle, so that grid G1 of tube T10 is then biased above its cut-off point. Similarly line 285 is connected to resistors 316, which form a voltage divider controlling grid G2 of this same tube. It receives, at point 1 of the cycle, a negative impulse, which is ineffective, and at point 0, a positive impulse the effect of which is to bring grid G2 above its cut-off point. Thus conduction starts and tube T10 fires, initiating a voltage drop in its load resistor 317 and forming in the midpoint of the latter a negative impulse of 50 volts transmitted through line 318. It will be noted that the impulse, which must cause the extinction of thyratron 1U (Fig. 3–*ll*) is also transmitted to point 0; however, line 305 keeps, during a certain time, a potential of a certain value, due to the high value of capacitors 298, 311, inserted in the circuits. Under these conditions, grid G2 of tube T10 (Fig. 3*kk*) may remain, for a certain time, above its cut-off potential (for example, during 4 or 5 points), so that tube T10 may send a series of impulses, both negative and positive. There is no immediate result, due to the particular arrangement of the circuits controlled by tube T10.

An extending line 318 leads to the control capacitor of the control-grid of the right-hand triode in trigger B3. This triode, which is now conductive, is thus made non-conductive, hence a positive impulse is collected on line 319. In a parallel way, the left hand triode of this same trigger is made conductive, hence a negative impulse is applied to line 288, the result of which is to bring the potential of this line to its lowest value, and since line 288 controls grid G2 of tube T4, this grid is brought back to a lower potential than that of its cut-off point, so that all the circuits controlled by tube T4 henceforth are cut off.

Another branch of line 318 leads to one of the terminals of contact 2A–18 (Fig. 3*mm*) and to the control capacitor of the right hand triode of trigger B10. This triode now conductive, thus may be made non-conductive (however, this can happen only if contact 2A–18 is transferred).

When thyratron T6 fires (Fig. 3–*ll*) a high voltage drop occurs in resistor 309. The result is a negative impulse, which is applied through capacitor 312 to the midpoint of the voltage divider formed by resistors 313. This voltage divider controls the grid of tube T11, normally conductive. The negative impulse being applied through capacitor 312, conduction is cut off in tube T11, causing a potential increase of its anode. In connection with the latter there is the voltage divider formed by resistors 332 and controlling the grid of tube T13, normally non-conductive. The anode potential of tube T11 increasing, conduction starts in tube T13, causing a voltage drop in load resistor 333 and a negative impulse, which is transmitted through line 334 and applied to the left hand triode of trigger B18. The latter is conductive on this side, so that its condition is changed over. The result is a negative impulse transmitted through line 384. The charge of capacitor 312 ending, tubes T11 and T13 come back to their original condition. The result is a positive impulse collected on line 334 and which is ineffective, due to the fact that it is applied to trigger circuits.

It has been noted that negative impulses were transmitted through tube T3 and line 285 at points 9, 7, 5, 3, 1 of the cycle. Impulses of the same nature, but of half amplitude are also transmitted through line 284 at all the odd points of the cycle, in other words, at points 9, 7, 5, 3, 1, 11, 13, 15, 17; hereafter are the results:

(1) *Point 0.*—Trigger B4 is initially conductive on its right hand triode. The negative impulse transmitted through line 389 is effective for the change over of this trigger condition, so that now it is conductive on its left-hand triode. The result is a positive impulse transmitted through line 320 remaining ineffective due to the fact that it is applied to other trigger circuits.

(2) *Point 11.*—A negative impulse is transmitted through line 284 and is simultaneously applied to the left hand triode of trigger B4, to the right hand triode of trigger B5, and through diode 451, to the left hand triode of trigger B6. This impulse is only effective for the change over of trigger B4, condition which is now conductive on its left hand triode. This trigger is restored into its original condition, thus made conductive on its right hand triode. The result is a negative impulse transmitted through line 320, which is effective for the simultaneous change over of triggers B5 and B6. Thus trigger B5 is conductive on its right hand triode, while trigger B6 is conductive on its left hand triode.

(3) *Point 13.*—The negative impulse transmitted through line 284 is effective for the change over of trigger B5, which is now conductive on its right hand triode but, on the other hand, it is ineffective on the condition of trigger B6, due to the presence of diode 451. The potential of the right hand terminal of the latter is lower than that of its left hand terminal and it does not allow passage of any current. Consequently, trigger B5 only is changed over and restored into its original state.

(4) *Point 15.*—A new negative impulse is transmitted through line 284. This impulse is ineffective on trigger B5, which is conductive on its left hand triode, but effective for the change over of trigger B6. A branch circuit is completed through resistor 450, diode 451 and line 284, which circuit is accompanied by a voltage drop occurring at the lower end of resistor 450. The result is a negative impulse, which is applied to the left hand triode of trigger B6. Thus, this trigger is brought back to its original condition (conduction through its right hand triode). In a parallel way, a negative impulse is collected on line 321, the purpose of which is to change over the condition of trigger B7.

It has been noted that trigger B6 was changed over a first time at point 11. Then it is conductive on its left hand triode, so that a negative impulse is transmitted through line 322, bringing the potential of this line to its lowest value. In connection with this line there is mainly the voltage divider controlling the grid of tube T12 (Fig. 3m) and formed by resistors 323. The conduction in this tube is then stopped, so that output line 324 is brought to its highest potential. The function of this line will be noted later in connection with the description of the electronic counters.

Trigger B6 (Fig. 3–*l*) is changed over again at point 15 and then is conductive on its right hand triode. The potential of line 322 comes back to its initial value (the highest value), so that conduction starts in tube T12 (Fig. 3m) and line 324 potential is brought back to its lowest value.

It has been noted also that trigger B7 was changed over; it is then conductive on its left hand triode, so that a positive impulse is transmitted through line 325, which is ineffective. A negative impulse is transmitted also through line 326, which enters the voltage divider formed by resistors 385. This voltage divider controls the grid of tube T17, normally conductive. When the negative impulse occurs, conduction in tube T17 is stopped, causing a potential increase of the anode. In circuit with the latter there is the voltage divider formed by resistors 327 and controlling grid G2 of thyratron T7. This grid is brought above its cut-off point, thus placing thyratron T7 in receptive condition. Grid G1 of this thyratron is controlled by resistors 328, which form a voltage divider maintaining this grid below its cut-off point. This grid is also connected to line 285 through capacitor 328*a*.

The impulse transmitted through this line at point 15 is a negative impulse; it cannot but reinforce the cut-off action of grid G1. On the other hand, the impulse transmitted at point 16, which is positive, places this grid above its cut-off point, thus starting the conduction of thyratron T7.

Thyratron T7 is arranged similar to thyratron T6, having its cathode connected to ground line 242 through a resistor 329 of relatively low value and a capacitor 330 of high capacity. Its firing initiates a very high positive impulse transmitted through line 331, the purpose of which is mainly to cause the extinction of the carry-over thyratron of the electronic counters. In a parallel way, the firing of thyratron T7 initiates a high voltage drop in resistor 329. The result is a negative impulse, which contributes to the extinction of thyratron T6 and which is applied besides, to capacitor 312 and to voltage divider formed by resistors 313. As before, conduction is stopped in tube T11, causing a positive impulse, which is applied to the voltage divider formed by resistors 332. The latter controls the grid of tube T13, which is thus brought above its cut-off point. Conduction starts in tube T13, causing a voltage drop in load resistor 333. The result is a negative impulse directed to line 334 and to the control line of the grid of the left hand triode in trigger B7. This trigger, which is presently conductive on its left hand triode, is, consequently, restored to its original condition (conduction through its right hand triode) thus initiating a negative impulse transmitted through line 325 to trigger B8.

Trigger B8 is presently conductive on its right hand triode and the impulse it receives is effective enough to change over its condition, so that conduction is now through the left hand triode. The result is a positive impulse applied to line 335, which is ineffective, due to the fact that it enters trigger B17 (Fig. 3*kk*). In a parallel way, a negative impulse is applied to line 336 (Fig. 3–*l*).

The latter impulse is first transmitted to capacitor 337, which leads to the control-grid of thyratron T8. This grid, presently, has a negative bias supplied by the voltage divider formed by resistor 338, so that the impulse transmitted through capacitor 337 cannot but reinforce this negative bias.

This same impulse is also transmitted to resistors 339 forming the voltage divider controlling the grid of tube T9. Before trigger B8 is conductive through its left hand triode, line 336 has its highest potential, so that the control-grid of tube T9 is biased above its cut-off point. This tube is then conductive, so that the voltage drop, which occurs in load resistor 340 brings line 341 to a relatively low potential. This tube being non-conductive, a positive impulse occurs, transmitted through line 341. However, this impulse enters or is liable to enter triggers B3, B1 (Fig. 3*kk*), B9 and B15 (Fig. 3*mm*); it is, consequently, ineffective, since a trigger circuit is non-sensitive to positive impulses.

On the other hand, it has been noted that trigger B2 (Fig. 3–*l*) emitted alternately, through line 281, positive and negative impulses, which enter the left hand triode of trigger B8. The positive impulses in general are ineffective, but the negative impulses are transmitted at even points, in other words, at points 8, 6, 4, 2, 0, 12, 14, 16, 18; they are ineffective until point 16 is reached, due to the fact that they are applied to the left hand triode of trigger B8, that they cannot but make this triode non-conductive and the triode is already non-conductive.

The condition of trigger B8 having been changed over at point 16, due to the negative impulse transmitted through line 325, this trigger is now conductive through its left hand triode. The impulse transmitted through line 281 at point 18 is then effective for the change-over again of this trigger condition, which thus starts again its conduction through its right hand triode. The result is:

(1) A negative impulse transmitted through line 335.
(2) A positive impulse transmitted through line 336.

The first impulse is applied to the right hand triode of trigger B17 (Fig. 3*kk*) and is ineffective, for this triode is already non-conductive. The second impulse, which is positive and activates capacitor 337 (Fig. 3–*l*) brings the control-grid of thyratron T8 above its cut-off point. Therefore, conduction starts through this tube, resulting in a high voltage drop in resistor 309, which contributes to the quenching of thyratron T7. Thyratron T8 is also extinguished a little after its ionization or at the next cycle, when thyratron T6 fires.

This same impulse transmitted through line 336 also has an effect to bring the control-grid of tube T9 above its cut-off point. Therefore, conduction starts in this tube, hence a voltage drop in its load resistor 340 and a negative impulse, which is transmitted respectively to triggers B3, B1, B9 and B15.

Triggers B3 (Fig. 3*kk*) has been changed over at point 0 and is, presently, conductive, through its left hand triode. It is changed over again, so as to start again its conduction through its right hand triode. The result is an increase of potential of line 288 which brings grid G2 of tube T4 above its cut-off point and thus places this tube in receptive condition. Under these conditions, this tube will have the possibility to react again under the impulses sent through line 285.

Trigger B1 has been changed over when contact E9–*a* has been transferred. It is presently conductive, through its left hand triode and can be changed over again under the following circumstances:

(1) In case contact 2A–14 (Fig. 3*k*) would be transferred; then the impulse from line 341 is transmitted through line 279 to the left hand triode of trigger B1, made then non-conductive.

(2) In case commutator 230 would be positioned on contact-stud marked CU.

(3) When an impulse comes in through line 263.

In all these cases the impulse coming from line 341 is transmitted to line 279 and from there to the left hand triode of trigger B1. This triode being presently conductive is made non-conductive, so that trigger B1 is restored to its original condition, starting again its conduction through its righthand triode and causing the multivibrator to stop. It can be explained that the first circumstance occurs when contact 2A-14 is transferred, in other words, when direct entries are performed into the electronic counter from the reading brushes or when the transfer from an electronic counter to a storage unit is performed, that the second circumstance is only used for the adjusting operations of electronic circuits and that the third circumstance occurs when calculations are performed.

The effect upon triggers B9 and B15 (Fig. 3*mm*) of the negative impulse transmitted through line 341 will be discussed later on.

Returning to consideration of trigger B3 (Fig. 3*kk*) it is noted that it is initially conductive through its righthand triode. At this moment, line 319 has a relatively low potential, so that the control-grid of tube T14 (Fig. 3*ll*) is biased below its cutoff point, thus stopping any conduction through this tube. This grid is controlled by a voltage divider formed by resistors 342. In parallel way the multivibrator MV (Fig. 3*kk*) constantly sends impulses, negative and positive, which are transmitted through line 276. This line leads to the control-grid of tube T15, through the voltage divider formed by resistors 343. Line 276 has initially its highest potential, so that the control-grid of tube T15 is biased above its cutoff point. Then, this tube is conductive, so that a potential drop occurs in load resistor 344, common to the anodes of tubes T14 and T15 and that line 345 has thus its lowest potential.

The first impulse of the multivibrator results in the decrease of line 276 potential. The consequence is a voltage drop of the control-grid of tube T15, which is thus brought below its cutoff point. Conduction is stopped into tube T15, hence a positive impulse and an increase of line 345 potential.

The second impulse of the multivibrator causes an increase of line 276 potential up to its initial value, resulting in an increase of the potential of tube T15 control-grid and thus restoring the conduction of this tube. Then there occurs a voltage drop in resistor 344, leading to a negative impulse and to a voltage decrease of line 345.

A third impulse of the multivibrator results in the same effect as the first; a fourth impulse of the multivibrator results in the same effect as the second, etc., so that finally, the impulses of the multivibrator are reversed in line 345. The multivibrator sends two impulses for each cycle point, line 345 receives also two impulses for each cycle point.

At point 0 the condition of trigger B3 is changed over, so that it is conductive through its lefthand triode. The righthand triode becoming non-conductive, line 319 potential increases, bringing the control-grid of tube T14 above its cutoff point. This tube then becomes conductive and will remain so until the condition of trigger B3 is again changed over, in other words, until point 18. It is well to recall that trigger B3 is changed over by impulses B. Consequently, impulse A occurring at point 0 and transmitted through line 276, produces its normal effect, stopping the conduction through tube T15. Impulse B occurring at the same point, restores conduction in tube T15. Simultaneously, an impulse reaches line 319, as it has been said, restoring conduction through tube T14. This tube remaining conductive till the end of point 18, all the impulses which come from line 276 between the end of point 0 and that of point 18 are ineffective (more exactly, they give rise to slight voltage drops, which merely emphasize the negative bias controlled by line 345).

Finally, line 345 receives and transmits 10 impulse alternations, the first positive, the second negative, which occur respectively at points 8, 7, 6, 5, 4, 3, 2, 1 and 0 of the cycle.

A first branch of line 345 controls the voltage divider formed by resistors 362. Its effect will be related hereinafter. A second derivation leads to contact 2A-20 (Fig. 2*mm*) and to voltage divider formed by resistors 346. This voltage divider controls the grid of tube T16, which supplies a series of impulse alternations in a way similar to that of tube T15. However, these impulses are reversed, the first impulse supplied by tube T16 being a negative impulse A. These impulses occur at the lower end of load resistor 347 and are transmitted through line 351. The effect of these impulses will be explained hereinafter.

Finally, it can be noted that the purpose of the primary chain is to count the impulse alternations and to control various ancillary functions, according to the moment when these impulses are initiated. The cycle of functions automatically recurs in the same order as long as the multivibrator has not been stopped.

SECONDARY CHAIN

The machine of the present invention performs multiplications through successive operations of addition. Under these conditions, with the multiplication of any number by any other number of only one single digit to be performed, 1 to 9 successive additions are required according to the value of the multiplier. A mode of operation could be set up, in which the number of cycles used for the performance of such a multiplication would be strictly limited to the necessary number of addition, for example, 7 if the multiplier has value 7, the operation of the electronic computer being immediately stopped as an appropriate impulse is sent to the lefthand triode of trigger B1 (Fig. 3*kk*), so as to stop the operation of the multivibrator. Such a mode of operation limits the cycle number of successive additions to strict minimum and may give rise, in certain cases, to a gain in speed; however, it is not adopted in the case of the present machine, for this speed gain is generally negligible. The above-mentioned mode of operation has moreover the drawback of causing various complications in case operations of a certain complexity should be performed, for example, the simultaneous performance of two different multiplications. In such an instance, the multipliers would be of varied magnitude, so that detection and time allowance would have to be made for the multipliers having the highest value. On the other hand, it is more advisable to have the possibility to dispose of various idle cycles, for the purpose of accessory operations. The machine which is the object of the present invention is more flexible and takes in view all of these considerations, whereupon each cycle of multiplication comprises 10 basic cycles; moreover, various means are devised to make certain of these cycles ineffective. For the purpose, the machine comprises a cycle counter including an impulse stepping decimal counter unit which controls the corresponding operations.

This counter unit constitutes the basic unit of the electronic counter and is about to be described in detail. It comprises 4 triggers B11, B12, B13 and B14 (Fig. 3*m*), resistor 353 and crystal diode 354. This counter unit is similar to that of the counter units described in the patent applications filed by L. R. Harper on December 21, 1950, Serial Nos. 202,119, now Patent No. 2,800,276, and 202,120, now Patent No. 2,731,201, to which reference may be made.

Assuming that triggers B11, B12, B13, B14 are restored so as to be conductive through their righthand triodes, a first negative impulse applied to line 355 brings trigger B11 to conduction through its lefthand triode. This condition of the assembly of the triggers B11, B12, B13 and B14 corresponds to the entry of one unit. A positive impulse occurs then on one of the output terminals of the righthand triode of trigger B11, which is ineffective because it is applied to another trigger circuit and such a circuit is non-sensitive to positive impulses.

A second negative impulse applied to line 355 causes the change-over of trigger B11, which starts again its conduction through its righthand triode. A negative impulse occurs then on the corresponding output terminals, which is transmitted through line 356 and applied to the righthand triode of trigger B12 and also to the two triodes of trigger B13. In this last case, the impulse is transmitted through crystal diode 354.

Prior to the input of this impulse the righthand triode of trigger B11 is non-conductive. Consequently, line 356 connected to one of the corresponding output terminals has its highest potential (about 150 volts). On the other hand, the righthand triode of trigger B12 is conductive, so that line 357, connected to one of the corresponding output terminals, has its lowest potential. A circuit cannot be completed from line 356 to line 357, through diode 354 and resistor 353, because it is countered by the presence of the diode.

The second negative impulse transmitted through line 355 again makes the righthand triode of trigger B11 conductive; a negative impulse then occurs, as already mentioned, which causes trigger B12 to change over its condition, but has no effect on the condition of trigger B13, since no circuit can be completed, for the moment, through diode 354. Simultaneously, the potential of line 356 is brought to its lowest value, in other words, to the same potential as line 357.

The negative impulse applied to the righthand triode of trigger B12, causes a change-over of the conductive state of this trigger and makes this triode non-conductive. A positive impulse then occurs on the corresponding output terminals, which is collected through line 357 and simultaneously transmitted to the two triodes of trigger B13, through resistor 353. This positive impulse counters the negative impulses which would now otherwise pass through diode 354. In a parallel way, line 357 is brought to its highest potential, so that a circuit may be completed from line 357 to line 356, through resistor 353 and diode 354, this diode allowing a current in this direction.

Finally, the second negative impulse transmitted through line 355 has brought trigger B11 again to conduction through its righthand triode and has changed over the condition of trigger B12. This condition of the assembly of the four triggers B11, B12, B13, and B14, where only the condition of trigger B12 is changed over with respect to the original condition, corresponds to the entry of a "two."

A third negative impulse applied to line 355 changes over again the condition of trigger B11, which starts again its conduction through its lefthand triode. The righthand triode of this same trigger becoming non-conductive, a positive impulse is applied to line 356. However, it is ineffective, because it is applied to other trigger circuits. In a parallel way, line 356 comes back to its highest potential. Then it has the same potential as line 357, so that resistor 353 and diode 354 also have this potential.

A fourth negative impulse, applied to line 355, changes over the condition of trigger B11. The latter starts its conduction through its righthand triode so that a negatime impulse is collected on line 356 and transmitted from there to the righthand triode of trigger B12. This impulse is ineffective as this triode is presently non-conductive. In a parallel way line 356 comes back to its lowest potential, so that conduction starts again in the circuit formed by resistor 353 and diode 354; the potential of the lower end of this resistor thus comes back to the potential value of line 356. The result is a negative impulse which is simultaneously applied to the two triodes of trigger B13. This trigger being conductive through its righthand triode is changed over, so as to be conductive through its lefthand triode. There occurs again a positive impulse which is transmitted through line 358 and which is ineffective when applied to trigger B14.

A fifth negative impulse applied to line 355 changes again the condition of trigger B11 which thus starts its conduction through its lefthand triode. A positive impulse is applied to line 356 which comes back to the potential of line 357. The circuit which was completed through resistor 353 and diode 354 is then cut off.

A sixth negative impulse changes over again the condition of trigger B11 which once more starts its conduction through its righthand triode. In a parallel way the circuit is restored through resistor 353 and diode 354 thus giving rise to a negative impulse simultaneously applied to the two triodes of trigger B13. The condition of this trigger is again changed over, the conduction being restored through the righthand triode. The result is a negative impulse transmitted through line 358 and simultaneously applied to the two triodes of trigger B14. Consequently, the condition of this trigger is also changed over, conduction being set now through the lefthand triode.

A seventh negative impulse applied to line 355 changes over again the condition of trigger B11, which starts again its conduction through its left hand triode. In a parallel way line 356 comes back to line 357 potential cutting off the circuit existing through resistor 353 and diode 354.

An eighth negative impulse applied to the same line changes over again the condition of trigger B11, which starts again its conduction through its righthand triode. In a parallel way the circuit is restored through resistor 353 and diode 354, so that a negative impulse is again applied to the two triodes of trigger B13. The conduction of this trigger is also changed over so that this trigger starts again its conduction through its lefthand triode. The result is a positive impulse tranmitted through line 358, which is ineffective.

A ninth negative impulse changes over again the condition of trigger B11 which starts again its conduction through its lefthand triode. The result is a positive impulse applied to line 356 which stops conduction in resistor 353 and diode 354.

Finally, a tenth negative impulse also applied to line 355 changes again the condition of trigger B11 which starts conduction through its righthand triode. The circuit is restored through resistor 353 and diode 354, thus initiating a negative impulse which is applied simultaneously to the two triodes of trigger B13. The latter which is presently conductive through its lefthand triode is again conductive through its righthand triode, so that a negative impulse is again applied to line 358 and to the two triodes of trigger B14. The latter which is also conductive through its lefthand triode starts again its conduction through the righthand triode so that a negative impulse is again applied to line 359 and from there to the righthand triode of trigger B12. This trigger which is presently conductive on this side is also changed over to start again its conduction through its righthand triode. Finally all the triggers are brought back to their initial condition. In a parallel way a negative impulse is connected on line 360 which can control the carry-over operation or any other function.

The conduction state of various triggers B11, B12, B13 and B14 is summarized in this table:

|  |  | B11 | B12 | B13 | B14 | Registered Value |
|---|---|---|---|---|---|---|
| Separate Value | | 1 | 2 | 2 | 4 | |
| Initial State | | R | R | R | R | 0 |
| Impulse | 1 | L | R | R | R | 1 |
| Do | 2 | R | L | R | R | 2 |
| Do | 3 | L | L | R | R | 3 |
| Do | 4 | R | R | L | R | 4 |
| Do | 5 | L | R | L | R | 5 |
| Do | 6 | R | L | R | L | 6 |
| Do | 7 | L | L | R | L | 7 |
| Do | 8 | R | L | L | L | 8 |
| Do | 9 | L | L | L | L | 9 |
| Do | 10 | R | R | R | R | 0 |

The letter R means that the corresponding trigger is conits lefthand triode. Starting from initial value 0, when all the triggers are conductive through their righthand triodes, the recorded value corresponds to the number of negative impulses received by the assembly formed by the four triggers B11 to B14. If these triggers happen to be in a condition coersponding to an entered value which is not equal to 0, any negative impulse applied to them results in their progression towards a higher condition. For example, if the assembly of triggers B11 to B14 happens to be in the condition corresponding to an entry of the value 3 and, moreover, if four impulses are applied, their whole condition is successively changed over, so as to lead to that corresponding to the registered value 7. If eight additional impulses are now applied, their whole condition is successively changed over, so as to go through condition 0 again, after three impulses, and then to the condition corresponding to the value 5, after the last five impulses; the transit through condition 0 initiates an impulse collected on line 360 which can be used for the control either of a carry-over or of any other function.

ductive through its righthand triode. Similarly, letter L placed under one of the indications from B11 to B14 means that the corresponding trigger is conductive through The assembly formed by triggers B11 to B14 may be restored, either into condition 0, or into condit'on 9. The first mode of restoration is made necessary by the circuits, which have been adopted for the direct entering operation into the electronic accumulators or counters from the reading brushes of the feed mechanism, as well as for the transfers, while the second mode of restorat'on is made necessary for the performance of the calculations. The bias line coming from the righthand triodes of triggers B11 to B14 are connected all together for this purpose to a common line 361, while the bias lines coming from the lefthand triodes of the same triggers are connected together to line 361a. It is the same concerning the bias c'rcuits of triggers B10 and B16.

It is already explained that it is possible to make a trigger selectively conductive, through its right hand triode, or its lefthand triode, by means of a momentary cancellation of the corresponding triode bias. Th's is generally obtained by the operation of contacts E8–c (Fig. 3mm), E15–b, E21–n, E22–c and E23–c, which momentarily cancel this bias, or set it up for the duration of the calculations. By referring to Fig. 3d it can be noted that relay E23 picks up first the energizat'on of this relay being performed, as soon as contact E1–a comes back to n/c position. On the other hand, relay E22 picks up only a little later for it can occur only when contact E7–c is closed; in other words, after the energization of relay E7. It is the same concerning relay E8 (Fig. 3bbb), the energization of which is also controlled by a contact of relay E7.

By referring now to Fig. 3m it can be noted that a connection is normally established between line 243 and line 361, through contact A2–d closed and contact E22–c (n/c), thus ensuring the bias of the righthand triodes of triggers B11 to B14. The result is that these triggers are conduct've through their lefthand triodes, this condition of the assembly of triggers B11 to B14 corresponding, as it has been seen, to the registering of a 9. The closing of contact E23–c, which occurs later, has then no other effect than to complete the bias circuits required for the operation of the counter constituted by triggers B11 to B14.

As noted hereinafter relay E22 (Fig. 3d) picks up only when the operation to be performed is a transfer. The transfer of contact E22–c wh'ch occurs after closing of contact E23–c (Fig. 3mm) causes the temporary disconnection of line 361. The bias of the righthand triodes of triggers B11 to B14 is thus momentarily cancelled. These triodes become conductive and remain conductive when the bias of line 361 is restored. This condit'on of the assembly of triggers B11 to B14 corresponds to the registering of a 0. Contacts E8–c and E15–b work in a similar way with respect to the various trigger circuits shown in Figs. 3k, 3–l, 3m.

Triggers B11 to B14 receive, for each cycle, nine possible impulses, through a process to be described, so that the impulses transmitted through line 360 are spaced out along the various points of the successive cycles. As it will be noted, these impulses are transmitted at points 8, 7, 6, 5, 4, 3, 2, 1 and 0 of the various cycles. In the event that the counter unit constituted by tr'ggers B11 to B14 should have been reset to 0 at the beginning of the operations no carry impulse can be collected on line 360 during the first cycle. The counter unit may be brought to the position of digit 9.

The first impulse transmitted during the second cycle and which occurs at point 8 brings the counter unit when at "9" to the position of digit 0. A negative impulse is then collected on line 360. The next set of impulses brings the counter unit to the position of digit 8. The first impulse transm'tted during the third cycle brings the counter unit to the position of digit 9. The second impulse, which occurs at point 7, brings it again to the position of digit 0 so that a new negative impulse may be collected on line 360. Generally speaking, the impulses collected on line 360 occurs respectively during the 2nd, 3rd, 4th . . . , 9th and 10th cycles and also respectively at points 8, 7, 6 . . . , 1 and 0 of these various cycles. It is the same in case the counter unit constituted by triggers B11 to B14 should have been restored into the position of digit 9. However, the impulse collected on line 360 occurs then respect'vely during the 1st, 2nd, 3rd . . . , 8th and 9th cycles. In particular, no impulse occurs which is liable to be collected on line 360 during the 10th cycle.

The negative impulses which cause the progression of the counter unit occur in the way to be described at this point. It has been noted that line 345 (Fig. 3–ll) was initially biased at its lowest potential and that it received two impulses for each cycle point, the first being an impulse A which is meant for the bias of line 345 at its highest potential, the second being an impulse B which is meant to bring line 345 to its in'tial potential. It has been noted also that line 345 thus received ten impulse alternations respectively on points 9, 8, 7, 6, 5, 4, 3, 2, 1, 0 of the cycle. A branch of line 345 leads to the voltage divider formed by resistors 362 which controls the grid G1 of tube T18. Grid G2 of this same tube is controlled by the voltage divider formed by resistors 363 which is connected to line 296, coming from cathode circuit of thyratron 9U (Fig. 3kk). This cathode has initially the potential of ground line 242, since this thyratron is not yet fired, so that line 296 has also the potential of the ground line. In these cond'tions grid G2 of tube T18 (Fig. 3–ll) has a negative bias.

The first impulse received from line 345, wh:ch is a positive impulse A, gives a positive bias to grip G1 of tube T18. However, nothing else results for the moment, s'nce grid G2 has always a negative bias. The second impulse received from line 345 which is a negative impulse B imparts again to grid G1 of tube T18 a negative bias, cutting off the conduction of the tube. In a parallel way a positive impulse B occurs, coming from tube T4 (Fig. 3k) wh'ch causes the firing of thyratron 9U. Line 296 is thus brought to a positive potential so that grid G2 of tube T18 henceforth has a positive bias and keeps it up until the extinction of thyratron 9U; in other words, until the end of point 0. The third impulse received by line 345 which is a posit've impulse A occurring at point 8 ensures again a positive bias of grid G1 of tube T18.

Thus, conduction starts in this tube, grid G2 having a positive bias. The result is a voltage drop which occurs in load resistor 364 and, consequently a negat've impulse, which is collected on lines 365 and 365a. The fourth impulse received by line 345 which is a negative impulse B cuts off again conduction in tube T18, bringing back the potential of lines 365 and 365a to its highest value. The fifth impulse received through line 345, which is a positive impulse A occurring at point 7, restores the conduction in tube T18; hence a new negative impulse is collected on line 365. Finally, line 365 transmits nine negative impulses A respectively at points 8, 7, 6 . . . 1 and 0 of the cycle (positive impulses B transmitted through this same line will not be mentioned, since they are ineffective). These impulses are directed to contact 2A-16, line 355 and to trigger B11 (Fig. 3m).

It has been noted that tube T18 (Fig. 3-ll) was initially non-conductive. Consequently, line 365a has initially its highest potential, so that the control-grid of tube T19 has a positive bias. Subsequently, this tube is initially conductive. A voltage drop occurs in its load resistor 366a so that lines 367 and 368 have initially their lowest potential. Conduction starting in tube T18 (under effect of an impulse A) a voltage drop occurs in its load resistor; hence also a voltage drop which occurs into the voltage divider constituted by resistors 336. The control-grid of tube T19 is brought below its cutoff point, so that conduction is cancelled in tube T19. The result is a positive impulse collected on lines 367 and 368. The next impulse (impulse B occurring at point 8) restores conduction in tube T19 so that a negative impulse is now collected on lines 367 and 368. At the next point, first a positive impulse A, then a negative impulse B are also collected on these same lines. Finally, line 367 receives 9 negative impulses B respectively at points 8, 7, 6, . . . 1 and 0 of the cycle. These impulses may be transmitted also to trigger B11 (Fig. 3m), through contact 2A-16 transferred and line 355 (Fig. 3-ll). It will be noted in this case that the progression of the counter unit constituted by triggers B11 to B14 (Fig. 3m) is performed with impulses B and no longer with impulses A.

It can be noted also that the first negative impulse received through line 367 is applied to the input capacitor of the righthand triode of trigger B18 (Fig. 3-l). Thus, trigger B18 changes over its condition, so as to be conductive through its lefthand triode. The termination of the conduction into the righthand triode brings up the potential of line 384 to that of line 239, positive impulse which is ineffective since it is applied to trigger B4.

CONTROL OF THE SUCCESSIVE ADDITIONS

Let is be assumed that any number is to be multiplied by a multiplier of value 7. Seven cycles of successive additions are required so that it is convenient to control or cancel them through a selection. The present machine works in the first manner and comprises for the purpose a device for effecting the comparision of the multiplier with the number contained in the counter unit constituted by triggers B11 to B14 (Fig. 3m), which serves to control the successive additions permitted to start when the remaining number of cycles to be performed has exactly the value of the multiplier.

It has been noted that the firing of thyratrons 9U to 1U (Fig. 3kk and Fig. 3-ll) results in supplying progressively the voltage to the group of lines 369 (to which are connected lines 296, 304 to 305, Fig. 3-ll); that of these lines the one which corresponds to thyratron 9U being supplied at point 9, while the line corresponding to thyratron 1U is supplied at point 1. This group of lines leads to contacts 2A-23 to 31 (Fig. 3jj) which are presently in n/c position (when it is supposed that calculations are being performed). Subsequently, lines 190 (refer also to Figs. 3i and 3ii) are also progressively placed under voltage and it is the same for all the connected circuits. If the multiplier is registered in the first mechanical counter unit, for example, in the second position from the righthand side, a circuit may be set from contact stud 7 to the common and this at point 7 of each electronic cycle. This circuit is completed through contact 24A-9 closed (relay 24A has been picked up) and contact stud hub 192 of total exit. From there a connection must be set to one of hubs 370 (Fig. 3m) so that this circuit may go on toward line 371 if contacts SC1-31 to 34, SC2-31, 32 and SC4-31 are properly positioned. Subsequently, line 371 is placed under voltage at point 7 of each electronic cycle and keeps up then until the end of point 0. It has been seen also that the impulse which causes the firing of thyratron 7U (Fig. 3kk) is a B impulse so that line 371 is placed under voltage only at this moment.

Line 371 leads to contact E21-d and to the voltage divider formed by resistors 372. Moreover, this line has initially the potential of the ground so that grid G1 of tube T20 has then a negative bias and thus cuts off conduction into this tube. This same grid has a positive bias as soon as line 371 is placed under voltage.

On the other hand, it has been noted that trigger B14 emits a negative impulse through line 359, each time the counter unit formed by the assembly of the four triggers from B11 to B14 comes back to the position of digit 0. This impulse changes over the condition of trigger B12 so that the latter is then conductive through its righthand triode. The lefthand triode becoming non-conductive, a positive impulse occurs which is transmitted through line 373 and leads to contact E21-h and to the capacitor 374. This capacitor controls grid G2 of tube T20 which normally has a negative bias through resistor 375. The positive impulse occurring, this grid is brought above its cutoff point. However, there is no other result for the moment as long as grid G1 has not a positive bias also.

The counter unit formed by triggers B11 to B14 is restored, in calculation, to the position of digit 9. It receives in this case, for each cycle through line 355 nine negative A impulses respectively at points 8, 7, 6, 5, 4, 3, 2, 1 and 0 of the cycle. This results for each cycle the following effects:

FIRST CYCLE

The first negative impulse occurring at point 8 brings the counter unit to the position of digit 0, so that a positive impulse occurs then on line 373. This impulse is ineffective since grid G1 of tube T20 is negatively biased. Later a B impulse occurs which causes the firing of thyratron 7U (Fig. 3kk) and places line 371 under voltage (Fig. 3m). Grid G1 of tube T20 is then positively biased. However, nothing else results because grid G2 of this same tube has already come back to its original potential. In a parallel way the other negative impulses applied to the counter unit formed by triggers B11 to B14 bring finally this unit to the position of digit 8. At the end of point 0 there occurs also the extinction of thyratron 7U (Fig. 3kk) which brings back grid G1 to tube T20 (Fig. 3m) to its original potential.

SECOND CYCLE

The first negative A impulse occurring at point 8 brings the counter unit to the position of digit 9. The second negative A impulse occurring at point 7 brings this same counter unit to the position of digit 0. Then occurs a new positive impulse on line 373 which is again ineffective since grid G1 of tube T20 is always negatively biased. At the end of this same point occurs the firing of thyratron 7U which gives a positive bias to grid G1 of tube T20. Nothing else is as yet effected for grid G2 of this same tube has already come back to its original potential. The other impulses received by the counter unit formed by triggers B11 to 14 have no effect other than to bring it finally to the position of digit 7.

THIRD CYCLE

The first negative A impulse transmitted through line 355 and occurring at point 8 brings the counter unit to the position of digit 8. The second negative A impulse occurring at point 7 brings this same counter unit to the position of digit 9. At the end of this same point occurs a B impulse which causes the firing of thyratron 7U (Fig. 3*kk*), places line 371 (Fig. 3*m*) under voltage and thus ensures the positive bias of grid G1 of tube T20. At the next point there occurs a third negative A impulse which brings the counter unit formed by triggers B11 to B14 to the position of digit 0. A positive impulse then occurs transmitted through line 373 which gives a positive bias to grid G2 of tube T20. Conduction starts in this tube so that a negative impulse may be collected on the midpoint of load resistor 376.

This impulse is transmitted, on the one hand, to contact E21–j which is presently opened and on the other hand to the righthand triode of trigger B9 which is presently conductive. Thus, the condition of this trigger is changed over so that conduction starts now in the lefthand triode. There results from this a positive impulse which occurs on the output terminals of the righthand triode and which is ineffective, since it can be applied only to trigger B10.

Other negative impulses occur also during this same cycle, always transmitted through line 355 and which bring the counter unit formed by trigger B11 to B14 to the position of digit 6. At the end of this same cycle at point 18 there occurs a negative impulse transmitted through line 341 (Fig. 3–*l*) which leads to the lefthand triode of trigger B9 (Fig. 3*mm*). This trigger being conductive on this side is again changed over, so that it starts again its conduction through its righthand triode. Then occurs a negative impulse on the corresponding output terminals which is transmitted through contacts E21–*j* and 2A–18 (n/c), and finally applied to the righthand triode of trigger B10. This triode being conductive, the condition of trigger B10 is also changed over so that conduction henceforth starts in its lefthand triode. The righthand triode being now non-conductive, the corresponding output terminals are brought to their highest potential; they are connected to contact E21–1 and to the voltage divider formed by resistors 475 and to the voltage divider formed by resistors 377. This voltage divider controls grid G1 of tube T21 which is thus brought above its cutoff point.

FOURTH CYCLE

It can be shown first that trigger B9 is changed over at point 5 in order to be conductive through its lefthand triode and that again it is changed over at point 18, in order to start again its conduction through its righthand triode. The result is a negative impulse which is transmitted to the righthand triode of trigger B10 but which is ineffective since it is already non-conductive. On the other hand, a negative impulse cannot change over the condition of trigger B10 which is presently conductive through its lefthand triode, since the control-capacitor of this triode is connected to supply line 239 through resistor 378 and contact 2A–17 (n/c). Consequently, trigger B10 remains in that condition until the end of the addition cycles.

It has been noted also that line 368 receives positive impulses respectively on points 8, 7, 6, 5, 4, 3, 2, 1 and 0 of the cycle. These impulses enter the voltage divider formed by resistors 379 and bring grid G2 of tube T21 above its cutoff point. Grid G1 being also positively biased, conduction starts in tube T21 so that a voltage drop occurs in the load resistor 380. The result is a series of negative A impulses which are applied to line 382. These impulses are emitted at points 8, 7, 6, 5, 4, 3, 2, 1 and 0 of the cycle. They take part in the performance of the first addition cycle.

In the same way there occur successively during the following cycles:

5th cycle _____ 2nd cycle of addition.
6th cycle _____ 3rd cycle of addition.
7th cycle _____ 4th cycle of addition.
8th cycle _____ 5th cycle of addition.
9th cycle _____ 6th cycle of addition.
10th cycle _____ 7th cycle of addition.

Under these conditions a value equal to seven times the multiplicand may be entered into appropriate positions of the receiving electronic counter.

Moreover, the simultaneous performance of two multiplications may be realized, the multipliers being of any different digits. In such cases the first multiplication is controlled by tubes T20, T21, T28 and by triggers B9 and B10, as it has been just discussed. The second multiplication is controlled by tubes T23, T24, T29 and by triggers B15 and B16 in a similar way to the preceding. In particular tube T24 is arranged in a way quite similar to that of tube T21; it sends, through line 383, when necessary, 9 impulse alternations, at points 8, 7, 6, 5, 4, 3, 2, 1 and 0 of the cycle.

Other multiplications could be performed simultaneously by the addition of other similar devices.

It has been noted that trigger B14 sends, through line 360, a negative impulse each time the counter unit formed by trigger B11 to B14 comes back to the position of digit 0. It has been seen also that this occurs respectively for points 8, 7, 6 . . . 1 and 0 of the first nine cycles of successive additions and that no impulse is transmitted during the tenth cycle. These impulses are generally applied to the lefthand triode of trigger B17 (Fig. 3*kk*). The first impulse which occurs at point 8 of the first cycle changes over the conductive state of this trigger, so that it is then conductive through its righthand triode. In a parallel way trigger B8 (Fig. 3–*l*) is also conductive through its righthand triode, so that output line 335 has presently its lowest potential (about 100 volts). Trigger B8 is changed over at point 16 so that the potential of line 335 goes up then to its highest value. This same trigger is changed over again at point 18 so that the potential of line 335 comes back to its original value. The result is a negative impulse which is applied to the righthand triode of trigger B17 (Fig. 3*kk*) and which changes over again the condition of this trigger. The latter starts again its conduction through its lefthand triode. The righthand triode becoming non-conductive, the potential of the line 387 reaches its highest value. This line is connected to contact E21–*a* and to voltage divider formed by resistors 384 (Fig. 3*k*) which controls grid G2 of tube T22. Grid G1 of this same tube is biased by the voltage divider formed by resistors 407 which is connected to line 476. This line comes from tube T9 (Fig. 3–*l*) and is biased in a way similar to that of line 341, the variations of its potential, however, being of the order of 100 volts.

By referring to Fig. 8 it can be noted that line 341 has its highest potential from the end of point 16 to that of point 18. It is the same for line 476 (Figs. 3–*l*, 3*kk* and 3*k*), so that grid G1 of tube T22 is biased below its cutoff point. However, trigger B17 is presently conductive through its righthand triode, so that output 387 has now its lowest potential. Grid G2 of tube T22 is biased consequently below its cutoff point, so that no conduction can start in this tube.

It has been noted, moreover, that the condition of trigger B17 was changed over again at the end of point 18. Grid G2 of tube T22 is biased then above its cutoff point. But no other effect results from this for grid G1 of the same tube becomes again highly negative at this moment.

Similar effects occur during the next eight cycles. Trigger B17 receives, through line 360, negative impulses respectively on points 7, 6, 5, 4, 3, 2, 1 and 0 of these cycles, impulses which bring this trigger to conduction through its righthand triode. Moreover, the state of conduction of this trigger is only changed over again at the end of point 18 of each cycle. Consequently, grid G2 of tube T22 is constantly biased below its cutoff point every time that grid G1 gets a reversed bias.

It has been pointed out that line 360 (Fig. 3*m*) did not receive any negative impulse during the tenth cycle.

Therefore, the condition of trigger B17 (Fig. 3kk) is not changed over so that this trigger is continually conductive through its lefthand triode. The righthand triode being non-conductive, line 387 has its highest potential, so that grid G2 of tube T22 is continually biased above its cutoff point. For its part grid G1 of this same tube is provided with the same bias at the end of point 16. Thus, conduction starts in this tube, causing a voltage drop in load resistor 384a. This voltage drop affects line 478 and the voltage divider formed by resistors 386 and controlling the grid of tube T25. It brings this grid below its cutoff point and cuts off conduction into tube T25. A positive impulse results from this which is collected on line 263 and is ineffective when it is applied to trigger B1.

This same voltage drop initiated in resistor 384a is also applied to capacitor 388 and to the voltage divider formed by resistances 389. No effect results from this for the moment for the control grid of tube T26 is now biased below its cutoff point. The negative impulse transmitted through capacitor 388 cannot but reinforce this action.

Conduction which had started into tube T22 is cut off at the end of point 18, since the potential of its grid G1 is brought back below its cutoff point. Thus, the potential of line 478 comes back to its highest value initiating a positive impulse applied to capacitor 388. In a parallel way conduction is restored in tube T25 initiating a negative impulse transmitted to the lefthand triode of trigger B1, through lines 263 and 279. This trigger being presently conductive on this side its condition is changed over, causing a halt of the multivibrator, which occurs in the way already described.

For its part the positive impulse received by capacitor 388 brings the control-grid of thyratron T26 above its cutoff point. Conduction starts completing a circuit through line 391, contact 2A–12 (n/c), contact CT0–d (n/c), contact E11–k closed for the energization of relay E2. The result will be made apparent hereinafter.

Finally, it can be seen that the work of the circuit assembly causes a counting of the cycles, the counting element being the counter unit formed by triggers B11 to B14 (Fig. 3m). These same triggers direct also the circuits of multiplication, in the way already outlined and ensure also other functions to be explained hereinafter.

ELECTRONIC COUNTERS

As it has been already explained, the counters are of the type described in the patent application Serial No. 202,120, filed by L. R. Harper on December 21, 1950, now Patent No. 2,731,201. They are designed to work according to a system of decimal numeration but they can be adapted to an arrangement corresponding to other systems of numeration, for example, the duo-decimal system, or to two different systems.

Each electronic counter comprises a certain number of counter units in variable number but that can be increased at will by means of appropriate connections.

Each counter unit is constituted in a way similar to that of counter unit constituted by the assembly of triggers B11, B12, B13, B14 (Fig. 3m), as it can be verified by referring to Fig. 3ff. The first counter unit for example comprises triggers BA1, BB1, BC1, BD1 which are arranged in a way similar to that of triggers B11 to B14. The differences are as follows:

(1) The head trigger BA1 may be worked either by means of negative impulses coming from line 392 or by means of negative impulses transmitted through capacitor 393.

(2) In initial condition triggers BA1, BB1, BC1, BD1 are conductive through their righthand triodes. For this purpose the bias lines coming from these triodes are connected together to the same line 394 which is normally interconnected to bias line 243, through contacts E4–a and 46A–2, but which can be disconnected when the above-mentioned contacts are opened.

(3) The output impulse which occurs when the counter unit passes from condition 9 to condition 0 is collected on line 395, connected to the lefthand triode of trigger BD1.

With each counter unit are associated three electronic tubes, namely:

(1) An electronic diode TA1 (Fig. 3ee) which stops the impulses it receives and allows them through only when certain conditions are fulfilled.

(2) A thyratron TB1 (Fig. 3ff) which fires when the counter unit passes from condition 9 to condition 0 and which, thus, can control various functions (carry-over, control of the multiplication, control of transfer from counter to counter, and control of a transfer to a mechanical storage unit).

(3) A tube TC1 which receives the carry-over impulses from the counter unit of the immediately lower order and causes the progression of the units it controls.

It can be noted that the suffix characterizes the considered counter unit so that trigger BC3 belongs to the third counter unit and that tube TC8 controls the carry-over from the seventh counter unit to the eighth.

Tubes T30, T31, T32, T33 are also associated with an assembly of counter units.

The current supply of a set of triggers such as BA1, BB1, BC1, BD1 . . . is effected by line 239 (Fig. 3f) through coil 426 and resistors 515. Thyratrons such as T30, T31 are also connected in the above-mentioned circuit. The current supply of thyratrons, such as TB1, TB2, TB3 (Fig. 3ff) is effected by line 241, through contacts E17–c and E26–a. On the other hand, contacts such as E4–a, 46A–2 ensure the bias of triggers, such as BA1, BB1, etc. This bias is cancelled when these contacts are opened, thus bringing all the triggers controlled by these contacts to conduction through their righthand triodes, in other words, on the side marked by the cross.

Each electronic counter comprises a certain number of counter units which may be varied from one counter to the other (for example, eight units respectively for counters 1 and 2, 4 for counter 3, etc.). Under such conditions counter 1 is formed by units 1 to 8, counter 2 is formed by units 9 to 16, counter 3 is formed by units 17 to 20, etc.

With each counter are associated six relays, namely for counter 1 (Fig. 3e).

(1) A relay 42A for addition entries.

(2) A relay 43A for subtraction entries.

(3) A relay 44A controlling the transfers from counter to counter, transfers from a counter to a mechanical storage unit, the readout of entered quantities.

(4) A relay 46A controlling the zero reset device.

(5) A relay 45A modifying certain circuits should it be required to perform simultaneously two multiplications or two divisions.

(6) A relay 47A for the control of the balance sign.

As to columnar placement, the entry into electronic counters may be shifted at will 1 to 7 positions, in accordance with the nature of the operation to be performed. For this purpose, provision is made for three sets of transfer contacts controlled by relays SC1, SC2 and SC4, respectively, shifting the entry 1 column, 2 columns and 4 columns. In that way, it is possible to obtain:

(1) A shift of three columns by the simultaneous action of relays SC1 and SC2.

(2) A shift of five columns by the simultaneous action of relays SC4 and SC1.

(3) A shift of six columns by the simultaneous action of relays SC4 and SC2.

(4) A shift of seven columns by the simultaneous action of relays SC4, SC2, SC1.

In a parallel way a corresponding shift is obtained in the control circuit of the multiplication so as to associate a given shift with a digit of the multiplier.

The corresponding contacts are also shown at Fig. 3ee, concerning the entry into electronic counters, and at Fig. 3m, concerning the control of the multiplication.

By referring to Fig. 3ll it can be noted that an impulse transmitted to hub 396 is directed to contact 42A–1, controlling the entry into the first counter unit, if none of the contacts of relays SC1, SC2 and SC4 has been transferred, that this same impulse is directed to contact 42A–2 controlling the entry into the second counter unit, if only the contacts of relay SC1 are transferred, etc.

Moreover, provision has been made for a fixed connection between the contacts of the column-shift device and those of the various counter units, so as to simplify the connections. Under such conditions, an impulse, which would be normally directed to the eighth unit of counter 1 is directed to the first unit of counter 2, if relay SC1 alone is energized. This same impulse is directed to the second unit of counter 2, if relay SC2 alone is energized, etc. Such fixed connections may be subject to certain drawbacks that can be avoided by substitution for connections 402 of removable plug connections carried to the hubs of the connection panel.

OPERATION FOR ADDITION

If it is assumed that a transfer from a mechanical storage unit to the first four units of counter 1 is to be performed and that the number to be transferred is contained in the first mechanical storage unit and has the value 5678, relay 37A (Fig. 3hh) controlling the exit of the registered amount found in the first mechanical storage unit should pick up; it is the same for relay 42A (Fig. 3e) controlling the entry of addition into the first electronic counter. This can be obtained, for example, by the connection of hubs 160 (Fig. 3d) corresponding to the first stage of program, on the one hand, to that of hubs 193 (Fig. 3hh), corresponding to relay 37A, and on the other hand to that of hubs 144 (Fig. 3e), corresponding to relay 42A. With such connections made relays 37A and 42A pick up as soon as contacts 43A–c to f are placed under voltage. In a parallel way proper connections should be established between hubs 172, at the exit of the first storage unit (Fig. 3ii) and hubs 159 (Fig. 3ee) at the entry into the first four units of the electronic counter.

If it is assumed further that the product of 5678 by 7 is to be performed, then the parts about to be mentioned are involved. The electronic calculating device performs ten cycles which are controlled by the energization of relay R9 (Fig. 3aa). During each cycle thyratrons from 9U to 1U (Figs. 3kk, 3–l and 3–ll) are successively energized and fired respectively at the end of points 9, 8, 7, 6, 5, 4, 3, 2, 1, then all extinguished at the end of point 0. Thus, the group of lines 369 is progressively placed under voltage, as already explained, so that the lines of group 190 (Figs. 3i–3jj) are also placed under voltage, contacts 2A–23 to 31 being in n/c position.

The number present in the first mechanical storage unit having been supposed to be 5678 and being, for example, registered in the last four positions, the brushes associated with the read-out commutators are respectively on contact-stud 5 for the fifth position, on stud 6 for the sixth position, on stud 7 for the seventh position and on stud 8 for the last position. Consequently, these brushes are placed under voltage, respectively, at the end of points 8, 7, 6, and 5 of each electronic cycle and it is the same for contacts 37A–1 to 10 associated with these commutators, for those of hubs 172, which are associated with these contacts and for those of hubs 159 (Fig. 3ee) which have been connected to them. More specifically, the hub 159 corresponding to the first counter unit is placed under voltage at the end of point 8, that of a hub, corresponding to the second counter unit, is placed under voltage at the end of point 7, while those of hubs 159, corresponding to the third and fourth counter units are placed under voltage respectively at the end of points 6 and 5.

Considering only the first counter unit, corresponding hub 159 is connected to contacts SC1–1, SC2–1, SC4–1 (all supposed to be in n/c position) then to line 402 and leads to contact 42A–1 which is transferred owing to the energization of relay 42A.

Initially, line 369 (Fig. 3kk) coming from thyratrons 9U to 1U has the potential of the ground so that contact 42A–1 (Fig. 3e) has also this potential. Resistors 403 are also connected to the ground line so that no circuit can be completed. Consequently, resistor 404 and line 392 which come from this resistor have also the ground potential. In a branch on the line 392 there is also the anode of the diode TA1. The cathode of this diode is connected to line 398, then to triode T32. The anode of triode T32 is connected to line 241 (potential +50 volts), through load resistors 399. The cathode is connected to bias line 243 (potential −100 volts). The grid has a high negative bias with respect to the ground, through a voltage divider formed by resistors 401. As a matter of fact, the grid being at a higher potential with respect to the cathode, the tube is normally conductive. Subsequently a voltage drop occurs in resistors 399. The output line is connected to a voltage divider formed by resistors 399. The potential of this point during normal condition, in other words, when the triode is conductive, tends to set up at the value of −50 volts. The potential of line 398 should be minimum at the potential of the ground. For the purpose a diode 405 is connected between line 398 and ground line 242. With these conditions, as soon as the potential of line 398 tends to become negative, a circuit is completed, through diode 405, the lower end of resistor 399, line 241 (potential +50 volts) and triode T32. Subsequently, the potential of line 398 is taken from the ground. The first impulse received from tube T21 (Fig. 3mm), through line 382 and contact 42A–9 (Fig. 3f) transferred, is a negative impulse. It makes the grid potential momentarily negative with respect to the cathode. Conduction is cancelled in tube T32, causing an increase of the anode potential and, consequently, a positive impulse received on line 398. This positive impulse is effectively transmitted for diode 405 then counters the completion of a current coming from the ground line.

As noted hereinbefore, tube T32 receives through line 382 nine negative A impulses, respectively, at points 8, 7, 6, 5, 4, 3, 2, 1 and 0. Subsequently, nine impulses are received through line 398 on these same points. The anode and cathode of diode TA1 (Fig. 3ee) have initially the potential of the ground so that no conduction can start. Tube T32 (Fig. 3f) coming into action, positive impulses are emitted through line 398, but no effect results since the cathode of diode TA1 (Fig. 3e) is then brought to a higher potential than that of the anode and since conduction cannot start under such conditions.

Thyratrons 9U to 1U (Figs. 3kk to 3–ll) firing, contact 42A–1 (Fig. 3e) is placed under voltage, so that a circuit may be completed through resistors 403, towards ground line 242. In a parallel way a circuit is completed through resistors 404 and diode TA1 to line 398, which has now the potential of the ground line. There results from this a positive impulse which is applied to a trigger circuit.

It can be noted that line 402 is placed under voltage when impulse B occurs at the end of point 8. It remains in this condition until the end of point 0. The positive impulse occurring at point 7 and transmitted through line 398 brings the cathode of diode TA1 to a positive potential, thus cutting off the circuit set through resistor 404 and diode TA1. Then the potential of line 392 is brought to the potential value of the midpoint of resistors 403. The potential of line 398, then comes back to its original value, so that the circuit, through resistor 404 and diode TA1, is restored. Then occurs a voltage drop in resistor 404; hence a negative impulse which is transmitted through line 392 and which is applied simultaneously to the two triodes of trigger BA1. The condition of this trigger is changed over so that the first counter unit progresses one unit in the way already described.

Other positive impulses are applied to line 398 at points 6, 5, 4, 3, 2, 1 and 0 of the cycle, giving rise each time to a negative impulse transmitted through line 392. Subsequently, the first counter unit receives a total of eight impulses, so that it progresses eight units. If this counter unit is initially in condition 0 it is finally in condition 8.

To sum up, the transmission of the impulses coming from line 398 is cut off, as long as the assembly of the circuit formed by resistors 403 and 404 has the potential of the ground line. It is necessary to bring the junction point of these resistors to a positive potential to make possible the transmission of these same impulses. This voltage application may be controlled by means of the thyratrons and may be operated in conjunction with the quantities registered in the various electro-mechanical storage units. In this way it is possible to direct transfers from the electro-mechanical storage unit to the electronic counters, without any intermediate electro-mechanical storage unit.

The second, third and fourth counter units work in an identical way, the second unit nevertheless receiving seven impulses, since contact 42A-2 is placed under voltage with a delay of a cycle point, while the third and the fourth counter units receive, respectively, only six and five impulses, for a similar reason.

Finally, digit 5678 is recorded in the first four counter units, if these four units were initially in at the condition 0.

The operation of the electronic computer continuing, the preceding operations recur so that the first four counter units receive, respectively, eight, seven, six and five impulses with each new cycle. The first impulse applied to the first counter unit transfers this unit to condition 9; at this moment, all triggers BA1, BB1, BC1 and BD1 (Figs. 3f and 3ff) are conductive through their lefthand triode. The second impulse applied to this same unit transfers it back to condition 0, the condition of all triggers BA1, BB1, BC1, BD1 being changed over in the way already described. At this moment the lefthand triode of trigger BD1 becomes non-conductive leading to a positive impulse transmitted to capacitor 408, through line 395. This capacitor acts on the midpoint of the voltage divider, formed by resistors 409 which maintains normally the control-grid of thyratron TB1 at a negative potential. A positive impulse occurring this grid is momentarily brought to a positive potential and causes the firing of the thyratron TB1. Thus, line 410 is placed under voltage, due to the voltage drop occurring in resistor 411 in series with the cathode. This line is connected to contact 44A-1 and, from there to line 413, which controls the voltage divider formed by resistors 414. Line 410 being placed under voltage, the mid-point of resistors 414 is brought to a positive potential, thus bringing grid G1 of tube TC2 above its cut off point. However, no other effect results from this, for the moment, for grid G2 of this same tube is still negatively biased.

The reception of negative impulses continuing the first counter unit is brought to the position of digit 6 (addition of 8 with 8). In a parallel way, the second counter unit is successively brought to the position of digits 8, 9 and 0 causing the firing of thyratron TB2, then finally to the position of digit 4. In the same way the third counter unit is successively brought to the position of digits 7, 8, 9 and 0, causing the firing of thyratron TB3, then finally to the position of digit 2. And at the highest order, the 4th counter unit is brought to the position of digit 0 (addition of 5 with 5), causing the firing of thyratron TB4.

Grid G2 of one of the tubes, such as TC2 is connected to a common line 415, leading to the mid-point of a voltage divider formed by resistors 416 and controlled by line 324. This line comes from tube T12 (Fig. 3m) and has normally its lowest potential, because tube T12 is normally conductive. This tube is made non-conductive when trigger B6 (Fig. 3–l) is conductive, through its left hand triode and it has been seen that it is the same from the end of cycle point 11 to the end of point 15. At this time, line 324 is brought to its highest potential, so that the mid-point of resistors 416 (Fig. 3f) is now brought to a positive potential. It is the same for line 415, so that the grid G2 of tube TC2 is brought above its cut off point. Thus conduction starts into this tube, causing a voltage drop in its loaded resistor 417 and a negative impulse, which is applied to capacitor 418 and, from there, to the two control-grids of the triodes of trigger BA2. An additional carry-over impulse is thus applied to the second counter unit, the condition of which then progresses one unit. In a parallel way, conduction starts into tubes TC3, TC4 and TC5 (the last two not shown), causing negative impulses and, consequently, carry-over impulses applied, respectively, to the 3rd, 4th and 5th counter units.

Finally, the following operations are realized:

```
Initial condition                    0000
1st cycle, recording of 5678         5678
          ⎧ addition of 5678         5678
2nd cycle ⎨                          ────
          ⎩ carry-over               0246
                                     1111
Final result                        11356
```

Let us assume now a special condition of counter at 9999 and that a carry-over impulse is applied, for example, to the second counter unit, that this unit is in condition 9 and that certain of the next units are also in condition 9 (for example, the 3rd and the 4th). In this case, the carry-over impulse brings the second counter unit to the position of digit 0, thus causing the firing of thyratron TB2, Fig. 3ff. The carry-over is immediately performed, since grid G2 of tube TB3 is already positively biased and since the firing of thyratron TB2 brings grid G1 of this same tube above its cut off point. In these conditions, a carry-over impulse is again applied to the third counter unit. The latter being supposed in condition 9, is transferred to condition 0, causing the firing of thyratron TB3. Thus, a carry-over impulse is applied to the 4th counter unit, then to the 5th, etc., if this 4th counter unit is also in the position of digit 9.

Carries may be performed from the 8th unit of counter 1 to the first unit of counter 2. For this purpose, it is necessary to connect together hubs 419 and 420 by a plug wire. In this case, the voltage supply of line 421 leads to the voltage supply of line 422, Fig. 3f, so that tube TC9 may start off in a way similar to that of tubes TC2 and TC3.

It has been noted that at the end of point 16 there occurred the firing of thyratron T7 (Fig. 3–l) and that a very strong capacitor 330 was mounted in parallel with load resistor 329. A very high positive impulse is then transmitted to line 331 (refer also to Figs. 3–ll, 3m, 3mm and 3ff) and applied to capacitors 412. The result is the extinction of those thyratrons, such as TB1, TB2, etc., cause the impulse applied to their cathode, through capacitors which have fired. These thyratrons are extinguished betors 412, brings their cathode potential to a higher value than that of the anode.

*Operation for subtraction.*—One of the hubs 160, for example (Fig. 3d), that corresponding to the first stage of program may be connected to the hub 145 (Fig. 3e) corresponding to relay 43A.

In this instance, relay 42A (through its coil 42A-A) and also relay 43A pick up the circuit of the latter going through contact E24–d (n/c). Moreover, hub 419 (Fig. 3ff) must be connected to hub 423 and to hub 510 (Fig. 3e).

Let it be assumed that the number 5678 has been entered into the first four electronic counter units and that a number 1280 is to be subtracted therefrom, this number having already been entered into one of the first mechanical storage units. It is necessary to perform the same connections as before, in other words, to connect together exit hubs 172 (Fig. 3*ii*) and entry hubs 159 (Fig. 3*ee*) in the first four electronic counter units. The conditions under which the last hubs are placed under voltage remain unchanged, that of hubs 159 corresponding to the first counter unit being, however, connected to the ground through line 191 (Fig. 3*ii*) and resistor 194. Subsequently, those hubs 199, corresponding to 4th, 3rd and 2nd counter units are placed under voltage at the end of points 1, 2, and 8 (since the number recorded in the first mechanical storage unit is supposed to be 1280). In a parallel way, a connection should be set from hub 419 (Fig. 3*ff*) to hub 510, in case the balance sign should be controlled.

By referring to Fig. 3*f*, it can be noted that the circuit formed by contacts 43A-2 and 43A-3 has partly the potential of ground line 242 and partly the potential of bias line 243, this last connection being made through resistor 511. The transfer of contact 43A-2 connects one of the ends of this resistor to the ground through capacitor 512. A positive impulse results from this, which is applied to capacitor 435 and, through the latter, to a voltage divider formed by resistors 514. This voltage divider controls the grid of thyratron T30, which also becomes conductive. The anode circuit of this thyratron is connected to line 239, through coil 426 and resistors 515, load resistor 518 and capacitor 427. As branches of this circuit, there are lines 516 and 517, which supply the trigger circuits of the first electronic counter.

When thyratron T30 fires, a large voltage drop is applied to lines 516 and 517, which changes over the condition of all the trigger circuits belonging to this counter. Under such conditions, the quantity entered in the first electronic counter is transformed into its complement to 9, this operation being performed as described in the patent application filed on January 27, 1954, Serial No. 406,490, now Patent No. 2,813,676. The quantity recorded in the first electronic counter being for example, 00005678, the quantity contained in this same counter, after conversion, is 99994321.

In a parallel way, a negative impulse is sent to line 519 and applied to the voltage dividers, which control grid G2 of carry-over thyratrons TB1, TB2, etc., and they bring momentarily, these grids below their cut off point and thus prevent these thyratrons from ionization.

It must be noted also that thyratron T30 extinguishes itself.

The sequence of the operations is performed as already described; the transfer of contact E9-*a* (Fig. 3*kk*) starts the multivibrator, for example for one cycle. Value 1280 to be subtracted is inserted into the first electronic counter, the realized operation being then the addition:

```
99994321
00001280
99995601
```

The end of the calculation is finally marked by the energization of relay E1 (Fig. 3*k*). Contact E1-*a* (Fig. 3*d*) opens causing principally the drop out of relay 43A (Fig. 3*e*). Previously, contacts 43A-2 and 43A-3, Fig. 3*ee*, were transferred; moreover, this transfer held on during a time long enough to stabilize the voltages of the circuits leading to these contacts. Consequently, the circuit element comprising resistor 511, Fig. 3*f*, is completely at the potential of bias line 243. Contact 43A-3 coming back to n/c position, this circuit element is suddenly placed at the potential of the ground, through capacitor 511. A positive impulse results from this, which is applied to capacitor 435 and to voltage divider formed by resistors 514 and causes the firing of thyratron T30. A new conversion is operated in the way already described, transforming the value presently recorded in the first electron counter into its complement to 9. This value being 99995601, the value recorded in this counter after this second conversion is 00004398. It can be noted besides that 4398 is truly the result of the subtraction 5678−1280.

Assuming now that the quantity to be subtracted has the value 37251. There is obtained for these various phases of the calculation realized in the first electronic counter unit:

```
Initially recorded value        00005678
1st conversion                  99994321
Addition of 37251               00037251
                              1-00031572
Carry through connection 419-
  423 (Fig. 3ff)                       1
                                ─────────
Value recorded after addition   00031573
2nd conversion                  99968426
```

The presence of the digit 9 on the left is the well known sign which characterizes a balance registered by a complement. It can be noted, moreover, that a carry impulse occurs during the addition which is collected on hub 419 and directed to hub 510 (Fig. 3*e*). This carry-over impulse is a positive bias, which is stopped by resistors 521 and capacitor 524 and, finally, applied to the voltage divider formed by resistors 522. The control grids of thyratron T35 are thus brought above their cut off point, causing the firing of this thyratron. A circuit is then completed from line 241 to ground line 242, through resistor 523. A branch circuit is also completed through contact 43A-1, which is presently transferred and energizes latch-relay 47A. The energization of this relay denotes the existence of a negative balance entered in the first electronic counter.

The pick up circuit of relay 47A is cut off when relay 43A drops out and when contact 43A-1 comes back to n/c position. Later on there is effected the energization of relay E5 (Fig. 3*d*), as already noted. Contact E5-*c* opens, causing the energization of thyratron T35.

If it is assumed also that a new operation of addition is to be performed and that the value to be added to the preceding result is 67942. Then the operation is:

```
                              99968426
                              00067942
                            1-00036368
Carry through connection 419-423     1
                            ─────────
                            1-00036369
```

A carry-over impulse occurs also, which is collected as before on hub 419 (Fig. 3*ff*) and directed to jack 510 (Fig. 3*e*). Thyratron T35 is again ionized, however, the circuit being completed in addition through resistor 523 now goes through contacts 43A-1 and 46A-1 (n/c) to drop out the un-latching coil 47AD. Relay 47A is thus brought back to n/c position indicating the existence of a positive balance contained in the first electronic counter.

*Reading.*—The reading of the value present in an electronic counter is performed by the consecutive emission of 10 impulses, respectively at points 9, 8, 7, 6, 5, 4, 3, 2, 1 and 0 of the cycle. For this purpose, it is necessary to connect one of the hubs 160 (Fig. 3*d*), corresponding for example to the first stage of program, to hub 525 (Fig. 3*e*), so as to energize relay 44A. Should a calculation be working, a circuit is completed, from line 123 (Fig. 3*bbb*), through contacts E1-*b*, E2-*a* (n/c), contact E7-*a*, switch 146, commutator 230*b*, contacts 2F-6, 3C-3, R6-*e*, R35-*b* (n/c), contact E8-*a* closed, line 526 (see also Figs. 3*c*, 3*d*, 3*e* and 3*ee*), contacts 2F-27 (n/c), placing under voltage contact 44A-9, line 436 and all contacts 42A-1 to 42A-8, which are now in n/c position. Consequently, circuits may be set to resistors 403 and ground line 242, on the other hand, to resistor 404, diode TA1 and line 398. It is the same for all the other units of counter 1.

Triode T32 (Fig. 3f), which controls the bias of line 398, now has its grid connected to line 351, since contact 42A–9 is in n/c position. On the other hand, it has been seen that tube T16 (Fig. 3mm) sends 10 impulses into line 351, at points 9, 8, 7, etc. Consequently, 10 impulses are sent simultaneously to each unit of counter 1 in the way already described.

It is assumed that the number entered in counter 1 is 5678. The first impulse applied to the first counter unit, which is transmitted at point 9, brings this unit to the condition of digit 9. The second impulse, which is transmitted at point 8, brings this same unit to the condition of digit 0. At this moment, thyratron TB1 (Fig. 3ff) fires and keeps up then until the end of the cycle. The firing of the thyratron is synchronized with that of thyratron 8U (Fig. 3kk), so that it can play the same part as the latter: it can control, for example, another electronic counter for the entry of an "8."

It should be noted also that thyratron TB2 fires at the end of point 7 and that it can play the part of thyratron 6U. Generally speaking, all thyratrons TB1 to TB8 fire at the exact moment when it is advisable to control an electronic counter, in order to transfer to it the quantity, which was registered in the corresponding position of counter 1.

It can be noted also that each counter unit is brought back to its initial condition after reception of the 10 impulses. If the initial condition corresponds to digit 8, the final condition corresponds also to digit 8, so that the transfer operation may be taken again as many times as it is desired.

It was mentioned that relay 44A had picked up. Consequently, contacts 44A–1 to 10 (Fig. 3ff) are transferred, so that the firing of thyratrons TB1 to TB8 cannot cause the actuation of tubes TC2 to TC8, but can control, on the other hand, other functions that can be initiated through connections from hubs 174.

The transfer process is different if the transfer is to be performed into an electro-mechanical storage unit. In this last case, Fig. 3ee, relays 2A, 2F and R6 are energized, so that the voltage supply of line 435 is realized from line 123, through the contact of cam C7, Fig. 3e, contact 2A–22 transferred, contact R6–1 closed, contact E22–b (n/c) and contact 2F–27 transferred. The output impulses are supplied by relay E15 (Fig. 3cc), which is in series with the contact of cam C4, through contacts R31–1 (n/c) and 2A–8 closed. By referring to Fig. 6, it can be verified that the joint action of cam C4 and contact R31–1 allows through a total of 10 impulses at points 9, 8, 7, 6, 5, 4, 3, 2, 1 and 0 of the mechanical cycles. The impulses liable to occur at points 11 and 12 are stopped by the opening of contact R31–1. Consequently, relay E15 picks up consecutively 10 times for each mechanical cycle. This relay comprises a contact E15–A (Fig. 3mm), which, by means of its transfer, operates tube T27, in a way to be described now.

The control-grid of the left hand triode of tube T27 is connected to ground line, through resistors 439, while the control-grid of the right-hand triode is negatively biased by the voltage divider formed by resistors 440. Consequently, the left hand triode of tube T27 is conductive, so that a voltage drop occurs in the load resistor 441 and line 442 is brought to its lowest potential. Contact 2A–20 being transferred (since it has been supposed that relay 2A had picked up) the mid-point of resistor 346 has then its lowest potential, so that the control grid of tube T16 is biased below its cut off point and tube T16 is non-conductive.

Contact E15–A in n/c position maintains the two plates of capacitor 443 at the potential of the ground line. In a parallel way, the third blade of contact E15–a, line 444 and resistors 445 have the potential of line 241 (50 volts). The transfer of contact E15–a causes the interconnection of a circuit at potential 0 and of another circuit at a higher potential. A sudden voltage drop occurs then in line 444, hence a negative impulse transmitted to capacitor 446.

The grid of the left hand triode T27 is thus brought momentarily above its cut off potential, so that it stops the conduction in the triode. A positive impulse results from this, which is transmitted to capacitor 447 through line 442 and which also places the control-grid of tube T16 above its cut off point. Conduction starts in this tube, hence a negative impulse is collected on line 351. In a parallel way, a positive impulse is applied to the mid-point of resistor 440, which places the control-grid of the right hand triode of tube T27 above its cut off point. Conduction starts in this triode, hence a voltage drop in its load resistor 441a and a negative impulse applied to capacitor 448, which reinforces the action of capacitor 446.

The charge of the capacitors is stabilized, the control-grid of the right hand triode of tube T27 comes back to its original, potential placed below its cut off point. Thus conduction stops in this triode, hence a positive impulse is transmitted to capacitor 448 and applied to the mid-point of resistors 439. The control-grid of the left hand triode then comes back to a higher potential than that of its cut off point, starting again conduction in this triode. Then a negative impulse occurs and is transmitted through line 442, which stops conduction in tube T16, and hence a positive impulse is again collected on line 351. This negative impulse is also applied to capacitor 447, which reinforces the stopping action of the voltage divider formed by resistors 440.

Tube T27 remains then in this condition, so that it sends only a single impulse alternation collected on line 351. Incidently, the return to n/c position of contact E15–a initiates a positive impulse which is applied to capacitor 446, and which has no other effect. The same effects recur for each transfer of contact E15–a, so that line 351 finally collects 10 impulse alternations at points 9, 8, 7, 6, 5, 4, 3, 2, 1 and 0 of the mechanical cycle.

It is assumed that the number found in the first electronic counter is 5678 and that reference is to the first counter unit. The first impulse transmitted through line 351, which occurs at point 9, brings this counter unit to the condition of digit 9. The second impulse, which occurs at point 8, brings this unit to the condition of digit 0. Then occurs the firing of thyratron TB1 (Fig. 3ff) and the energization of line 410, contact 44A–1 transferred, and hub 174. However, as distinct from the usual carrying function of TB1 the impulse is used instead of virtue of its differential timing as a read out pulse to energize the electro-magnet of an electro-mechanical counter, or the registering electro-magnet in a storage unit. Reading is effected in a similar way, if the balance standing in a counter should happen to be negative. In this case, relay 47A (Fig. 3e) picks up, so that contact 47A–a is closed. Consequently, a circuit may be sent through this contact for the energization of coil 43A–A and relay 43A. Under these conditions, the value contained in the counter is transformed into its complement to 9, number 99968426 for example, being transformed into the complementary number 31573. In a parallel way, a circuit may be completed through diode 528, so that an impulse is available on hub 529, controlling the exit of a balance by complement.

*Data entry from the brushes.*—Data may be sent directly into the electronic counters from any of the rows of reading brushes, from the lower brushes, for example. Moreover, these data may be gathered with other data previously entered in any way in these counters. In order to perform such an entry in the first electronic counter, for example, it is necessary to set up proper connections between hubs 164 (Fig. 3c) and hubs 159 (Fig. 3ee) related to entry in the first electronic counter. In a parallel way, one of hubs 139 (Fig. 3dd) must be connected to one of the hubs 144 or 145 (Fig. 3e) controlling the entry for addition or for subtraction in this same counter. This connection may be performed by means of a class selector for example, so as to control selectively the addition or the subtraction and to associate this control with the nature of the cards which pass under the reading brushes.

As it has been already explained, entry from the reading brushes is generally controlled by the energization of relays 2F (Fig. 3dd) and 2A (Fig. 3aa). Relay E7 (Fig. 3d) picks up when contact E1–a comes back to n/c position. Contact E7–a being closed, a circuit is set through line 232, which energizes relay E22. Relay E23 picks up also in the already described way, the energization of this relay being, however, secondary to that of relay E22.

By referring to Fig. 3m, it can be noted that the bias of the right hand triodes of trigger B11 to B14 is first ensured through line 361, contact E22–c (n/c), contact A2–d closed and line 243. On the other hand, the left hand triodes bias is provisionally cut off and will be ensured only when contact E23–c, Fig. 3mm, is closed. Under such conditions, triggers B11 to B14 are conductive through their left hand triodes. The closing of contact E23–c does not bring any change of this condition. Later, contact E22–c is transferred, cutting provisionally the bias of the right hand triodes of triggers B11 to B14. The condition of these triggers is then changed over, conduction starting now, through the right hand triodes. Still later, relay 2A (Fig. 3aa) picks up, opening its contact 2A–24 (Fig. 3d), thus causing the drop out of relay E22. Contact E22–c is again transferred, however no change results from this in the condition of triggers B11 to B14, which continue to be conductive through their right hand triodes. This mode of restoration of the counter unit formed by triggers B11 to B14, corresponds to the entry of a zero. Triggers B10 to B16 are restored in a similar way, conduction starting also on the side marked with an encircled cross.

Contacts 2A–8 (Fig. 3cc) being closed, relay E15 picks up for each closing of the contact of cam C4. It then closes its contact E15–b (Fig. 3mm), which causes restoration of the general circuits. The various triggers shown at Figs. 3k, 3–l, 3m (other than those mentioned) are made conductive on the side marked with a cross. Contact 2A–4 (Fig. 3bbb) being transferred, relay E9 picks up also when cams C5 and C1 (Fig. 3cc) close their contacts together. As it can be seen by examination of Fig. 6, the successive energizations of relay E9 occur respectively at the mechanical cycle points 9, 8, 7, 6, 5, 4, 3, 2 and 1.

*Registering by addition.*—It is necessary for this control to set up a connection between hubs 139 (Fig. 3dd) and 144 (Fig. 3e). Relay 42A picks up through circuit: line 123, contact E1–a (n/c) (Fig. 3d), lines 137 and 137a, one of contacts 2F–13 to 24, that corresponding hub 139, connection leading to hub 144 (Fig. 3e) and the coil of relay 42A. As it has been explained, the counter unit formed by trigger B11 to B14 (Fig. 3m) receives first through line 355, 9 impulses at point 9 of the mechanical cycle: and thus it is brought to the condition of digit 9, so that no impulse is transmitted through lines 359 and 360. This same counter unit receives also, from the same line, 9 impulses at point 8 of the mechanical cycle: thus, it is brought, first to the condition of digit 0, and supplies then various impulses, which can be collected on lines 359, 360 and 373, then it is finally brought to the condition of digit 8. It is the same for mechanical points 7, 6, 5, 4, 3, 2 and 1, the impulses collected on lines 359, 360 and 373 occurring, however, at various points of the electronic cycle.

It has been noted also that relay E9 (Fig. 3bbb) picks up 9 times, respectively at points 9, 8, 7, 6, 5, 4, 3, 2 and 1 of the mechanical cycle. Each energization of relay E9 is accompanied by the transfer of contact E9–a (Fig. 3kk). Then a single primary electronic cycle occurs. As a matter of fact, contact 2A–14 (Fig. 3k) is transferred, so that the first negative impulse transmitted through line 341, at the end of the first primary cycle is directed to line 279 and to the left hand triode of trigger B1, restoring this trigger into its original, condition and stopping the multivibrator (which has been started up by the transfer of contact E9–a). Successively, 9 electronic cycles occur at points 9, 8, 7, 6, 5, 4, 3, 2 and 1 of the mechanical cycles.

It has been noted also that it was necessary to set proper connections between hubs 164 (Fig. 3c) and hubs 159 (Fig. 3ee). The input circuits of the electronic counter 1 are thus placed under voltage by the following general circuit: line 123, contact of cam C1 (Fig. 3cc), brushes 153, Fig. 3c, contacts 2E–1 to 80, hubs 164, wires to hubs 159 (Fig. 3ee), contacts SC1–1 to 8, SC2–1 to 8, SC4–1 to 8, all in n/c position, and contacts 42A–1 to 8 all transferred, due to the energization of relay 42A. In this way, circuits may be completed, on the one hand, through resistors 403–430 and ground line 242, and on the other hand, through resistors 404–431, diodes TA1 and TA8 and line 398. The impulses received by the latter may then be transmitted to the electronic counters.

However, this voltage application, which is synchronized with the run of the card under the reading brushes, depends upon the presence of a punched hole. Thus, if a reading brush is connected to the first electronic counter unit and if the punched hole read out by this brush is a 9, the control circuit of the first electronic counter unit is placed under voltage at point 9 of the mechanical cycle and only at this point. Similarly, if the punched hole read is a 4, this same circuit is placed under voltage at point 4 and only at this point. It is well to observe what occurs, respectively, for points 9, 8, 7, 6, 5, 4, 3, 2 and 1 of the mechanical cycle.

*Mechanical cycle point 9.*—Cam C1 (Fig. 3cc) closes its contact a first time so that relay E9 (Fig. 3bbb) picks up. Contact E9–a when transferred (Fig. 3kk) starts up the multivibrator. The latter sends immediately to line 276, 18 impulse alternations, which constitute the first primary cycle and are numbered 9, 8, 7, 6, 5, 4, 3, 2, 1; 0, 11, 12, 13, 14, 15, 16, 17, 18, respectively. The first 10 alternations are stopped by tubes T14–T15 (Fig. 3–ll), and then by tube T18, so that only 9 alternations are collected on lines 365 and 365a, respectively, at electronic cycle points 8, 7, 6, 5, 4, 3, 2, 1 and 0. The impulses received on line 365a are properly transformed by tube T19 and applied, on the one hand, to line 355 and to the counter unit formed by the assembly of 4 triggers B11 to B14 (Fig. 3m), and on the other hand, to line 368 (Fig. 3–ll and 3mm) and to control-grid G2 of tube T21. Grid G1 of this same tube is also positively biased, since it is controlled by the right-hand triode of trigger B10, which is non-conductive. Consequently, the impulses applied to line 368 start up tube T21. This tube sends, in its turn, 9 impulses, which are emitted through line 382. These impulses are transmitted through contact 45A–1 (n/c) (Fig. 3f), contact 42A–9 transferred, and are applied to capacitor 406. Tube T32 starts up, in its turn, sending 9 impulses, through line 398. If resistors 403–404 (Fig. 3ee) of the control circuit of the first counter unit are then placed under voltage, the impulses applied to line 398 are transmitted to line 392, in the way already described and are finally applied to the first counter unit. Line 398 receiving 9 impulses, this counter unit also receives 9 impulses and progresses 9 units. If a certain value happens to be already in this counter unit, carries may occur into the second counter unit and on to the others in the way already described. It should be recalled also that the first counter unit receives 9 impulses only in the instance where a 9 is read-out by the reading brush connected to this unit. If there is no "9" hole to be read, the control circuit of the first counter unit is not placed under voltage, so that the transmission of the impulses applied to line 405 is then not effected. A 9 may be entered in a similar way in any of the counter units, in case the particular unit is controlled for addition and a 9 is read out by that of the reading brushes to which it is connected.

On the other hand, thyratrons 9U and 1U (Figs. 3kk and 3–ll) fire in the way already described. This is generally of no consequence, since lines 369 are not presently connected to any circuit (due to the opening of contacts 2A23 to 31 of Fig. 3jj), however, line 305 (Fig. 3–ll) is placed under voltage at the end of point 1, when thyratron 1U fires. A little later, at the end of point 0, tube T10 (Fig. 3kk) starts up in the way already described. A negative impulse results, which is applied to line 318 and to the right hand triode of trigger B10 (Fig. 3m), contact 2A–18 being then transferred. This triode being now conductive, is made non-conductive, so that the condition of trigger B10 is changed over and is now conductive through its left hand triode. A voltage drop on the corresponding output terminals occurs, which is sent to grid G1 of tube T21, through the voltage divider formed by resistors 377. Thus, this grid is conditioned below its cut off point, so that the chance of any impulse transmission through tube T21 is selectively cancelled.

Finally, the counter unit formed by triggers B11 to B14 receives 9 impulses and is placed in the condition of digit 9. Those electronic counter units connected to reading brushes sensing a digit 9 also receive 9 possible impulses. The condition of trigger B10 is changed over, stopping differentially any impulse transmission through line 382.

*Mechanical cycle point 8.*—The same effects occur: cam C1 (Fig. 3cc) again closes its contact, causing the energization of relay E9 (Fig. 3bbb), which starts up, in its turn, the multivibrator by the transfer of its contact E9–a (Fig. 3kk); 9 impulses are again emitted through line 355 (Fig. 3–ll) and through line 368; these lines are ineffective for the moment, since conduction is now stopped in tube T21.

It has been noted that the counter unit formed by triggers B11 to B14 are brought to the position of digit 9. The first impulse which is now applied to this unit at point 8 of the second electronic cycle, places this counter in the condition of digit 0. Thus, a negative impulse is applied to line 360, in the way already described and transmitted to the left hand triode of trigger B10, contact 2A–17 being then transferred. It was noted that this triode was presently conductive. The condition of trigger B10 is changed over, so that it comes back to its initial condition becoming again conductive through its right hand triode. This results in bringing back the potential of control-grid G1 of tube T21 to a positive value, thus cancelling the cut off action exerted by this grid.

In a parallel way, an impulse, first positive and then negative, is applied to grid G2 of tube T21, through line 368, at the same point of the second electronic cycle. This impulse arrives when conduction is still cut off in tube T21 by the condition of grid G1 and it is ineffective. Other impulses are also transmitted through the same line 368 at points 7, 6, 5, 4, 3, 2, 1 and 0 of the second electronic cycle; and since they arrive while the cut off action of grid G1 of tube T21 has been cancelled; they are transmitted to line 382, in the known way and, from there, through tube T32 (Fig. 3f) to line 398. Thus, this line receives 8 impulses at the points 7, 6, 5, 4, 3, 2, 1 and 0, respectively, of the second electronic cycle. An 8 may be then entered in a way similar to that already described, in any electronic counter unit connected to a brush sensing digit 8, since the circuit completed through the punched hole places under voltage one of contacts 42A–1 to 8 and thus allows the transmission of the impulses received by line 398.

At the end of point 0, line 318 (Fig. 3mm) again receives a negative impulse, which changes the condition of trigger B10 and makes it conductive through its left hand triode. Grid G1 of tube T21, is then negatively biased, resulting again in the cancellation of any impulse transmission through tube T21.

Finally, an 8 is entered in any electronic counter unit connected to a brush sensing a digit 8, while the counter unit formed by triggers B11 to B14 is finally placed in the position of digit 8.

*Mechanical cycle point 7.*—Cam C1 (Fig. 3cc) again closes its contact and causes the energization of relay E9 (Fig. 3bbb), which transfers its contact E9–a (Fig. 3kk) and starts up the multivibrator. Again, 9 impulses are sent, through line 355 (Fig. 3–ll), and through line 368. The first brings the counter unit formed by trigger B11 to B14, first to the position of digit 9, for the impulse occurring at electronic cycle point 8, and then to the position of digit 0, for the impulse occurring at the electronic cycle point 7. A negative impulse is then transmitted to line 360. The other impulses transmitted through line 355, bringing the counter unit formed by triggers B11 to B14 to the position of digit 7.

The first two impulses transmitted through line 368 are ineffective, for grid G1 stops conduction in tube T21. At the end of the electronic cycle point 7, a negative impulse is transmitted through line 360, which is applied to the left hand triode of trigger B10 and changes over the condition of this trigger. The latter comes back to its initial condition, which corresponds to a positive bias of grid G1 of tube T21. The cut off action of this grid being cancelled, the 7 following impulses are transmitted through tube T21 to line 382 and through tube T32 (Fig. 3f) to line 398. Thus, a 7 may be entered in any electronic counter unit connected to a brush reading a 7.

At the end of electronic cycle point 0, line 318 (Fig. 3mm) receives again a negative impulse, which changes over the condition of trigger B10 and initiates a negative bias of grid G1 of tube T21 so that conduction in this tube is stopped.

Finally, it can be seen that the joint action of tubes T18 and T19 (Fig. 3–ll), of the counter unit formed by triggers B11 to B14 (Fig. 3m), and of trigger B10 and of tube T21, results in the emission, through line 382 of a number of impulses corresponding to the value of the punched holes successively read by the brushes. Numbers, corresponding to the value of these punched holes, may then be entered in the various electron counter units and be accumulated with numbers already entered. Carries may be performed from a unit to the other, in the way already described.

The subtractive entry is performed in a quite similar manner, with the difference that it is placed between two conversions. The latter are performed in a way already described.

*Transfers to electronic counters.*—Transfers to electronic counters (by addition or subtraction), may be performed during any stage of the electronic program, these transfers being performed, either from another electronic counter, or from an electro-mechanical counter, or from any other entry receiving device (a relay-operated registering device, for example). They require the control of an electronic program relay, the energization of the output relay or total relay of the emitting device and, according to the instance, the energization of the input relay for addition or for subtraction of the receiving counter.

In order to perform a transfer during the first stage of program, for example, it is necessary to direct the impulses available on hubs 160 (Fig. 3d):

(1) Either to relay 44B (Fig. 3e), if the value to be transferred is contained in the second electronic counter, or to relay 24A (Fig. 3hh), if this value is contained into the first electronic counter, or to one of the relays 37A or 14A (Fig. 3j), if this value is contained in the first mechanical or relay-operated storage unit.

(2) Either to hub 144 (Fig. 3e), if the transfer is to be performed by addition, or to jack 145, if the transfer is to be effected by subtraction.

Moreover, the following occurs as previously indicated:

(1) Energization of relays E7 and E23 (Fig. 3d) when contact E1–a comes back to the n/c position.

(2) Simultaneous energization of relays E11, E22, CT0 and E8 (Fig. 3bbb), through contacts E7–a, E7–c (Fig. 3d) and E7–e presently closed.

(3) Energization of relay E9 (Fig. 3bbb), through contact E8–a now closed.

In this instance, none of relays CT1 to CT8, Fig. 3d, should be energized. Consequently, the following circuit may also be completed: line 123, contact E1–a (n/c), contact E7–c closed, contacts CT1–b to CT8–b (n/c), and the coil of relay E22. Relay E22 picks up and transfers its contact E22–c (Fig. 3m). In a parallel way, relay CT0 (Fig. 3dd) picks up through circuit: line 123, contacts E1–a and E2–b (n/c), line 138, contacts CT8–c to CT2–c (n/c), contacts E7–e closed and the coil of relay CT0. This relay holds and transfers its contact CT0–d (Fig. 3k).

Transferred contact E9–a, Fig. 3kk, starts up the multivibrator, as previously indicated, however this action is available for one cycle only, as it will be explained. To begin with, it should be mentioned that the transfer of contact E22–c (Fig. 3m), which is performed following the closing of contact E23–c, Fig. 3mm, results in the cancellation of the right hand triode bias of the counter unit formed by triggers B11 to B14. These triodes then become conductive, so that this counter unit is restored to the zero condition. This counter unit next receives 9 impulses from line 355, as previously indicated. Thus, it passes to the condition of digit 9, so that no negative impulse is applied to line 360. Trigger B17 (Fig. 3kk) then happens to be in its original condition, being conductive through its left hand triode. Under such conditions, line 387 is at its highest potential, thus placing grid G2 of tube T22 above its cut off point. Consequently, this tube may react under the impulses coming up through line 476. Thus a positive impulse occurs, which fires thyratron T26, Fig. 3k, and a negative impulse is transmitted through line 263, commutator 230, contact 2A–14 (n/c) and line 279. The latter impulse is applied to the left hand triode of trigger B1. This trigger, which has been changed over at the transfer of contact E9–a, is again changed over, so that it starts again its conduction through its right hand triode, thus stopping the action of the multivibrator immediately at the end of the first cycle.

By referring to Fig. 3mm, it can be noted that trigger B10 has been restored, so as to be conductive through its left hand triode. Line 530, consequently, is at its highest potential, so that grid G1 of tube T21 is biased above its cut off point. This tube may react under the impulses coming up through line 368.

In a parallel way, the firing of thyratrons 9U and 1U (Figs. 3kk and 3–l) occurs, so that lines 369 are progressively placed under voltage. It is the same for contacts 2A–23 to 31 (Fig. 3jj), for lines 190 and for the contact-studs of the reading unit associated to the first electro-mechanical counter (it may be supposed that the value to be transferred is contained in this counter). Consequently, contacts 24A–1 to 10 (Fig. 3i) are also progressively placed under voltage, according to the value of the various digits of the number contained in this counter. It is the same for hubs 171 and the latter should be connected to hubs 159 (Fig. 3ee), as considered hereinbefore.

During this same electronic cycle, 10 impulses are entered into tubes T14, T15 (Fig. 3–ll), and then transmitted through line 345 and contact 2A–20 (n/c) (Fig. 3mm) to tube T16, and, from there, finally, to line 351. These impulses may be transmitted to the 27th electronic counter. It has been noted that thyratrons TB9 to TB16 (Fig. 3ff) fire differentially as to thyratrons 9U to 1U, in other words, at the exact moment, when it is advisable to control an electronic counter unit in order to enter the number to be transferred. Consequently, a transfer may be effected from the second electronic counter, in case hubs 174a (Fig. 3ff) should be connected to hubs 159 (Fig. 3ee).

It has been noted also that 9 impulses were received by tube T21 (Fig. 3mm) from line 368. These impulses are transmitted to line 382 and may be directed to the first electronic counter for its control, either for addition or for subtraction, in the way already described. In the first case, the impulses available on hubs 160 (Fig. 3d) should be directed to hub 144 (Fig. 3e), leading to the energization of relay 42A alone; in the second case, these same impulses should be directed to hub 145, leading to the simultaneous energization of relays 42A (which picks up through its coil 42A–A) and 43A.

Finally, a single electronic cycle occurs, the end of which is marked by the firing of thyratron T26, Fig. 3k, and the energization of relay E1, contact CT0 then being transferred.

*Operation for multiplication.*—The operations for multiplication may be gathered from what has been explained separately hereinbefore. It is to be described now in a condensed form, in order to better emphasize the succession of the various operations. It is assumed that the multiplicand may be any number and that it can have a maximum size of 8 digits, and the multiplier any other number that can have a maximum of 5 digits. It is assumed also that the multiplier and the multiplicand are entered, respectively, in electronic counters 1 and 2 and that these counters have the required capacity for holding numbers of 8 and 5 digits, respectively. Moreover, it may be considered as a particular case where the multiplicand would have value 678,023 and the multiplier the value 02013. It is also supposed that multiplication is controlled by the first stage of program, but it is quite obvious that it can be controlled by any stage. The impulse available on hubs 160 (Fig. 3d), when contact E1–a comes back to n/c position, must be directed through the proper connections:

(1) To hub 237, Fig. 3dd, so as to energize relay CT5 and insert a 4 column shift into the first cycles of successive additions.

(2) To hubs 193, corresponding to relay 24A (Fig. 3hh), in order to have the possibility to transfer the multiplicand to the electronic counters.

(3) To some of the same jacks 193 corresponding to relay 24B, so as to have the possibility to control the multiplication circuits.

(4) To hubs 144 and 144a (Fig. 3e), so as to energize relays 42 to 42B, controlling the entry for addition into electronic counters 1 and 2 (the multiplicand and the multiplier may have respectively 8 and 5 digits and the product 13 digits, which requires its entry in the first two electronic counters).

In a parallel way, the following connections should be set up:

(1) From output hubs 171 of electro-mechanical counter 1 (Fig. 3i) to input hubs 159 (Fig. 3ee) of the electronic counters. The data entry circuits of the electronic counters are thus directed through the contacts of relays SC1, SC2 and SC4.

(2) From output hubs 171a of electro-mechanical counter 2 (Fig. 3i) to those of jacks 370 referenced 1 to 5 (Fig. 3m). The various digits of the multiplier are then successively selected by the operation of contacts SC1–31 to 34, SC2–31 and 32 and SC4–31.

(3) From hub 419 to hub 420 (Fig. 3ff), so as to convey the carries from electronic counter 1 to electronic counter 2.

The various connections to which reference has been made will be established before the machine is started.

Relay 43A (Fig. 3d) being energized, a circuit is completed through contact E1–a (n/c), line 137 and 137a, one of contacts 43A–c to f, one of hubs 160 and contact E11–d, Fig. 3dd, meant for the pick up of relay CT5. Immediately relay SC4 (Fig. 3e) picks up through line 123, contacts E1–f, E2–c, CT8–d, CT7–e, CT6–c (n/c), contact CT5–e transferred. In a parallel way, the following occur:

(1) Energization of relays E7 and E23 (Fig. 3d), due to the return to n/c position of contact E1–a.

(2) Energization of relay E11, due to the closing of contact E7–c.

(2a) Temporary holding circuit of relay CT5, through contact E7–c, this holding being realized through contact CT5–b transferred and coil CT5A.

(2b) Energization of relay E8 (Fig. 3bbb), through contact E7–a closed.

(3) Energization of relay CT4 (Fig. 3dd), due to the transfer of contact CT5–c.

(3a) Energization of relay E9 (Fig. 3bbb).

Moreover, a holding circuit is set for relay CT4 (Fig. 3dd), which breaks the circuit leading to coil CT5–A.

The transfer of contact E9–a(Fig. 3kk) starts up the multivibrator for 10 primary cycles as already described, however, no cycle of addition results for the moment since the first digit of the multiplier is a 0.

Relay E2 picks up at the end of the 10th primary cycle as already described causing the transfer of contact E2–b (Fig. 3d), the opening of contacts E2–a and E2–c and the breaking of all the circuits going through these contacts in n/c position. In particular there occurs the drop out of relays E8, E9, SC4 and CT5 (refer in general to Figs. 3b, 3d and 3e). Relay CT4 remains picked up through its coil CT4–A. The transfer of contact E2–b also causes the energization of relays E17 and E5 (Fig. 3d). The later by opening its contact E5–a (Fig. 3k) breaks the pick-up circuit of relay E2. Contacts E2–a, E2–b, E2–c coming back to the n/c position, relays CT3, SC2 and SC1 pick up (due to the condition of closed contacts CT4–c, e and f) and in a parallel way, relays E8 and E9 pick up also (Fig. 3bbb).

Contact E9–a (Fig. 3kk) being again transferred, the multivibrator is started up again for 10 primary cycles. During each of these cycles, the successive firing of thyratrons 9U to 1U occurs and the progressive application of voltage to lines 369 and to all the circuits connected to these lines. For a particular coincidence, line 371 (Fig. 3m) is placed under voltage when thyratron 2U fires at the end of point 2 of each primary cycle. Since it has been supposed that the multiplier was number 02013, the 4th digit of it is a 2. The position of the electromechanical counter where this digit is entered is connected to that hub 370 referenced 4, which is connected to line 371, through contacts SC1–32 and SC2–31 transferred and contact SC4–31 in n/c position. Line 371 being under voltage, grid G1 of tube T20 is positively biased, however, no other effect results for the moment, as long as the potential of grid G2 of this same tube is not brought up to a positive value.

It has been noted that the counter unit formed by triggers B11 to B14 was restored, in calculation, to the condition of digit 9 and that it received for each primary cycle, 9 impulses respectively at electronic cycle points 8, 7, 6, 5, 4, 3, 2, 1 and 0. These impulses result in the differentially timed transit of this counter unit, through condition 0 and it has been explained that at such times a positive impulse was applied to line 373. It has been seen also that this impulse was applied at the following cycle points according to the one of the primary cycles where it occurred:

Primary cycle 1 _____ Point 8.
Primary cycle 2 _____ Point 7.
Primary cycle 3 _____ Point 6.
Primary cycle 4 _____ Point 5.
Primary cycle 5 _____ Point 4.
Primary cycle 6 _____ Point 3.
Primary cycle 7 _____ Point 2.
Primary cycle 8 _____ Point 1—this controls two times operation.
Primary cycle 9 _____ Point 0.
Primary cycle 10 _____ No impulse.

The impulses occurring during the first 7 primary cycles are ineffective, because they occur while grid G1 of tube T20 is negatively biased. In particular, the impulse applied to line 373, during the 7th primary cycle at point 2 of this cycle is an A impulse. It is ineffective with the impulse making grid G1 of tube T20 positive, which is a B impulse. On the other hand, the impulse applied to line 373, during the 8th primary cycle is effective for the operation of tube T20. Immediately a negative impulse occurs which changes over the condition of trigger B9. Line 341 sends at point 18 of this same cycle a negative impulse, which changes over again the condition of trigger B9, and it has been noted also that a negative impulse occurs, transmitted through contacts E21–j and 2A–18, which changes over the condition of trigger B10. A positive impulse is then applied to the terminals of the right hand triode of this trigger and, from there, to contacts E21–1 (n/c) and to resistors 377. The grid of tube T21 is then positively biased and keeps up until the end of the cycles, no impulse being applied to the left hand triode of trigger B10 (contact 2A–17 is in n/c position and stops the impulses, which may come from line 360). In this way, tube T21 may react to the impulses coming from line 368, and which are finally applied to line 382.

Subsequently, a transfer occurs of the multiplicand from the storage counter to the electronic counters during the 9th primary cycle, and a second transfer during the 10th cycle. However, these transfers are shifted 3 columns to the left, due to the energization of relays SC1 and SC2, so that the effected operation is finally the following:

1st transfer _____ 678023,000
2nd transfer _____ 678023,000

Provisional result entered in the electronic counter= 1356,046000.

As relay E2 (Fig. 3k) picks up, a drop out of relays E23, 28, E9, CT4, SC2 and SC1 occurs and, in particular, the opening of contact E23–c (Fig. 3mm). Then there occurs a general restoration of the control circuits of the electronic counters as already described. In a parallel way, relays E17 and E5 (Fig. 3d) pick up and immediately relay E2 drops out. It may be then noted that relays CT2, SC2, E23, E8 and E9 pick up, the transfer of contact E9–a (Fig. 3kk), again starting up the multivibrator for 10 cycles. However, no transfer is directed to the electronic counters, for it was supposed that the third digit of the multiplier was equal to 0 (multiplier 02013).

A new energization of relay E2 causes a drop out of relays CT3, SC2, E23, E8 and E9 and a little later, when contacts E2–a, b and c come to the n/c position, relays CT1, SC1, E23, E8 and E9 pick up. The multivibrator starts up again for 10 cycles, but only a single transfer of the multiplicand occurs, shifted a single column, the effected operation being the following:

Preceding result _____ 1,356,046,000
A single transfer _____     6,780,230

New result _____ 1,362,826,230

A new energization of relay E2 now causes the drop out of relays CT2, SC1, E23, E8 and E9, and then contacts E2–a, b and c, coming back to the n/c position, relays CT0, E23, E8 and E9 are picked up. The multivibrator starts up a last time for 10 cycles and then 3 additional transfers of the multiplicand occur, the effected operation being:

| | |
|---|---:|
| Preceding result | 1,362,826,230 |
| 1st transfer | 678,023 |
| 2nd transfer | 678,023 |
| 3rd transfer | 678,023 |
| Result | 1,364,860,299 |

Thus the product is obtained of the multiplication of 678023 by 2013.

The energization of relay CT0 leads to the opening of contact CT0–b (Fig. 3d) and to the drop out of relay E6. Thus, contact E6–a (Fig. 3k) comes back to n/c position, so that the drop out of relay E1 is now dependent upon the simultaneous opening of contacts E5–a and E6–a. Relay CT0 holds, as already described, through its coil CT0A, its contact CT0–a and contact E5–b (n/c). It transfers its contact CT0–d (Fig. 3k), so that the circuit from line 391 is directed to relay E1. This relay then picks up at the end of the calculation and initiates the same functions as relay E2 (drop out of relays E23, E8, E9, etc.). However, contact E1–a (Fig. 3d) is transferred, leading to the drop out of relay 43A and of all the relays controlled through hubs 160. Another stage of program may then develop for the control either of another multiplication or of a transfer, or of a division, and it can be followed by a third or a fourth stage, etc.

An example of calculation has been described in which the multiplier and the multiplicand were present in electro-mechanical counters. The whole operation of the machine would have been the same, if one of these factors or both happened to be entered in electronic counters or other devices of storage, such as the relay-operated storage unit which has been described.

In other instances, it may be required to operate simultaneously two multiplications, in order to accomplish at once operations such as $A \times B$ and $C \times D$. In this case, the counter containing the second multiplier is connected to hubs 464 (Fig. 3m). A line 465 is placed under voltage in the same manner as line 371. It puts into operation a control unit formed by triggers B15, B16 and tubes T23 and T24 which works in a way quite similar to that of the unit formed by triggers B9 and B10 and tubes T20 and T21. The impulses coming from line 368 are collected in this case, on line 383. In a parallel way, it is advisable to energize relay 45A (Fig. 3e) for example, if the transfers are to be performed to the first electronic counter, which is obtained by the interconnections of hubs 160 and 466 (refer also to Fig. 3d). Contact 45A–1 (Fig. 3f) being transferred, the input impulses which operate the first counter unit are then those from line 383.

Similarly, if multiplications are to be performed of factors having more than 8 digits, in this case, two stages of program are required. Moreover, it is necessary to change the connections leading to hubs 159 (Fig. 3ee), 370 and 464 (Fig. 3m) so as to take into account the relative order of value of the various factors. This may be obtained either by use of hubs 370 only for the control of the multiplication and by change of the corresponding circuits through selectors, or by use simultaneously of hubs 370 and 464. In the latter case, the transit from the first to the second is operated simply by the energization of relay 45A (Fig. 3e).

*Operation for division.*—The operation for division is performed in a way about to be described and in which subtraction cycles are alternated with addition cycles.

It is assumed that the example is the division of 130320 by 46. Successive subtractions of the divisor are first performed till a negative remainder is obtained. These subtractions are performed in the way which has been described, after conversion of the dividend into its complementary value. Along therewith, a unit is entered in the appropriate position of the counter allotted for the reception of the quotient. The operations are as follows:

| | Dividend | Quotient |
|---|---|---|
| Conversion of the dividend | 00130320 99869679 | 000000 |
| 1st addition of 46 | 46 | 1 |
| 2nd addition of 46 | 99915679 46 | 010000 1 |
| 3rd addition of 46 | 99961679 46 | 020000 1 |
| Re-cycling of the carry | X— 00007679 1 | |
| Conversion of the dividend | 00007680 99992319 | 030000 |

It can be noted that the third subtraction gives rise to a carry which appears at the highest order position of the dividend counter and which is marked by letter "X" placed immediately on the left of the corresponding results. This carry indicates the sign of the result and determines particularly that it is necessary to stop the subtraction cycles.

The operations could be continued in a known manner which consists in correction of a negative result by adding once the divisor and by subtracting in parallel a unit from the value of the quotient, after which, a one column shift is operated and successive subtractions of the divisor are resumed till another negative remainder is obtained. However, this mode of operation is subject to various drawbacks: a corrective cycle is necessary, during which it is necessary to change the control of the counters where the dividend and the quotient are recorded. This results in complications and in a relatively important loss of time in case the control for addition and subtraction of the electronic counters should be performed through relay contacts.

Returning to the preceding calculation, it can be noted that 2 is too small a value of the quotient since the division remainder is positive, while 3 is too high a value. Instead of searching successively whether the increasing values 2, 1—2, 2—2, 3, etc., form a better approximation of the quotient value (which can be obtained by a series of successive subtractions) it is also possible to search for the decreasing values 2, 9—2, 8—2, 7, etc., the functioning of these operations being performed by successive additions of the divisor in appropriate positions of the dividend counter, and these additions being combined with the subtraction of a unit in an appropriate position of the counter receiving the quotient. In this way, the corrective cycle is avoided while directing the operation of the machine toward the calculation of a better approximation of the quotient value, thus performing the following operations (after a one column shift):

| | Dividend | Quotient |
|---|---|---|
| Conversion of the quotient | 99992319 | 030000 969999 |
| 1st addition of 46 | 46 | 1 |
| 2nd addition of 46 | 99996919 46 | 970999 1 |
| Re-cycling of carry | X— 00001519 1 | |
| Conversion of quotient | 00001520 | 971999 028000 |

As the remainder has become positive, it indicates that 28 is too small a quotient value while 29 is too high a value. It can be noted that a carry occurs at the left of the dividend when the remainder becomes again positive and the carry indicates that the addition cycles should be stopped. Then subtractions are taken again after a shift of one column to the right, the operations being at this time:

|  | Dividend | Quotient |
|---|---|---|
| Conversion of the dividend | 00001520 99998479 |  028000 |
| 1st addition of 46 | 46 | 1 |
| 2nd addition of 46 | 99998939 46 | 028100 1 |
| 3rd addition of 46 | 99999399 46 | 028200 1 |
| 4th addition of 46 | 99999859 46 | 028300 1 |
| Re-cycling of the carry | X— 00000319 | 1 |
| Conversion of the dividend | 00000320 99999679 | 028400 |

The carry at the left of the dividend indicates also that the remainder is negative and that it is necessary to again take the addition cycles.

Generally considered, the formation of the quotient value by the alternate use of subtraction cycles and of addition cycles allows the calculation of a quotient while avoiding corrective cycles.

For the division, it is necessary to perform the following cycles (in the case where the division is controlled by the first stage of program and where the divisor, the dividend and the quotient are entered respectively in the first electromechanical counter and in the first two electronic counters):

(1) From hubs 160 (Fig. 3d) to hubs 193 (Fig. 3hh) controlling output relay 24A for the values contained in the first electromechanical counter, Fig. 3i.

(2) From one of the hubs 160 to hub 145 (Fig. 3e) controlling the subtraction style of entry in the first electronic counter where the dividend is contained.

(3) From one of the hubs 160 to hub 144a controlling the addition entries in the second electronic counter where the quotient is formulated.

(4) From one of the hubs 160 to hub 176 (Fig. 3bb) controlling relay E21.

(5) From one of the hubs 160 to hub 235 (Fig. 3d) controlling relay CT6 so as to begin the division as if the dividend had the maximum capacity (7 digits).

(6) From those of hubs 171 (Fig. 3i) corresponding to the positions where the divisor is recorded, to the first two hubs 159 (Fig. 3ee).

(7) From hub 468 (Fig. 3–ll) to hub 469 (Fig. 3e) of entry into the second electronic counter.

(8) From hub 419 (Fig. 3ff) receiving the carry impulses from the 8th position of the first electronic counter to hub 423, and also to hub 471 (Fig. 3m) so as to stop the alternate cycles of subtraction and addition when a carry impulse occurs.

Then several different circuits are completed, which have already been described, and one of them causes the energization of relay 43A (Fig. 3d). Contacts 43A–c to f are then placed under voltage so that the following relays are also energized through the connections made with hubs 160: 24A (Fig. 3hh) 42A, 43A, 42B (Fig. 3e) E21 (Fig. 3bb) and CT6 (Fig. 3d). It can be noted that these relays are held energized for the duration of the division operation, except relay CT6 which is to be dropped out in the described way and relay 43A. This relay picks up first, then drops out, then picks up again, etc. In a similar way, relay 43 which is not energized for the moment, picks up, then drops out, etc. Relays E7 and E23 (Fig. 3d) pick up in the described way and then so do relays E11, E8, E9 (Fig. 3bbb). Contact E9–a (Fig. 3kk) being transferred, the multivibrator starts up. Previously, contacts E21–n and E23–c (Fig. 3mm) had been actuated, causing a general restoration of the circuits.

*1st calculation cycle.*—It may be noted that the sub- traction cycles begin as soon as the multivibrator starts. As a matter of fact, trigger B10, Fig. 3mm, is presently conductive through its right hand triode so that the output terminals of its left-hand triode have their highest potential. The existing voltage is applied through contact E21–l transferred, to the voltage divider formed by resistors 377, which places grid G1 of tube T21 above its cut-off point. This tube reacts under the impulses coming through line 368 so that 9 impulse alternations are applied to line 382.

During this time, thyratrons 9U to IU (Figs. 3kk–3–ll) fire, which results in a voltage application to the first two hubs 159 (Fig. 3ee) through the 6th of the preceding connections and respectively at the end of the 6th and 4th points of the first primary cycle. The divisor is then added to the complementary value of the dividend in the way already described.

However, it has been seen that relay CT6 (Fig. 3d) was energized. Consequently relays SC1 and SC4 (Fig. 3–l) are energized, which results in a shift of the entry circuits 5 columns to the left. Under these conditions the operation is the following, the dividend having for example the value of 130.320 and the divisor the value 46:

Conversion of the dividend _____ 99869679
Addition of 46 _____ 46

X— 04460679
Re-cycling of carry _____ 1

04469680

A carryover is effected at the left which indicates the sign inversion of the value contained in the dividend counter. This carry leads to the firing of thyratron TB8 (Fig. 3ff) and to an increase of the circuit voltage over: line 421, contact 44A–8 (n/c), hub 419, hub 423, contact 44A–10 (n/c), line 453. The latter line leads to the voltage divider formed by resistors 414–a, Fig. 3f, which controls grid G1 of tube TC1. The potential of this grid is thus placed above its cut-off point.

It has also been noted that the potential of line 415 was periodically brought to a positive value. Conduction starts then in tube TC1, leading to a voltage drop in resistor 417a and to a negative impulse being applied to capacitor 393. Thus a carry impulse is applied to the first counter unit. This unit being in the condition of digit 9, passes to the condition of digit 0 resulting in the application of a positive impulse to capacitor 408 and in the firing of thyratron TB1 as already explained. Other thyratrons such as TB2, TB3, etc., fire either during the addition or after the carries.

As already mentioned, hub 419 is also connected to jack 471 (Fig. 3m), to contacts E21–e and d and to the voltage divider formed by resistors 372 controlling the grid G1 of tube T20. The potential of hub 419 (Fig. 3ff) increasing, the grid G1 of tube T20 is placed above its cut-off point.

Contact E21–h being transferred, Fig. 3m, line 322 applies two impulses to the capacitor 374, a negative one at the end of point 11 and a positive one at the end of point 15. The first is ineffective, for it cannot but reinforce the cut-off action of grid G2 of tube T20. The second pulse places this same grid above its cut-off point. Conduction starts in this tube, hence a voltage drop in load resistor 376 and a negative impulse which is transmitted through contacts E21–j transferred, Fig. 3mm, and 2A–18 (n/c) and finally applied to the right hand triode of trigger B10. This triode being conductive, the condition of trigger B10 is changed over, so that conduction starts now through its left-hand triode. Then a voltage drop occurs on the terminal of this triode, which is applied to the voltage divider formed by resistors 377 and, on the other hand, to the voltage divider formed by resistors 475. The result is a cut-off of tube T21 which counters the transmission of the impulses to line 382, and also a cut-off of tube T28 and an increase of the potential of line 391.

Along with the preceding operations, there is performed the accumulation of the quotient. As thyratron 1U fires (Fig. 3–*ll*), a positive bias is applied to contact E21–*b*, to hubs 468 and 469 (Fig. 3*e*) which results in the entry of a unit in the second electron counter. The contacts of relays SC1 and SC4 being transferred, this unit is entered in the 6th position so that the counter contains now value 00100000.

As to line 391, it leads to contact E21–*a* (Fig. 3*kk*) which is presently transferred and to voltage divider formed by resistors 384 controlling grid G2 of tube T22. Thus, this grid is placed above its cut-off point. Afterwards, grid G1 is also placed above its cut-off point. Tube T22 becomes conductive, leading to the already described functions of stopping the multivibrator, firing of thyratron T26, and the pick-up of relay E2, Fig. 3*k*. Contact CT0–*d* is in the n/c condition.

Contacts E2–*a*, *b* and *c* are then opened or transferred so that the result is:

(1) Drop-out of relays E8 and E9 (Fig. 3*bbb*),
(2) Drop-out of relays E23 and CT6 (Fig. 3*d*),
(3) Drop-out of relays SC1 and SC4 (Fig. 3*e*).

Contact E2–*d* is again transferred, which leads to the energization of relay E24. Contact E21–*p* is then closed. Relay E24 holds provisionally through its coil E24–A, contact E25–*b* (n/c), contact E24–*b* and line 123. It serves mainly to transfer its contacts E24–*d* and E24–*e*. The first usually connects relay 43A which now drops out, causing the reconversion of the value contained in the dividend counter. This value being 04469680 is transformed into the complementary value 95530319. The transfer of contact E24–*e* connects hub 144*a* and relay 43B. Thus the latter picks up, causing the conversion of the value contained in the counter where the quotient is recorded. This value being 00100000 is transformed into its complementary value 99899999.

The transfer of contact E2–*b* (Fig. 3*d*) also causes the energization of relay E17, the closing of contacts E17–*a* and E17–*b* and the energization of relay E5. The latter then opens its contact E5–*a* (Fig. 3*k*) which again causes the drop-out of relay E2 and the return to n/c position of contacts E2–*a*, *b*, *c* and *d*. The result is:

(1) Pick-up of relay E8 and then of relay E9 (Fig. 3*bbb*)
(2) Pick-up of relay E23, CT4 and holding of relay CT5 contact E22–*b* (n/c) (Figs. 3*d* and 3*dd*),
(3) Pick-up of relay SC4 (Fig. 3*e*) due to the transfer of contact CT5–*e*.

As a consequence, the return to the n/c position of contact E2–*d* gives relay E24 a new possibility of holding through its coil E24–A, its contact E24–*a*, diode 531 and contacts E2–*d* and E1–*e* (n/c). As relay E23 picks up, relay E25 also picks up due to the presence of contact E23–*b*, presently it holds through its contacts E25–*b*. As a side effect, it breaks the connection between coil E24–A and line 123.

*2nd cycle of calculation.*—The transfer of contact E9–*a*, Fig. 3*kk*, initiates a new cycle of calculation. However, relay CT5 has now picked up, this energization having been caused by relay CT6 in the described manner. Consequently, relay SC4 picks up alone as mentioned.

Successive additions of the divisor in the counter where the dividend is present and of one unit in the counter where the quotient is registered, are going to follow; however, these operations are shifted one column to the right in relation to the preceding operations, the pick-up of relay SC4 initiating only a 4-column shift.

It should be mentioned also that the new calculations are preceded by a restoration of the circuits of Figs. 3*k*, 3–*l* and 3*m*. Consequently, trigger B10 (Fig. 3*mm*) is again conductive through its right-hand triode (it having been changed over during the restoration). The output terminals of its left-hand triode have their highest potential, which places grid G1 of the tube T21 above its cut-off point. This tube reacts under all the impulses which come up through line 368 so that the impulse alternations are transmitted through line 382, and control the successive entries of the divisor and of the successive additions of one unit to the complementary value of the quotient.

Finally, the resulting operations are the following:

|  | Dividend | Quotient |
| --- | --- | --- |
| Preceding result | 95530319 | 99899999 |
| 1st addition | 46 | 1 |
|  | 95990319 | 99909999 |
| 2nd addition | 46 | 1 |
|  | 96450319 | 99919999 |
| . . . . . | . . . . . | . . . |
|  | 99670319 | 99989999 |
| 10th addition | 46 | 1 |
| Re-cycling of the carry | X— 00130319 1 |  |
|  | 00130320 | 99999999 |

The initial problem is met again, the number in the dividend counter being the initial dividend, while the number registered in the quotient counter is 0. Moreover, at the time of the 10th addition, the first left position of the dividend-counter passes from condition 9 to condition 0. A positive impulse occurs then in line 395*a* (Fig. 3*ff*) which is applied to capacitor 408*a* and fires thyratron TB8. A voltage drop occurs in load resistor 411*a* which brings the potential of line 421 to a value next to the potential of line 241 (about 50 volts); before that, line 421 had the potential of the ground. Line 421 is connected to contact 44A–8, to hub 419, to hub 423, and also to hub 471 (Fig. 3*m*). All these elements are subsequently positively biased. The same effects result as usual, cutting off tube T21, stopping the multivibrator and causing the firing of thyratron T26 (Fig. 3*k*) and the energization of relay E2.

The opening or the transfer of contacts E2–*a*, *b*, *c* and *d* cause in their turn the drop out of relays E8, E9 (Fig. 3*bbb*) E23, CT5 (Fig. 3*d*), SC4 and E24 (Fig. 3*e*). It should be noted that the transfer of the contacts of relay E2 is very rapid and of a quick acting type, so that a holding circuit may be completed for relay E25 through coil E25–A and contact E25–*a*, before the latter has come back to a n/c position. In this way, relay E24 cannot drop-out. Contacts E24–*d* and E24–*c* come back to n/c position leading to conversion effects opposite to those which occurred previously, when these contacts were transferred. Consequently, relay 43B drops out, the coil of this relay being no more connected to hub 144*a*. The result is a reconversion of the value standing in the quotient-counter. This value being 99999999 is transformed into the complementary value 00000000. On the other hand, relay 43A picks up, leading to the conversion of the value contained in the dividend-counter. This value being 00130320 is transformed into complementary value 99869679. It should be noted also that relay CT4 holds in the known way.

The transfer of contact E2–*b* (Fig. 3*d*) causes the already described functions: pick-up of relays E17, E5 and the drop-out of relay E2 (Fig. 3*k*). Contacts E2–*a*, *b*, *c* and *d* thus come back to the n/c position so that the result is again:

(1) Successive pick-up of relays E8 and E9 (Fig. 3*bbb*).
(2) Pick-up of relays E23, CT3 (Fig. 3*d* and 3*dd*) and holding of relay CT4 through contact E2–*b* (n/c).
(3) Pick-up of relays E17 and E5.

(4) Pick-up of relays SC2 and SC1 (Fig. 3e) due to the presence of contacts CT4–e and CT4–f closed or transferred.
(5) Drop-out of relay E25.

First, there occurs a general restoration of the circuits of Figs. 3k, 3–l, 3m which serves mainly to cause trigger B10 to start again its conduction through its right hand triode. Later, contact E9–a (Fig. 3kk) is transferred, initiating the action of the multivibrator. Successive additions of the divisor value are again realized in the counter where the complementary value of the dividend is entered, while the successive additions of one unit are put in the counter where the quotient is registered. Moreover, all these operations are shifted one column to the right in relation to the preceding operations, the energization of relays SC1 and SC2 initiating only a 3-column shift.

Trigger B10 (Fig. 3mm) being conductive through its right hand triode, grid G1 of the tube T21 is biased above its cut-off point. The impulses which arrive through line 368 to tube T21 are transmitted to line 382. Successive additions of the divisor are thus controlled, while the successive additions of a unit for the quotient entries are controlled in parallel.

The following table summarizes the operations realized in each counter:

|  | Dividend counter | Quotient-counter |
|---|---|---|
| Values presently recorded | 99869679 | 00000000 |
| 1st addition of 46 | 46 | 1 |
| 2nd addition of 46 | 99915679 | 00001000 |
|  | 46 | 1 |
| 3rd addition of 46 | 99961679 | 00002000 |
|  | 46 | 1 |
| Re-cycling of the carry | X– 00007679 |  |
|  | 1 |  |
|  | 00007680 | 00003000 |

It can be noted that a carry is performed, at the time of the 3rd addition, on the first position at the left of the dividend-counter. Thyratron TB8 (Fig. 3ff) fires, hence a positive bias is transmitted to line 421, to contact 44A–8, to hub 419, to hub 423, and to hub 471 (Fig. 3m). This bias is applied to the voltage divider formed by resistors 372 controlling grid G1 of tube T20. This grid is placed above its cut-off point, so that tube T20 becomes conductive as soon as a positive impulse arrives from line 322.

Consequently, as already described, a negative impulse is initiated which changes the condition of trigger B10 and causes tube T21 to cut-off. The transmission of the impulses to line 382 is then also cut-off so that the addition cycles are stopped. It is the same with respect to the impulses directed to the quotient-counter.

Simultaneously, conduction is cut-off in tube T28 so that the result is an increase of the potential of line 391. Tube T22 (Fig. 3kk) thus becomes conductive leading to the described functions of stopping of the multivibrator, firing thyratron T26 and energization of relay E2. It can be noted that the multivibrator is stopped at the very end of the 3rd cycle, in other words, as soon as the sign of the value entered in the dividend counter has changed.

Pick-up of relay E2 initiates the several known functions, that is to say:

(1) Drop-out of relays E8 and E9 (Fig. 3bbb),
(2) Drop-out of relays E23 and CT4 (Fig. 3d),
(3) Pick-up of relays E17 and E5,
(4) Drop-out of relays SC2 and SC1 (Fig. 3e),
(5) Pick-up of relay E24.

Relay CT3 holds in the already described way. Relay E24 in its turn causes the transfer of contacts E24–d and E24–e and consequently as already seen:

Drop-out of relay 43A,
Pick-up of relay 43B.

This results first in a reconversion of the value contained in the dividend-counter and in its transformation into the negative value 99992319. The value contained in the quotient-counter is transformed into the complementary value 99996999.

The energization of relay E5 causes relay E2 to drop-out (Fig. 3k) and the return to n/c position of contacts E2–a, b, c and d. The result is:

(1) Pick-up of relays E8 and E9 (Fig. 3bbb),
(2) Pick-up of relays E23 and CT2 (Fig. 3d),
(3) Holding of relay CT3 through contact E2–b (n/c),
(4) Drop-out of relays E17 and E5,
(5) Pick-up of relay SC2 (Fig. 3e) due to the transfer of contacts CT3–e,
(6) Pick-up of relay E25 when contact E23–b is closed.

*4th calculation cycle:*—A new restoration of the circuits of Figs. 3k, 3–l, 3m occurs, so that trigger B10 again starts its conduction through its right-hand triode. The operations summarized in the following table occur then in the dividend and quotient counters:

| Value presently recorded | 99992319 | 99996999 |
|---|---|---|
| 1st addition of 46 | 46 | 1 |
| 2nd addition of 46 | 99996919 | 99997099 |
|  | 46 | 1 |
| Re-cycling of the carry | X– 00001519 |  |
|  | 1 |  |
|  | 00001520 | 99997199 |

The carry impulse which occurs on the left of the dividend again stops the addition cycles in a familiar way. The positive bias provided by the firing of thyratron TB8 (Fig. 3ff) places grid G1 of tube T20 (Fig. 3m) above its cut-off point. The positive impulse occurring later in line 322 makes this tube conductive and causes a negative impulse to change the condition of trigger B10. Later there occurs again the energization of relay E2 (Fig. 3k) which causes the drop-out of relay E24 (Fig. 3e). It is apparent how a 5th and then a 6th cycle of calculation are performed. During the latter cycle, relay CT0 picks-up, opening its contact CT0–b and causing the drop-out of relay E6. Later on, relay E1 (Fig. 3k) picks up and initiates a program change as already noted.

The result of the division may be either transferred to an electromechanical counter, or held for other operations. The corresponding circuits have already been described.

It is possible to perform two divisions in parallel. In this instance one of the divisions may be controlled by tubes T20, T21 and triggers B9 and B10, the dividend and the quotient being entered in electronic counters 3 and 4 (not shown). The second division may be controlled by tubes T23, T24 and triggers B15 and B16. They require the set-up of an additional connection, for example from hubs 169 (Fig. 3d) leading to hubs 466 and 466a (Fig. 3e). In this way relays 45A and 45B are picked up. These relays transfer their contacts 45A–1 and 45B–1 (Fig. 3f) and cause the connection of the first two electronic counters to line 383, in other words, to the line coming from tube T24 (Fig. 3mm).

It may also be noted on Fig. 3m that contacts 45A–2 and 45B–2 are normally closed when relays 45A and 45B are not controlled. These contacts connect the voltage divider formed by resistors 372–a to line 241 which has a potential of 50 volts. Contact E21–f is then closed and grid G1 of tube T23 is held above its cut-off point, so that it can react under the impulses from line 322 applied through capacitor 374–a. Tube T23 then becomes conductive and a voltage drop in load resistor 376–a results which is applied through contact E21–k, Fig. 3mm, transferred, to the right-hand triode of trigger B16. This trigger has been restored in order to be conductive through this triode. It changes its condition and is now conductive through its left-hand triode. A voltage drop occurs in line 457 which is applied through contact E21–m transferred to the voltage divider formed by resistors 475a and also to the voltage divider formed by resistors 377a. These voltage dividers place the grids they control below their cut-off point resulting in the simultaneous cut-off of tubes T24 and T29. The transmission of the impulses through line 383 is also stopped.

It may also be noted that tubes T28 and T29 have a common output line 391. These tubes being conductive at the beginning, line 391 then has its lowest potential. These circuits controlled by line 391 are arranged so that the break of conduction in one of tubes T28 and T29, remains ineffective. Consequently, the condition change of trigger B16 only has the effect to cut off tube T24. Later, the condition change of the trigger may occur which cuts off conduction in tubes T21 and T28 in the described manner. Tubes T21 and T28 are then simultaneously cut off so that there results an increase of the potential of line 391. The latter helps the action of tube T22 (Fig. 3kk) which results in the described effects.

In case any of the contacts 45A–2, 45B–2, Fig. 3m, should be transferred, similar effects may occur if a positive bias happened to be applied to hubs 471–a. In such cases these hubs should be connected to a hub such as 419 (Fig. 3ff), so that the first of the carry impulses applied to hubs 471 and 471a cuts off the corresponding tube T21 or T24. This results in a break of the addition cycles controlled by the corresponding line 382 or 383. Other addition cycles, in any number, may continue to be controlled however by the other tube T21 or T24 which is not cut-off. The result is finally a second carry impulse which is applied to one of the jacks 471 or 471a and will cause the repetition of the already described effects.

*Transfer of the calculation results.*—The calculation program being terminated, the result of these calculations should be transferred to any of the mechanical counters for subsequent punching control. This operation is generally performed in synchronization with the feed of the next card so as to avoid any loss of time. Relay 2F (Fig. 3dd) then picks up. Previously, it is necessary to make provisions for the anticipated control of relay 20A (Fig. 3i) for example, in case the calculation results are to be entered in the first mechanical counter unit. This control may be performed, for example, during any of the calculation cycles. Then occurs the energization of relay 21A and electromagnet 22A controlling the zero reset device in the well known way.

The end of the calculations is marked by energization of relay E1 (Fig. 3k) which leads to that of relay 2F (Fig. 3dd) as already described. The already outlined functions recur again causing principally the return of contact E1–a to the n/c position. Impulses are then available on hubs 139 and are directed:

(a) To relays 44A, 44B (Fig. 3e) controlling the exit of the total contained in the electronic counters;

(b) To relays 46A, 46B eventually so as to operate the zero resetting controls of these same counters.

Along therewith, hubs 174, 174a (Fig. 3ff) should be connected to hubs 156, 156–a (Fig. 3i) of entry to the selected electromechanical counters.

As mentioned, relay E15 (Fig. 3cc) picks up 10 times for each mechanical cycle when cam C4 closes its contact, causing each time the emission of an impulse alternation by tube T27 (Fig. 3mm). Each impulse alternation is finally directed to line 351 and from there to those of the electronic counters controlled for the exit (Fig. 3f). It has also been noted that impulses are collected on hubs 174 and 174a, Fig. 3ff. These impulses occur at the exact moment when it is necessary to control the electromagnets 168 (Fig. 3i) for the setting of the digit corresponding to the value read out of any unit of the electronic counter. In this way the result of the calculation may be registered in the various units of the mechanical counter.

At the same time, the electronic counters may be reset to zero subsequently to the energization of relays 46A, 46B . . . (Fig. 3e). These relays open their contacts 46A–2, 46B–2 (Fig. 3ff), however, nothing results for the moment, for contacts E4–a, E4–b are in n/c position. Later, relay E4 (Fig. 3d) picks up and causes contacts E4–a, E4–b to open the connection between bias line 243 and lines 394 and 394–a being cut-off for a moment. All the triodes of triggers such as BA1, BB1, etc., the bias of which is ensured by these lines, become conductive which results in bringing all the units of the electronic counters 1 and 2 to the condition of digit 0.

The circuits are similar in case the value contained in an electromechanical counter should have a negative sign. In this instance, it has been noted that relay 47A (Fig. 3e) for example, is energized. This relay closes its contact 47A–2 so that a second coil of relay 43A is energized in case relay 44A should happen to pick up.

The exit of a value represented by its complement is thus preceded by its conversion, value 99964753 being converted into 00035246. In this case it is necessary to signal that the value has a negative sign. This is obtained by connecting together hubs 529 and 612 (Fig. 3g). Thus the following circuit may be completed for the energization of latching relay 9L: hub 139 (Fig. 3dd), hub 525 (Fig 3e), contact 47A–2 closed, diode 528, hub 529, hub 612 (Fig. 3g) and the coil of latching relay 9L.

*Punching control.*—Punching is controlled during a card feed cycle and operated in a manner set forth early in this specification. Relay 2F picks up, Fig. 3dd, so that a connection may be set from one of jacks 139 leading to hub 599 (Fig. 3h). In this way, the following circuits may be completed at the end of point 0: line 123, the contact of cam C11, contact R6–1 closed and the coil of relay 3A on the one hand, and on the other hand; line 123, a circuit leading to hubs 139 (Fig. 3dd) hub 599 (Fig. 3h) contacts 20A–3, 21A–3 (n/c), contact 3A–1 closed, contact R12–i transferred, contact 2F–28 closed and the coil of relay 26A. Contacts 20A–3, 21A–3 and 23A–12 are inserted in the preceding circuits to delay the energization of relay 25A until the entries of the calculation results are completed.

Relay 26A holds through its coil 26A–A, its contact 26A–1 and contact R20–f (n/c). Then it causes relay 28A to pick up through circuit: line 123, contact R16–g closed, contact R17–f closed, and contact 26A–2 closed. The purpose of the latter circuit is to delay the sequence of the functions until the punching of the preceding card is effected. This is controlled in general by the closing of contact 128 of the last column (Fig. 3a) and by the energization of relay R13. As it has been noted the energization of relays R15, R16 and R17 (Fig. 3b) follows therefrom, for the energization of these relays can occur only if contact R13–a is closed.

Relay 28A, Fig. 3h, energized as just noted, holds through its coil 28A–A, its contact 28A–1 and contact 29A–1 closed. In parallel there is coil 25A–A which is also energized. Relay 25A then picks up and closes its contacts 25A–1 and 25A–12. Contacts 25A–2 to 10 also close. These contacts control the exit for the punching of the value read out of the first mechanical counter. In the same way it is possible to cause the closing of contacts 25B–2 to 10 controlling the exit of the value from the second mechanical counter.

COMPARING CIRCUITS

The calculation results may be subjected to verification. In this case, they are compared with results entered in another counter or in another part of the same counter, which results are obtained from the same data, but through different processes or through a previous calculation.

The comparing device used in the machine of the present invention, has been described in the patent application Serial No. 385,991 filed by E. Estrems on October 14, 1953, now Patent No. 2,700,756, under the title "Comparing Device" to which it is possible to refer.

Hubs 610, Fig. 3h, and 610-a should be connected in case the values to be compared are contained in the first and the second mechanical counters. Contacts 28A-2 (Fig. 3gg) and 28B-2 being closed, the following circuit is completed for the energization of relay 8A: line 123, contacts R17-e and 8E-1 (n/c), contacts 28A-2 and 28B-2 closed, contact 3A-3 or 2A-10 (n/c) according to whether or not the control occurs during a mechanical cycle, coil of relay 8A, line 242. Relay 8A holds through circuit: line 123, contacts R17-e and 8E-1 (n/c), contacts R18-i and 8A-1 closed, and the coil of relay 8A. Relay 8A causes the other comparing relays 8B, 8C and 8D, and then relay 8E to pick up. The latter is performed through the circuit: line 123, contact R17-e (n/c), contact 8D-6 closed and the coil of relay 8E. Relay 8E holds through its contact 8E-1 closed and the described circuit until the opening of R17-e causes relays 8A, 8B, 8C, 8D to drop out.

As to the comparison, it is performed in the way described in the above mentioned patent application. In case an inequality should be evident, a positive bias is applied to line 598 which places the control grid of thyratron T38 above its cut-off point. Then this thyratron fires so that an impulse is available on hub 629 which can be directed for example to a hub so as to energize immediate stop relay R24, Fig. 3aa. This relay opens its contact R24-b and causes relay R1 to drop out.

In case the punching of a calculation result should not be required, it is necessary to energize relay R28. The energization of relay 8A (Fig. 3gg) is then made through contact R28-d closed. In case none of contacts 28A-2, 28B-2 have been transferred, i.e., if the control of fixed punching is required, relay 8A is energized through circuit: line 123, contact R17-e and 8E-1 (n/c), contact 2E-17 closed, 2A-10 transferred and 3A-3 closed.

*Punching.*—Punching is performed after the energization of relays 8A, 8B, 8C, 8D, 8E and is optionally accompanied by a comparison. The transfer of contacts 8E-1 causes mainly the drop-out of relay 8A and the return to the n/c position of contacts 8A-2 to 11. In this way, the comparing device is isolated so that lines 617 are now connected instead to lines 617-a of the punch.

It has been explained that the energization of magnet 182 (Figs. 2 and 3b) caused the feed of the card in the punching unit. The card stops in first column position, the skip being avoided by the energization of electromagnet 603 (Fig. 3g). The grid of thyratron T39 is placed above its cut-off point by a positive impulse brought in by the circuit; line 123, contact R13-b provisionally closed, contacts 9A-1 and 9E-1 (n/c), then the thyratron fires causing the electromagnet 603 to pick up.

To avoid a stop in the first column and to stop the card in the required column only, relay 9A may be energized by connection of hubs 620 and 621. In this case, the opening of contact 9A-1 counters provisionally the ionization of thyratron T39.

The skip stop for the columns to be punched, for example the 23rd and 24th columns, will be controlled by the connection of hub 608-22 to hub 609.

The anode circuit of thyratron T39 is closed from line 239 through circuit: rack contact 606 normally closed (opened only at the end of the card travel)—contact 9E-3 transferred, contact 9B-2 (n/c), thyratron T39. This thyratron is ionized by the circuit line 239, contact 606 (n/c), contact 9E-3 transferred, contact 9B-2 and R30-e (n/c), contact 9E-4 transferred, the common of brush 607, brush 607-a borne by the card carriage and setting contacts corresponding successively to all the columns to be punched, hub 608-22, hub 609, contact 9E-2 transferred, and the grid of the thyratron T39.

The time required to stop the carriage is such that the stop must be performed so as to present to punching the column which follows the control column, in the present example, the 23rd column.

For this purpose, thyratron T39 which has come back to a n/c position at the time of the skip control by the opening of contact 9B-2 (as will be explained later) is brought to the proper anode potential through a circuit comprising resistor 628 and capacitor 627. The charge of the capacitor being a function of the duration of the skip, the longer the skip, the higher is the anode potential and therefore; the shorter the time of energization of electromagnet 603, the higher the speed of the carriage, which allows compensation between the time required for the stop and the control time of this stop.

However, if the skip duration is short, it is possible that the stop occurs too fast and that the column presented to the punch corresponds to the very same control column selected. In such instances the progression of one column is brought about by the energization of the space electromagnet 605 through a circuit: line 123, contact 601, contact 8E3 closed, contacts R29-b and 9E-4 (n/c), common 607, hub 608-22, hub 609, contact 9E-2 (n/c), electromagnet 605 and line 242. Since contacts 9E are normal subsequent to the drop-out of relay 9D, this is realized by the opening of contact 9C-1, the control relay 9C of which has been energized through the circuit: line 123, contact 601, contact 9E-5 closed, contacts 9B-3 and R13C (n/c), and the coil of relay 9C.

Then the counter read out is scanned and the result is punched in column 23 through the following circuit: line 123, contact 601, contact 8E-3 closed, contacts R29-b and 9E-4 (n/c), common 607, brush 607a, hub 608-23 connected to hub 610-9 (Fig. 3h), 25A-9 closed, position 4 of the storage unit, wire 617, contact 8A-6 normal (Fig. 3gg), electromagnet 602-4 and line 242. Electromagnet 602-4 pushes forward a particular interposer blade which enables operating electromagnet 605 to drive the punch through the card as already noted.

Electromagnet 605 picks up through the circuit: line 123, contact 601, contact 604 closed, electromagnet 605 and line 242. It controls directly the punch operation and steps the card carriage one column ahead. The punching of the next column is performed in a similar way.

It may be preselected so that after the punching of these columns 23 and 24, the operations continue either to punch another field of the card or to cause the ejection of this card, hub 608-24 may therefore be connected to the skip starting hubs 623 or 625, or to ejection hub 611.

It is assumed first, that another field is to be punched and that therefore the skip from column 25 to the next column to be punched is to be performed. The scanning of the storage device and the punching of column 24 are then operated through the following circuit: line 123, contacts 601 and 8E-3 closed, contacts R29-b and 9E-4 (n/c), common bar 607, hubs 608-24, hub 623, contact 9B-5 closed, hub 624, hub 610 (Fig. 3h), contact 25A-11 closed, contact 8A-12 (n/c), the coil of relay R27-A, line 242; and relay 29A picks up simultaneously through contact R30-i (n/c).

Relays 27A and 29A signal the end of the punching control from a counter and allow an entry into this unit as it has been described. Relay R29A will drop out relay 25A-A by the opening of contact 29A-1. The pick-up circuit of electromagnet 602 then is the following: line 123, Fig. 3g, contacts 601, 8E-3, R29-b, RE-4, 607, hubs 608-24 and 623, contact 9B-5, hub 625, hub 610-10, Fig. 3h, contact 25A-11 (n/c), contact 27A-2 closed, position 7 of the storage unit, contact 8A–9 (n/c) (Fig. 3gg), electromagnet 602–10, Fig. 3g, and line 242.

Preparation for the skip control mentioned is then performed by the energization of relay 9B through the following circuit: line 123, contact 601 closed, contact 8E–3 closed, contacts R29–b and 9E–4 (n/c), common 607, hub 608–24 connected to hub 625, contacts 9E–6 and R30–f (n/c), the coil of relay 9B, line 242.

Electromagnet 605 picks up through the circuit: line 123, contacts 601 and 604 closed, electromagnet 605, line 242. It controls at the same time, the progression of the card carriage and the skip, since electromagnet 603 is not energzed.

The punching of the following field on the card is realized by the control of the skin stop as already described.

In order to control ejection of the card from column 24 for example, hub 608–24 should be connected to hub 612–a, as the scanning of the storage unit is realized by connection of hub 611–a to hub 610–10. Thereafter, relay R30 will be energized through circuit: line 123, contacts 601 and 8E–3 closed, contacts R29–b and RE–4 (n/c), common 607, hub 608–24, hub 611, the coil of relay R30, and line 242.

Relay 9B picks up through circuit: line 123, contact 601 closed, contact R30–f transferred, relay 9B, line 242. The anode circuit of thyratron T39 is then cut off by the opening of contact 9B–2 and electromagnet 603 drops out, releasing the skip control. Card ejection is mechanically operated at the time of the feed for the introduction of the following card for punching.

*Punch suppression.*—When the punching of a card is to be suppressed, in the case of an error for example, the functioning of the card feed may proceed to ejection without punching, by energizing relay R29 as above described.

The read out circuit of the storage unit and the pick-up circuit of relay R30 and electromagnet 602 are then cut off by the opening of contact R29–b. Relay R30 will pick up through circuit: line 123, contact R15–d closed or contact R16–d normally closed according to the moment when the impulse arrives, contact R18–f closed, contact R29–c transferred, relay R30, line 242. The energization of relay R30 causes an ejection according to the known method.

The energization of electromagnet 605 which is required for the ejection skip is operated through the circuit: line 123, contact 601, contact 9G–4 closed, contact 9F–2 (n/c), electromagnet 605, line 242. The participating relay 9G picks up through the circuit: line 123, contact 601, contact 8E–3 closed, contacts R29–b and R18–h transferred, relay 9G, line 242.

In case the carriage stopped in the last column and should be brought to the first column by the feed of a card, the skip is made possible by energizing relay 9B and this relay picks up through circuit: line 123, contact 601 and 8E–3 closed, contacts R29–b and 9E–4 (n/c), common 607, Fig. 3g, brush 607–a positioned in 1st column, contact 9A–4 closed, contacts 9E–6 and R30–f (n/c), relay 9B, line 242.

*Group indicator punching.*—It is usual in card accounting work to punch in the same column, above the digit, one or two group indicators which are to be called here, R and X in the "12" and "11" card positions, respectively, Fig. 11. Electromagnets 602–1 and 602–2 corresponding to these indicators also control an interposer in the known manner, but do not close contact 604 which is to be closed by electromagnet 602 corresponding to the digit situated in the same column. In case the indicator selection is not follower by a digit perforation in the same column, the closing of contact 9G–4 enables energization of electro-magnet 605, and electromagnet 602 picks up through circuit: line 123, contacts 601 and 8E–3 closed, contacts R29–b and 9E–4 (n/c), common 607, brush 607–a, hub 608–45, hub 616–1 or 2, Fig. 3gg, electromagnet 602–1 or 2, line 242. Electromagnet 605 picks up through the circuit: line 123, contact 601 and 9G–4 closed, contact 9F–2 (n/c) electromagnet 605, line 242; and relay 9G picks up through the circuit: line 123, contact 601 closed, contact 9F–1 transferred, relay 9G, line 242; and relay 9F is energized through the pick-up circuit of electromagnets 602 from hub 616 and going through contacts 9K–1, 9H–1 and 9G–1 (n/c), relay 9F and line 242. Any interference from the circuits of electromagnets 602–1 and 602–2 is avoided by the addition of a rectifier between each electromagnet and contact 9G–1.

The punching of a group indication may also be required in order to signal the presence of a negative or positive balance. In such instances, it has been noted that latching relay 9L may be picked up.

The normal indicator is punched by electromagnet 602–2; however a second indicator punched by 602–1 may also be used through hub 616–1.

Accordingly, as it is required to punch the group indicator of 602–2 when the balance is negative or when it is positive, hub 612–b is connected to hub 615 or to hub 613.

If, for example, the group indicator is to be punched in column 42 in the case of a negative balance, relay 9K picks up through the following circuit: line 123, contacts 601 and 8E–3 closed, contacts R29–b and RE–4 (n/c), common 607, brush 607a, hub 608–42, contact R30–c closed, hub 611a, hub 615, contact 9H–2 (n/c), the coil of relay 9K and line 242. The energization of relay 9K enables electromagnet 602–2 to pick up through the pick-up circuit of relay 9K and contact 9K–1 transferred, contact 9L–1 transferred, electromagnet 602–2, line 242; and on the other hand, the energization of relay 9F is possible through the pick-up circuit of relay 9K and contact 9K–1 transferred, contacts 9H–1 and 9G–1 (n/c), relay 9F, line 242. Relay 9G picks up through circuit: line 123, contact 601 closed, contact 9F–1 transferred, the coil of relay 9G, line 242.

In case the punching of the group indication should be effected in the same column, forty-fifth for example, as the punching of a digit, hub 614 is connected to contact-stud 610, Fig. 3h, corresponding to the digit to be read and the pick-up circuit of electromagnet 602 corresponding to this digit is as follows: line 123, contacts 601 and 8E–3 closed, contacts R29–b and RE–4 (n/c), common 607, brush 607a, hub 608–45, hub 611a, contact R30–c closed, hub 611, hub 615, contact 9K–3 closed, hub 614, hub 610 (Fig. 3h), first storage unit, one of contacts 8A–2 to 11 (n/c) (Fig. 3gg), electromagnet 602, line 242.

By referring to Fig. 9b it can be seen also that the first comparing circuit is completed in the 3rd cycle at 630, that punching is performed immediately thereafter at 631 and that it is the same for the second card on the following cycle.

*Calculations in English currency.*—If pence is entered into two columns of a storage unit it may be the subject of a separate calculation and likewise for shillings and pounds sterling.

Division of the pence by 12 and of shillings by 20 is effected according to the usual method through connections made on control panel 104 (refer to Fig. 1). The result to be punched is sent to a storage unit, the shillings occupying 2 columns as well as the pence.

Pounds and shillings are punched according to the above mentioned process; for the realization of pence punching in a single column, the control of relay 7E is performed through the circuit, Fig. 3g: line 123; contacts 601 and 8E–3 closed, contacts R29–b and 9E–4 (n/c), common 607, brush 607a, hub 608 of the column to be punched, forty fifth for example, connection from 608–45 to hub 618–b, the coil of relay 7E, line 242.

Hubs 619–b and 620–b are connected to exit hubs of the storage unit, hubs corresponding to the position "tens"

and to the position "units" of the pence, respectively, for example, 610A–9 and 610A–10 (Fig. 3h).

If the storage unit contains a number of pence equal to 10 or to 11, the position of the tens is first scanned by the circuit from hub 608–45 and through hub 618–b, contact 7E–1 closed, contacts 7B–2 and 7D–2 (n/c), hubs 619–b, hub 610–9 (Fig. 3h) contact 25A–9 closed, position 1 of the storage unit, contact 8A–3 (n/c) (Fig. 3gg), contact 7E–3 closed, contacts 7B–4 and 7D–4 (n/c), the coil of relay 7C, line 242.

Relay 7C holds through its contact 7C–1, common 607, contacts 9E–4, R29–b, 8E–3 and 601 and line 123. Relay 7D then picks up through contact 7C–2 now closed. The closing of contact 7D–2 allows the scanning of the "units" column through circuit from hub 618–b and, in the case of 11 pence, through contact 7E–1 closed, contact 7B–2 (n/c), contact 7D–2 transferred, hub 620–b, hub 610–10 (Fig. 3h), contacts 25A–11 (n/c), 27A–2 closed, position 1 of the storage unit, contact 8A–3 (n/c) (Fig. 3gg), contact 7E–3 transferred, contact 7B–4 (n/c), contact 7D–4 transferred, and electromagnet 602–1.

Electromagnet 605 picks up through the circuit: line 123, contact 601, contact 9G–4 closed, contact 9F–2 (n/c), electromagnet 605, line 242; and relay 9B picks up through the circuit: line 123, contact 601, contact 9F–1 transferred, the coil of relay 9G, and line 242; and relay 9F (which will drop out by the opening of 9G–1) but energized earlier by the circuit of electromagnet 602–1 through contact 8A–3 (n/c), contact 9G–1 (n/c), the coil of relay 9F, line 242.

In case the storage unit should contain 10 pence, electromagnet 602–2 picks up through the circuit from hub 618–b, contact 7E–1 closed, contact 7B–2 (n/c), 7D–2 transferred, hub 620–b, hub 610–10 (Fig. 3h), contact 25A–11 (n/c), 27A–2 closed, position 0, contact 8A–2 (n/c) (Fig. 3gg), contact 7E–4 transferred, contact 7B–6 (n/c), contact 7D–3 transferred, electromagnet 602–2.

Energization of relay 9F, leading to the energization of electromagnet 605, is performed by the circuit of electromagnet 602–2 through contact 8A–2 (n/c), contacts 9K–1 and 9H–1 (n/c), contacts 9G–1 (n/c), the coil of relay 9F, line 242.

If the storage unit contains neither 10 or 11 pence, relay 7A picks up through the circuit from hub 618–b through contact 7E–1 closed, contacts 7B–2 and 7D–2 (n/c), hub 619–b, hub 610–9 (Fig. 3h), contact 25A–9 closed, position 0 of the storage unit, contact 8A–2 (n/c) (Fig. 3gg), contact 7E–4 closed, contacts 7B–6 and 7D–3 (n/c), the coil of relay 7A, line 242.

Relay 7A holds through contact 7A–1, common 607, contacts 9E–4, R29–b, 8E–3, 601 and line 123.

Relay 7B picks up through the closing of contact 7A–2. The column of "units" is then scanned by the circuit of hub 618–b through contact 7E–1 closed, contact 7B–2 transferred, hub 620–b, hub 610–10 (Fig. 3h), contacts 25A–11 (n/c) and 27A–2 closed, line 617 (Fig. 3gg), one of the contacts 8A–2 to 11 (n/c) electromagnet 602, and line 242. The electromagnet 602–3 picks up from contact 8A–2 (n/c) through contacts 7E–4, 7B–6 and 7B–5 closed; and electromagnet 602–4 picks up through contact 8A–3 (n/c) and contacts 7E–3, 7B–4 and 7B–3 closed.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a record controlled electronic calculating apparatus, a pulse operated electronic accumulator, a pulse source device comprising a multivibrator and a pulse counter of four stages of trigger circuits representative of the values 1, 2, 2 and 4 and which for each main machine cycle is pulsed with ten primary electronic cycles, each of nine effective pulses, said counter being progressed in value 9, 0, 1, 2, etc., said counter emitting between 9 and 0 of each cycle a differentially timed pulse to step off progressively 9, 8, 7, etc. pulses for the different calculating cycles, and means under control of the record for selecting which of the primary cycles of said source device are controlling over said accumulator.

2. In an electronic calculating apparatus, a pulse operated electronic accumulator, a set of digital thyratrons, means for selectively conditioning one of said thyratrons, a pulse source comprising a pulse counter of four stages of trigger circuits representative of the values 1, 2, 2, 4 and which for each cycle is pulsed with ten primary electronic cycles, each cycle including nine effective pulses, means for selecting one or more of said electronic cycles to be effective for adding, and means under control of said conditioned thyratron and a related one of the first nine pulses for operating said accumulator with a differential number of pulses.

3. In a control device, a decimal counter, means for stepping said counter to represent decimal digits in ten cycles of operation, starting with the counter at 9 and stepping it ten times for a first cycle, and then stepping it nine times nine steps for nine other cycles, a carrying means in said counter which is operated early in the first cycle and successively later in eight additional cycles and not at all in the last cycle, and means under control of the omission of a carry in the last cycle for marking that as the last cycle and effecting terminating and recycling of the operation of the device.

4. In a device as set forth in claim 3, means for preparing for a transfer operation of one electronic cycle, said means including means to impulse the control counter once before the start of other operations so that the early carry impulse of the first cycle is lost, whereby the control device operates for one cycle rather than ten cycles.

5. In a control device, a counter with X positions for operating in a system of numeration to the base X, means for stepping said counter to represent X numbers in X cycles starting with the counter at X—1 and stepping it X times for a first cycle, and then stepping it X—1 times X—1 steps for X—1 other cycles, a carrying means in said counter which is operated early in the first cycle and successively later in X—2 additional cycles and not at all in the last cycle, and means under control of operation of said carrying means for effecting machine control operations.

6. In a device according to claim 5, with a plurality of machine functioning means, a programming device for calling said functioning means into operation sequentially in a predetermined pattern of operation, and means under control of said carrying means for initiating changes in said programming device whenever in a cycle of steps there is no operation of the carrying means.

7. In a device according to claim 5, with a plurality of arithmetic control means and number representing devices, an accumulator, and means under control of said counter and said carrying means for combining the control over said accumulator by said arithmetic means and said number devices to perform an arithmetic operation.

8. In a device according to claim 5, wherein said counter at each step emits a control impulse and at each carrying operation emits another control impulse, other member representing devices, an accumulator, means under control of said impulses and said representing devices for finding coincidence between numbers represented by said devices and numbers represented by said impulses and upon such coincidence controlling the direction of certain limited numbers of impulses into said accumulator as part of an arithmetical process.

9. In a device according to claim 5, a flexible arithmetic processing means comprising a plurality of means for storing numbers, an accumulator, column shifting devices, a programming device with means for transferring, adding, subtracting, multiplying, dividing, zeroizing and comparing numbers to and from all storing means and the accumulator, and means under control of the counter in its stepping operations and carrying operations in cooperation with said storing means for effecting transfer and arithmetic treatment of numbers, and additional means under control of the counter in its carrying operations for sequencing changes in said programming device to progress, cancel, substitute, repeat or duplicate all or part of selected means of the program predetermined by the programming device.

10. In a device according to claim 5, with record controlled means for entering control numbers, means under control of said counter for arithmetically using said control numbers to form a result, and means under control of the last mentioned means for recording the result on a record.

11. In a control device, an electronic decimal counter, means for pulsing said counter to represent decimal digits in ten electronic cycles of operation starting with the counter at 9 and pulsing it ten times for a first cycle, and then pulsing it nine other cycles each with nine pulses for nine other electronic cycles, a carrying circuit in said counter which is impulsed early in the first cycle and successively later in eight additional electronic cycles and not at all in the last cycle, means for detecting the absence of a carry impulse in the last of the ten electronic cycles, and means under control of the last mentioned means for either terminating operation of said pulsing means or restarting a repeat performance of ten electronic cycles by said pulsing means.

12. In a dividing machine, a pair of binary decimal counters each with self contained complementing controls, one for dividend divisor numbers and the other for the quotient number, means for entering the dividend and divisor numbers, means for causing within said counters changes of numbers to complements, and dividing control means for governing the sequence of successive subtraction operations by said entering means and complement causing means to produce the quotient.

13. In a calculating device, a pulse controlled binary decimal counter each order of which has a single set of four on/off trigger devices representing 1, 2, 2 and 4, respectively, when all are on, and each and all devices easily changed to on or off or to a reversal of on or off status with a single operation for the whole counter, means for pulsing each order of the counter to enter a number, means for operating within each order to change all on devices to off to represent 0, means for operating within each order to change all off devices to on to represent 9, means for operating within each order to reverse the status of all devices to represent the 9's complement of the number therein, and arithmetic control means for controlling the sequence of operation of said pulsing means and the three of said operating means.

14. In a device for performing arithmetical controls, means for entering the factors for such controls, an accumulator, an entry control means between said entering means and said accumulator and comprising a binary decimal counter of four stages representing 1, 2, 2 and 4 and self-contained complementing controls, means for conditioning all stages of said counter to be representative of each component value in one operation for a total setting of 9 as an initial setting, and programming devices for predetermining the control of said entering means and said entry control means in operating said accumulator to enter factors.

15. A record controlled calculating machine with means for sensing and recording data on the records, and having in combination, a self complementing electronic decade counter, means for pulsing said counter to represent the 9's complement of a number therein, means for pulsing said counter to zeroize it, means for pulsing said counter to enter a number therein, mechanical storage devices with electrical readout devices, means under control of said sensing means for entering factors of a computation in said storage devices, means under control of said storage devices and said number entering pulsing means for controlling said counter for calculating operations, means under control of the counter for operating said recording means to record the result of said calculating operations, and program devices including slow and rapid sequence selecting devices for selecting in succession several of the means and devices aforementioned for performing combinations of electric and electronic arithmetic operations to produce a recorded result.

16. A machine according to claim 15, wherein said means and program devices are associated with means for performing a subtraction operation involving adding the minuend in the counter from one source of storage, operating said complementing pulsing means to convert the counter representation to the 9's complement of the minuend, adding the subtrahend in the counter from another source of storage, operating said complementing pulsing means to convert the counter representation of the remainder to the true number, adding said true remainder in another storage device, and using the last mentioned storage device to control the recording of the remainder.

17. A machine according to claim 15, wherein said means and program devices cooperate with a relay controlled column shift device and means for performing a multiplication operation involving over and over addition by operating said entry pulsing means with sets of ten electronic cycles of nine pulses, each of said sets being interspersed with column shift operations, limiting the effectiveness of the portion of each electronic cycle to the pulses representative of the multiplicand digits in one mechanical storage device, further limiting the effectiveness of the number of electronic cycles to the number of cycles equal to the value of a multiplier digit in another mechanical storage device, entering into said electronic counter the pulses diminished from ninety in each set of electronic cycles to nine or less pulses times nine or less cycles, which totals the product of the multiplicand times the multiplier, entering said product in another storage device, and using the last mentioned storage device to control the recording of the product.

18. A machine according to claim 17, wherein said entry pulsing means includes a set of digital thyratrons which are used as gates in being selectively operated at a particular portion of each electronic cycle by the multiplicand storage device, and a secondary decade counter having carrying impulse emitting means which receives said carry impulses between 9 and 0 of each electronic cycle but stepped along differentially with respect to progressively later points within each electronic cycle, a particular one of said carry impulses acting as a gate in concert with a reading of a digit in the multiplier storage device at a certain one of nine electronic cycles and effective thereafter for a number of cycles equal to the digit value.

19. A machine according to claim 16, wherein said means and program devices are associated with means for performing a division operation involving adding the dividend in one electronic counter from one source of storage, operating the complementing pulsing means to convert the counter representation to the 9's complement of the dividend, adding the divisor from another source of storage a differential number of times until there is a sign change in the highest order and an addition of unity in the lowest order, adding a unit in a second electronic quotient counter for each electronic divisor cycle including the one causing the change, effecting a reversal of complemental status of both counters, i.e., complementing the true number of the diminished dividend in the first counter and complementing the approximate quotient in the second counter, effecting a column shift to both counters, continuing by adding the shifted divisor a differential number of times until there is a sign change, adding a shifted unit to the complement in the quotient counter for each divisor cycle, continuing in effecting subtracting cycles alternated with adding cycles in the first counter while adding cycles are alternated with subtracting cycles in the quotient counter, and using the last mentioned counter to record the quotient.

20. In a programming device for governing arithmetical functions, a set of slow operating relay stepping controls, a set of rapid electronic stepping controls, the latter being operable subordinate to and intermediate the operation of said relay controls, factor entry and readout devices controlled by said relay controls, an electronic accumulator, means under control of said factor entry devices and said electronic stepping controls for performing arithmetical operations, and means under control of said accumulator, said readout devices and said relay stepping controls for making evident the result of said arithmetical operations.

21. A device as set forth in claim 20 with said performing means including an electronic impulse device to emit a regular series of impulses in primary and secondary electronic sets of stages.

22. A device as set forth in claim 21 and including a cycle counting device for controlling the effective number of operations of said secondary stages as determined by the setting of data in said factor entry devices and the setting of the relay stepping controls for single or repetitive operation.

23. A device as set forth in claim 20 wherein each stage of stepping control is subject to delay in starting, and means under control of said electronic controls for furnishing the signal for a rapid start of any step control.

24. A device as set forth in claim 20, wherein said relay stepping controls govern the transfer of factors into and out of said factor entry and readout devices and wherein said electronic stepping controls govern the arithmetical functioning, zeroizing, comparing, and transferring of factors to said electronic accumulator, and control means whereby selected steps may be canceled, substituted, repeated, and duplicated in the performance of one or more of a plurality of arithmetic operations.

25. In a calculating machine, electronic calculating devices, electromechanical storage devices, means for registering numbers in and out of said storage devices, relay program devices for said storage devices for determining when said registering means is to register numbers in or out of said storage devices, and electronic program devices cooperating with said calculating devices, storage devices and relay devices for determining when the numbers from said storage devices are to be added or subtracted repetitively in said calculating devices, the latter program devices acting in interspersed cycles between cycles of operation of said relay program devices in governing registration of numbers in and out of storage attendant to electronic calculation of them.

26. In a machine for calculating by all arithmetical processes in selected bases of notation and having, in combination, means for entering numbers in a plurality of notations, an electromechanical decimal storage device, an electromechanical duodecimal storage device, a relay storage device for storing numbers in a notation of a base less than and greater than 12, an electronic storage device, an electronic calculating means, and a programming means with both manipulative and automatic sequence control devices for directing numbers from said entering means to any of said storage devices selectively, directing numbers selectively and repetitively from any of said storage devices to said calculating means in a series of steps governed both by values of the numbers and a preselected pattern of program, and further directing the resulting final figure from the electronic calculating means to an electromechanical storage device.

27. The machine of claim 26 with a device for registering data on a record element, said entering means including sensing devices for reading data indicia on said element, a data registering means, and means under control of the electromechanical storage device and said programming means for controlling said registering means to put data indicia on said element to represent thereon said resulting final figure.

28. In a record controlled calculating machine, means for sensing data on said records, an electromagnetic storage device, an electronic storage device, means under control of said sensing means for operating either of said storage devices, an electronic accumulator, means under control of said storage devices for controlling the operation of said accumulator, a pair of readout devices co-operating with said accumulator, one of said readout devices being relatively slow in operation for control of transfer of the result of the accumulator to an electromagnetic storage device and the other of said readout devices being relatively rapid in operation and serving for control of an electronic storage device under control of the result appearing in the electronic accumulator.

29. A machine of the kind set forth in claim 28 wherein there is provided a record punching mechanism for operating column by column under control of any one of said electromechanical storage devices, and means for transferring the result of any computation from either the accumulator or the electronic storage device to said controlling electromechanical storage device before operation of said punching mechanism.

30. An electronic multiplying machine operating by over-and-over addition, means for entering factors into mechanically positioned devices having electrical readout means, an electronic impulse source, an electronic accumulator comprising four stages of trigger circuits representative of the values 1, 2, 2, 4, electronic metering devices controlling over said accumulator serially as controlled by said electrical readout means in cooperation with said impulse source for performing a connected series of arithmetical operations in said accumulator, a second mechanically positioned device with a second electrical readout means, means under control of said accumulator for adjusting said second position device to be representative of a result, a record punching device and means under control of said second readout means for controlling said punching device to make a perforated record of said result.

31. In a calculating device for performing multiplication and division by over-and-over addition or subtraction of factors, means for entering an amount as a dividend or multiplicand, means for entering another amount as the divisor or multiplier, a column shift device comprising a set of relays and contacts controlled thereby, said relays being in the values 1, 2 and 4 relative to shifting effect on ordinal connections between entered factors, and means under control of said entering means for selecting a combination of said shift relays to provide the initial and subsequent ordinal connections for calculation.

32. In a calculating device for operations involving column shift, a pair of number storage devices, a result storage device, each of said pair of storage devices comprising electromechanical means for establishing circuit connections representing a number, electronic calculating devices for operating said result storage device, and means for controlling said electronic devices under control of both said storage devices including a relay operated column shift device comprising columnar circuits and contacts controlled by three relays for shifts of 1, 2 and 4 columns, respectively, and means under control of one number storage device for permutatively operating said relays and selectively coupling the orders of the other of said number storage device in sequence to the orders of said calculating devices to effect a computation.

33. In a card controlled calculating punch, means for sensing data on a card, a pair of electromechanical data storage devices, means under control of said sensing means for setting one of said storage devices, means for reading out the setting of said one storage device, electronic calculating devices governed by said reading out means to carry on arithmetical processes involving data derived from the card, means for setting the other of said storage devices under control of said electronic calculating devices with the result of arithmetical processes therein, a card punching means, and means for simultaneously entering new data from a new card in said one storage device and calculating therefrom while operating said punching means under control of said other storage device to punch the result of the finished calculations.

34. In a punch of the kind set forth in claim 33, with means for determining from the newly entered data the card column in which the highest ordered digit is to be punched, and means under control of said determining means for causing said new card to be shifted with respect to said punching means to place the determined column thereon directly in position to receive the first result perforations.

35. In a record controlled calculating punch, means for entering factors for arithmetical operations, means for calculating with said factors in a plurality of accumulators, means under control of said accumulators for storing the results in a pair of storage devices with electrical readout means, a comparing device including said readout means with sets of digit contacts, one set for each denominational order, and for each denominational order a brush settable upon any digit contact, means for electrically connecting brushes of the same denominational order, a current supply, an error signal means, means for electrically connecting together one group of digit contacts in one readout, means for electrically connecting together other and different digit contacts in the other readout comprising another group for comparison with said one group of contacts, and means for connecting said current supply and said signal means to both of said connecting means in such manner as to complete a circuit to said error signal means through said digit contacts and brushes of the same order in the two readouts when one brush of one readout rests upon any digit contact of said one group and the other brush of the same order of the other readout rests upon any digit contact of said other group, a record punching device, means under control of one of said readout means for operating said punching device, and means under control of said error signal means for preventing operation of said punch operating means when there is a lack of agreement in the comparing device.

References Cited in the file of this patent

UNITED STATES PATENTS

| | | |
|---|---|---|
| 2,107,134 | Weinlich et al. | Feb. 1, 1938 |
| 2,328,612 | Buhler et al. | Sept. 7, 1943 |
| 2,587,979 | Dickinson et al. | Mar. 4, 1952 |
| 2,624,507 | Phelps | Jan. 6, 1953 |
| 2,651,460 | Wilson et al. | Sept. 8, 1953 |
| 2,703,202 | Cartwright | Mar. 1, 1955 |